US011906082B2

(12) United States Patent
Furcoiu

(10) Patent No.: US 11,906,082 B2
(45) Date of Patent: Feb. 20, 2024

(54) JOINT RESTRAINT DEVICE

(71) Applicant: Mueller International, LLC, Atlanta, GA (US)

(72) Inventor: Aurelian Ioan Furcoiu, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 17 days.

(21) Appl. No.: 17/361,915

(22) Filed: Jun. 29, 2021

(65) Prior Publication Data

US 2021/0324980 A1  Oct. 21, 2021

Related U.S. Application Data

(60) Division of application No. 15/966,796, filed on Apr. 30, 2018, now Pat. No. 11,199,280, which is a continuation-in-part of application No. 15/882,512, filed on Jan. 29, 2018, now Pat. No. 11,131,412, which is a continuation-in-part of application No. 15/490,926, filed on Apr. 19, 2017, now Pat. No. 10,677,381.

(51) Int. Cl.
*F16L 21/08* (2006.01)
*F16L 21/04* (2006.01)
*F16L 19/12* (2006.01)
*F16L 19/02* (2006.01)

(52) U.S. Cl.
CPC ........... *F16L 19/12* (2013.01); *F16L 19/0206* (2013.01); *F16L 19/0218* (2013.01); *F16L 21/08* (2013.01)

(58) Field of Classification Search
CPC . F16L 19/02; F16L 37/00; F16L 21/02; F16L 19/16

USPC .......................................................... 285/80
See application file for complete search history.

(56) References Cited

U.S. PATENT DOCUMENTS 1,857,528 A * 5/1932 Cantell ................. F16L 37/101
    285/317
1,945,293 A   1/1934 Pierce
(Continued)

FOREIGN PATENT DOCUMENTS

CA    2458710    8/2005
CA    2458788    8/2005
(Continued)

OTHER PUBLICATIONS

US 11,149,889 B2, 10/2021, Furcoiu (withdrawn)
(Continued)

*Primary Examiner* — Matthew Troutman
*Assistant Examiner* — Douglas S Wood
(74) *Attorney, Agent, or Firm* — Taylor English Duma LLP

(57) ABSTRACT

A gland includes an annular ring, the annular ring defining a gland bore, the gland bore defining a gland axis extending through the annular ring; and a joint restraint assembly, the joint restraint assembly including a restraint base, the restraint base attached to the annular ring, the restraint base defining a restraint pocket, the restraint base including a structural rail; a gripper, the gripper disposed within the restraint pocket and configured to move in the restraint pocket; a spring biasing the gripper to move inwards towards the gland axis; and a cover contacting at least a portion of the restraint base.

18 Claims, 37 Drawing Sheets

(56) References Cited

U.S. PATENT DOCUMENTS

| | | | |
|---|---|---|---|
| 1,964,044 A | 6/1934 | Engel | |
| 2,355,407 A | 8/1944 | Wyss | |
| 2,394,351 A | 2/1946 | Wurzburger | |
| 2,693,374 A | 11/1954 | Wurzburger | |
| 2,716,913 A * | 9/1955 | Leerkamp | B23B 5/40 82/12 |
| 2,887,328 A | 5/1959 | Risley et al. | |
| 3,081,102 A | 3/1963 | Murray et al. | |
| 3,150,876 A | 9/1964 | Lafferty | |
| 3,162,469 A | 12/1964 | Shohan | |
| 3,163,432 A | 12/1964 | Boer | |
| 3,179,446 A | 4/1965 | Paterson | |
| 3,186,741 A | 6/1965 | Kurtz | |
| 3,211,472 A | 10/1965 | Rickard | |
| 3,249,371 A | 3/1966 | Peterman | |
| 3,252,192 A | 5/1966 | Smith | |
| 3,315,970 A | 4/1967 | Holoway | |
| 3,315,971 A | 4/1967 | Sakurada | |
| 3,414,273 A | 12/1968 | Sumner | |
| 3,432,190 A | 3/1969 | Kunz | |
| 3,485,515 A | 12/1969 | Frishof | |
| 3,573,871 A | 4/1971 | Warner et al. | |
| 3,642,306 A | 2/1972 | Gheen et al. | |
| 3,653,695 A | 4/1972 | Dunton et al. | |
| 3,680,874 A | 8/1972 | Schwarz | |
| 3,684,317 A | 8/1972 | Kazienko et al. | |
| 3,698,744 A | 10/1972 | Bevington | |
| 3,877,733 A | 4/1975 | Straub | |
| 3,980,097 A | 9/1976 | Ellis | |
| 4,092,036 A | 5/1978 | Sato et al. | |
| 4,380,348 A | 4/1983 | Swartz | |
| 4,397,485 A | 8/1983 | Wood | |
| 4,410,479 A | 10/1983 | Cyriax | |
| 4,522,434 A | 6/1985 | Webb | |
| 4,538,841 A | 9/1985 | Royston | |
| 4,544,188 A | 10/1985 | Dugger | |
| 4,568,112 A | 2/1986 | Bradley, Jr. et al. | |
| 4,569,542 A | 2/1986 | Anderson et al. | |
| 4,609,210 A | 9/1986 | Torokvei et al. | |
| 4,629,176 A | 12/1986 | Ceelen | |
| 4,648,633 A | 3/1987 | Bergmann | |
| 4,664,426 A | 5/1987 | Ueki | |
| 4,741,356 A | 5/1988 | Letzo et al. | |
| 4,768,813 A | 9/1988 | Timmons | |
| 4,779,900 A | 10/1988 | Shumard | |
| 4,791,952 A | 12/1988 | Laurel | |
| 4,848,808 A | 7/1989 | Pannell et al. | |
| 4,858,968 A | 8/1989 | Moebius | |
| 4,890,967 A | 1/1990 | Rosenbaum | |
| 5,069,490 A | 12/1991 | Halen, Jr. | |
| 5,071,175 A | 12/1991 | Kennedy, Jr. | |
| 5,121,946 A | 6/1992 | Jardine | |
| 5,205,568 A | 4/1993 | Stoll et al. | |
| 5,232,252 A | 8/1993 | Bartholomew | |
| 5,297,826 A | 3/1994 | Percebois et al. | |
| 5,324,083 A | 6/1994 | Vogelsang | |
| 5,335,946 A | 8/1994 | Dent et al. | |
| 5,398,980 A | 3/1995 | Hunter | |
| 5,437,481 A | 8/1995 | Spears et al. | |
| 5,464,228 A * | 11/1995 | Weber | F16J 15/121 277/615 |
| 5,468,025 A | 11/1995 | Adinolfe et al. | |
| 5,476,292 A | 12/1995 | Harper | |
| 5,498,042 A | 3/1996 | Dole | |
| 5,505,499 A | 4/1996 | Wallbank | |
| 5,544,922 A | 8/1996 | Shumard et al. | |
| 5,803,110 A | 9/1998 | Segal | |
| 5,851,037 A | 12/1998 | Bridges | |
| 5,863,079 A | 1/1999 | Donais et al. | |
| 5,941,576 A | 8/1999 | Krausz | |
| 6,106,029 A | 8/2000 | Demore et al. | |
| 6,173,993 B1 | 1/2001 | Shumard et al. | |
| 6,237,445 B1 * | 5/2001 | Wesch, Jr. | E21B 19/161 81/57.33 |
| 6,273,469 B1 | 8/2001 | Kwaske et al. | |
| 6,364,372 B1 | 4/2002 | Marandi | |
| 6,457,718 B1 | 10/2002 | Quesada | |
| 6,481,762 B1 | 11/2002 | Rex et al. | |
| 6,830,268 B2 | 12/2004 | Krausz | |
| 7,232,160 B2 | 6/2007 | Krausz | |
| 7,243,955 B2 | 7/2007 | Krausz et al. | |
| 7,469,939 B2 | 12/2008 | Westman et al. | |
| 7,571,940 B2 | 8/2009 | Krausz | |
| D602,127 S | 10/2009 | Shah et al. | |
| 7,625,018 B2 | 12/2009 | Krausz | |
| 7,654,586 B2 | 2/2010 | Krausz | |
| 7,748,753 B2 | 7/2010 | Krausz | |
| 7,784,798 B2 * | 8/2010 | Walworth | F16L 37/0845 285/104 |
| 7,837,238 B2 | 11/2010 | Krausz et al. | |
| 7,883,126 B2 | 2/2011 | Terry et al. | |
| 7,997,626 B2 | 8/2011 | Krausz | |
| 7,997,628 B1 | 8/2011 | Smith, Jr. et al. | |
| 8,011,426 B1 * | 9/2011 | Orgeron | B25B 5/147 166/85.1 |
| 8,042,816 B2 | 10/2011 | Krausz | |
| 8,313,124 B2 | 11/2012 | Krausz | |
| 8,408,606 B2 | 4/2013 | Krausz | |
| 8,651,530 B2 | 2/2014 | Krausz | |
| 8,816,169 B1 | 8/2014 | Eby | |
| 8,857,861 B2 | 10/2014 | German | |
| 8,870,189 B2 | 10/2014 | Krausz | |
| 8,876,169 B2 | 11/2014 | Chen | |
| 8,960,683 B2 | 2/2015 | Krausz | |
| 8,960,729 B2 | 2/2015 | Chiproot | |
| D724,185 S | 3/2015 | Chiproot | |
| 9,086,177 B2 | 7/2015 | Artsiely | |
| 9,109,701 B1 | 8/2015 | Copeland | |
| 9,163,760 B2 | 10/2015 | Lundstrom et al. | |
| 9,441,771 B2 | 9/2016 | German | |
| 9,808,572 B2 * | 11/2017 | Kamen | A61M 39/28 |
| 9,890,883 B2 | 2/2018 | Maenishi et al. | |
| 9,895,792 B2 * | 2/2018 | Chen | B25B 5/10 |
| 9,964,244 B2 * | 5/2018 | Maeda | F16L 23/02 |
| 10,001,237 B1 * | 6/2018 | Lee | F16L 37/18 |
| 10,018,290 B2 | 7/2018 | Kishi et al. | |
| 10,107,428 B2 | 10/2018 | Kim | |
| 10,281,075 B2 * | 5/2019 | Hontz | F16L 37/122 |
| 10,677,381 B2 | 6/2020 | Furcoiu | |
| 10,774,508 B2 | 9/2020 | Furcoiu et al. | |
| 10,851,920 B2 | 12/2020 | Showkathali et al. | |
| 10,941,887 B2 | 3/2021 | Furcoiu | |
| 11,105,162 B1 * | 8/2021 | Jones | E21B 19/22 |
| 11,131,412 B2 | 9/2021 | Furcoiu | |
| 11,162,621 B2 | 11/2021 | Furcoiu | |
| 11,193,609 B2 | 12/2021 | Furcoiu | |
| 11,199,280 B2 | 12/2021 | Furcoiu | |
| 11,215,306 B2 | 1/2022 | Furcoiu | |
| 11,306,463 B2 | 4/2022 | Furcoiu et al. | |
| 11,313,504 B2 | 4/2022 | Furcoiu | |
| 11,396,964 B2 | 7/2022 | Furcoiu | |
| 11,396,965 B2 | 7/2022 | Mitchell et al. | |
| 11,435,015 B2 | 9/2022 | Furcoiu | |
| 11,473,705 B2 | 10/2022 | Furcoiu | |
| 11,668,416 B2 | 6/2023 | Furcoiu | |
| 11,796,103 B2 | 10/2023 | Furcoiu | |
| 2002/0017789 A1 | 2/2002 | Holmes | |
| 2002/0037194 A1 | 3/2002 | Gentile | |
| 2003/0085566 A1 | 5/2003 | Rex et al. | |
| 2004/0108713 A1 | 6/2004 | Krausz | |
| 2004/0232698 A1 | 11/2004 | Jones | |
| 2005/0006855 A1 * | 1/2005 | Holmes | F16L 21/04 277/602 |
| 2005/0194784 A1 | 9/2005 | Jones et al. | |
| 2005/0253380 A1 | 11/2005 | Gibb et al. | |
| 2006/0012172 A1 | 1/2006 | Kennedy | |
| 2006/0087121 A1 | 4/2006 | Bradley | |
| 2007/0108766 A1 | 5/2007 | Riordan et al. | |
| 2007/0295406 A1 | 12/2007 | German et al. | |
| 2009/0243289 A1 | 10/2009 | Madara et al. | |
| 2010/0289256 A1 | 11/2010 | Shumard | |
| 2011/0084484 A1 * | 4/2011 | German | F16L 37/0845 285/337 |
| 2011/0095519 A1 | 4/2011 | Krausz | |

(56) References Cited

U.S. PATENT DOCUMENTS

| | | | |
|---|---|---|---|
| 2011/0291409 | A1 | 12/2011 | Kennedy, Jr. et al. |
| 2012/0025524 | A1 | 2/2012 | Krausz |
| 2012/0119485 | A1 | 5/2012 | Cichorek et al. |
| 2012/0299294 | A1 | 11/2012 | Chiproot |
| 2012/0299295 | A1 | 11/2012 | Chiproot |
| 2013/0056980 | A1 | 3/2013 | Chiproot |
| 2013/0328305 | A1 | 12/2013 | Chiproot |
| 2014/0001709 | A1 | 1/2014 | Chiproot |
| 2014/0319781 | A1 | 10/2014 | Chiproot |
| 2014/0319826 | A1 | 10/2014 | Chiproot |
| 2015/0176728 | A1 | 6/2015 | Bowman |
| 2015/0204468 | A1 | 7/2015 | Jones |
| 2016/0341343 | A1 | 11/2016 | Bowsher et al. |
| 2017/0030489 | A1 | 2/2017 | Decesare et al. |
| 2017/0114933 | A1 | 4/2017 | Copeland |
| 2017/0130431 | A1 | 5/2017 | Pinney et al. |
| 2017/0328500 | A1 | 11/2017 | Bowman et al. |
| 2017/0343142 | A1 | 11/2017 | Kim |
| 2018/0135788 | A1* | 5/2018 | Hontz ............... F16L 37/138 |
| 2018/0306354 | A1 | 10/2018 | Furcoiu |
| 2018/0306361 | A1 | 10/2018 | Furcoiu |
| 2018/0306362 | A1 | 10/2018 | Furcoiu |
| 2019/0017636 | A1 | 1/2019 | Furcoiu |
| 2019/0143433 | A1* | 5/2019 | Hulsebos ............ F16L 21/08 |
| | | | 219/69.17 |
| 2019/0145565 | A1 | 5/2019 | Furcoiu |
| 2019/0264843 | A1 | 8/2019 | Furcoiu |
| 2019/0331265 | A1 | 10/2019 | Bowman |
| 2020/0025321 | A1 | 1/2020 | Furcoiu |
| 2020/0041055 | A1* | 2/2020 | Kuo ..................... F16L 37/121 |
| 2020/0063900 | A1 | 2/2020 | Furcoiu |
| 2020/0071915 | A1 | 3/2020 | Furcoiu et al. |
| 2020/0248847 | A1 | 8/2020 | Furcoiu |
| 2020/0248848 | A1 | 8/2020 | Furcoiu |
| 2020/0263814 | A1 | 8/2020 | Furcoiu |
| 2020/0354930 | A1 | 11/2020 | Furcoiu et al. |
| 2021/0018125 | A1 | 1/2021 | Mitchell et al. |
| 2021/0018129 | A1 | 1/2021 | Hartman et al. |
| 2021/0102647 | A1 | 4/2021 | Furcoiu |
| 2021/0381632 | A1 | 12/2021 | Furcoiu |
| 2022/0018472 | A1 | 1/2022 | Furcoiu |
| 2022/0364667 | A1* | 11/2022 | Jensen ............... H01M 10/613 |

FOREIGN PATENT DOCUMENTS

| | | |
|---|---|---|
| CA | 2944828 | 11/2015 |
| CN | 1894531 | 1/2007 |
| CN | 202168185 | 3/2012 |
| DE | 19837803 | 3/2000 |
| DE | 202016100359 | 3/2016 |
| EP | 0273999 | 7/1988 |
| EP | 2463567 | 6/2012 |
| EP | 2494249 | 9/2012 |
| EP | 3788286 | 6/2023 |
| EP | 3612760 B1 | 8/2023 |
| GB | 1311434 | 3/1973 |
| GB | 2346185 | 8/2000 |
| GR | 3030125 | 7/1999 |
| IL | 196511 | 1/2009 |
| IL | 196817 | 2/2009 |
| IL | 209936 | 12/2010 |
| KR | 100946658 | 3/2010 |
| KR | 101049449 | 7/2011 |
| KR | 20140062744 | 5/2014 |
| KR | 101418783 | 7/2014 |
| KR | 20160082923 | 7/2016 |
| WO | 2004048835 | 6/2004 |
| WO | 2011123865 | 10/2011 |
| WO | 2016108517 | 7/2016 |
| WO | 2018194787 | 10/2018 |
| WO | 2019212771 | 11/2019 |
| WO | 2020040995 | 2/2020 |
| WO | 2020050954 | 3/2020 |
| WO | 2020146073 | 7/2020 |
| WO | 2021015809 | 1/2021 |

OTHER PUBLICATIONS

US 11,268,641 B2, 03/2022, Furcoiu (withdrawn)
US 11,365,834 B2, 06/2022, Furcoiu (withdrawn)
Furcoiu, Aurelian Ioan; Non-Final Office Action for U.S. Appl. No. 16/109,204, filed Aug. 22, 2018, dated Jun. 6, 2022, 24 pgs.
Furcoiu, Aurelian Ioan; Notice of Allowance for U.S. Appl. No. 16/854,369, filed Apr. 21, 2020, dated Mar. 10, 2022, 14 pgs.
Furcoiu, Aurelian Ioan; Non-Final Office Action for U.S. Appl. No. 16/854,384, filed Apr. 21, 2020, dated Apr. 14, 2022, 59 pgs.
Furcoiu, Aurelian Ioan; Notice of Allowance for U.S. Appl. No. 16/942,996, filed Jul. 30, 2020, dated Feb. 23, 2022, 15 pgs.
Furcoiu, Aurelian Ioan; Final Office Action for U.S. Appl. No. 16/109,204, filed Aug. 22, 2018, dated Feb. 1, 2022, 27 pgs.
Mitchell, Timothy J.; Notice of Allowance for U.S. Appl. No. 16/517,129, filed Jul. 19, 2019, dated Apr. 12, 2022, 13 pgs.
Mitchell, Timothy J.; International Preliminary Report on Patentability for PCT Application No. PCT/US19/65337, filed Dec. 10, 2019, dated Feb. 3, 2022, 8 pgs.
Furcoiu, Aurelian Ioan; Notice of Allowance for U.S. Appl. No. 16/854,384, filed Apr. 21, 2020, dated Jul. 21, 2022, 9 pgs.
Furcoiu, Aurelian Ioan; Notice of Allowance for U.S. Appl. No. 16/109,204, filed Aug. 22, 2018, dated Aug. 29, 2022, 11 pgs.
Furcoiu, Aurelian Ioan; Office Action for Mexico patent application No. MX/a/2019/011713, filed Mar. 21, 2018, dated Sep. 14, 2022, 7 pgs.
Mitchell, Timothy; Non-Final Office Action for U.S. Appl. No. 16/517,129, filed Jul. 19, 2019, dated Dec. 1, 2021, 71 pgs.
Furcoiu, Aurelian Ioan; Office Action for Chinese patent application No. 201880026432.6, file Mar. 21, 2018, dated Nov. 10, 2021, 18 pgs.
Furcoiu, Aurelian Ioan; Extended European Search Report for application No. 19796735.9, filed Apr. 19, 2019, dated Jan. 4, 2022, 10 pgs.
Furcoiu, Aurelian Ioan; Supplemental Notice of Allowance for U.S. Appl. No. 15/882,512, filed Jan. 29, 2018, dated Sep. 1, 2021, 11 pgs.
Furcoiu, Aurelian Ioan; Supplemental Notice of Allowance for U.S. Appl. No. 16/242,059, filed Jan. 8, 2019, dated Sep. 1, 2021, 7 pgs.
Mueller International, LLC; Presentation which includes descriptions and images of known restraint devices. The restraint devices were publicly available prior to Apr. 19, 2017, 39 pgs.
Furcoiu, Aurelian Ioan; International Search Report and Written Opinion for PCT Application No. PCT/US19/65201, filed Dec. 9, 2019, dated Feb. 24, 2020, 10 pgs.
Furcoiu, Aurelian Ioan; International Preliminary Report on Patentability for PCT Application No. PCT/US19/65201, filed Dec. 9, 2019, dated Jul. 22, 2021, 9 pgs.
Furcoiu, Aurelian Ioan; Office Action for Chinese patent application No. 201880026432.6, file Mar. 21, 2018, dated Nov. 4, 2020, 13 pgs.
Furcoiu, Aurelian Ioan; Office Action for Chinese patent application No. 201880026432.6, file Mar. 21, 2018, dated Jun. 28, 2021, 18 pgs.
Furcoiu, Aurelian Ioan; International Search Report and Written Opinion for PCT Application No. PCT/US19/28339, filed Apr. 19, 2019, dated Jun. 26, 2019, 8 pgs.
Furcoiu, Aurelian Ioan; International Preliminary Report on Patentability for PCT Application No. PCT/US19/28339, filed Apr. 19, 2019, dated Nov. 12, 2020, 7 pgs.
Furcoiu, Aurelian Ioan; Invitation to Pay Additional Fees for PCT/US19/46085, filed Aug. 12, 2019, dated Oct. 9, 2019, 2 pgs.
Furcoiu, Aurelian Ioan; International Search Report and Written Opinion for PCT Application No. PCT/US19/46085, filed Aug. 12, 2019, dated Dec. 11, 2019, 13 pgs.
Furcoiu, Aurelian Ioan; International Preliminary Report on Patentability for PCT Application No. PCT/US19/46085, filed Aug. 12, 2019, dated Mar. 18, 2021, 10 pgs.

(56) References Cited

OTHER PUBLICATIONS

Furcoiu, Aurelian Ioan; International Search Report and Written Opinion for PCT Application No. PCT/US19/45453, filed Aug. 7, 2019, dated Oct. 28, 2019, 9 pgs.

Furcoiu, Aurelian Ioan; International Preliminary Report on Patentability for PCT Application No. PCT/US19/45453, filed Aug. 7, 2019, dated Mar. 4, 2021, 8 pgs.

Mitchell, Timothy J.; International Search Report and Written Opinion for PCT Application No. PCT/US19/65337, filed Dec. 10, 2019, dated Feb. 5, 2020, 9 pgs.

Furcoiu, Aurelian Ioan; Non-Final Office Action for U.S. Appl. No. 15/490,926, filed Apr. 19, 2017, dated Aug. 14, 2019, 30 pgs.

Furcoiu, Aurelian Ioan; Notice of Allowance for U.S. Appl. No. 15/490,926, filed Apr. 19, 2017, dated Feb. 12, 2020, 15 pgs.

Furcoiu, Aurelian Ioan; Requirement for Restriction/Election for U.S. Appl. No. 15/490,926, filed Apr. 19, 2017, dated Jul. 1, 2019, 9 pgs.

Furcoiu, Aurelian Ioan; Supplemental Notice of Allowance for U.S. Appl. No. 15/490,926, filed Apr. 19, 2017, dated Mar. 12, 2020, 9 pgs.

Furcoiu, Aurelian Ioan; Supplemental Notice of Allowance for U.S. Appl. No. 15/490,926, filed Apr. 19, 2017, dated May 14, 2020, 7 pgs.

Furcoiu, Aurelian Ioan; Final Office Action for U.S. Appl. No. 15/882,512, filed Jan. 29, 2018, dated Jan. 28, 2021, 20 pgs.

Furcoiu, Aurelian Ioan; Non-Final Office Action for U.S. Appl. No. 15/882,512, filed Jan. 29, 2018, dated Jun. 26, 2020, 20 pgs.

Furcoiu, Aurelian Ioan; Non-Final Office Action for U.S. Appl. No. 15/882,512, filed Jan. 29, 2018, dated Dec. 12, 2019, 42 pgs.

Furcoiu, Aurelian Ioan; Notice of Allowance for U.S. Appl. No. 15/882,512, filed Jan. 29, 2018, dated May 24, 2021, 23 pgs.

Furcoiu, Aurelian Ioan; Requirement for Restriction/Election for U.S. Appl. No. 15/882,512, filed Jan. 29, 2018, dated Jul. 25, 2019, 8 pgs.

Furcoiu, Aurelian Ioan; Final Office Action for U.S. Appl. No. 16/575,013, filed Sep. 18, 2019, dated Jun. 17, 2021, 15 pgs.

Furcoiu, Aurelian Ioan; Non-Final Office Action for U.S. Appl. No. 16/575,013, filed Sep. 18, 2019, dated Mar. 10, 2021, 55 pgs.

Furcoiu, Aurelian Ioan; Final Office Action for U.S. Appl. No. 16/242,059, filed Jan. 8, 2019, dated Jun. 11, 2021, 24 pgs.

Furcoiu, Aurelian Ioan; Non-Final Office Action for U.S. Appl. No. 16/242,059, filed Jan. 8, 2019, dated Nov. 20, 2020, 52 pgs.

Furcoiu, Aurelian Ioan; Notice of Allowance for U.S. Appl. No. 16/242,059, filed Jan. 8, 2019, dated Aug. 13, 2021, 18 pgs.

Furcoiu, Aurelian Ioan; Corrected Notice of Allowance for U.S. Appl. No. 15/649,022, filed Jul. 13, 2017, dated Jan. 1, 2021, 8 pgs.

Furcoiu, Aurelian Ioan; Corrected Notice of Allowance for U.S. Appl. No. 15/649,022, filed Jul. 13, 2017, dated Nov. 12, 2020, 7 pgs.

Furcoiu, Aurelian Ioan; Corrected Notice of Allowance for U.S. Appl. No. 15/649,022, filed Jul. 13, 2017, dated Nov. 16, 2020, 9 pgs.

Furcoiu, Aurelian Ioan; Corrected Notice of Allowance for U.S. Appl. No. 15/649,022, filed Jul. 13, 2017, dated Feb. 3, 2021, 7 pgs.

Furcoiu, Aurelian Ioan; Non-Final Office Action for U.S. Appl. No. 15/649,022, filed Jul. 13, 2017, dated Jun. 25, 2020, 55 pgs.

Furcoiu, Aurelian Ioan; Notice of Allowance for U.S. Appl. No. 15/649,022, filed Jul. 13, 2017, dated Dec. 9, 2020, 9 pgs.

Furcoiu, Aurelian Ioan; Notice of Allowance for U.S. Appl. No. 15/649,022, filed Jul. 13, 2017, dated Oct. 1, 2020, 16 pgs.

Furcoiu, Aurelian Ioan; Requirement for Restriction/Election for U.S. Appl. No. 15/649,022, filed Jul. 13, 2017, dated May 19, 2020, 6 pgs.

Furcoiu, Aurelian Ioan; Final Office Action for U.S. Appl. No. 15/908,096, filed Feb. 28, 2018, dated May 26, 2021, 22 pgs.

Furcoiu, Aurelian Ioan; Non-Final Office Action for U.S. Appl. No. 15/908,096, filed Feb. 28, 2018, dated Dec. 15, 2020, 23 pgs.

Furcoiu, Aurelian Ioan; Non-Final Office Action for U.S. Appl. No. 15/908,096, filed Feb. 28, 2018, dated Jun. 18, 2020, 54 pgs.

Furcoiu, Aurelian Ioan; Notice of Allowance for U.S. Appl. No. 15/908,096, filed Feb. 28, 2018, dated Aug. 16, 2021, 12 pgs.

Furcoiu, Aurelian Ioan; Notice of Allowance for U.S. Appl. No. 15/966,796, filed Apr. 30, 2018, dated Mar. 26, 2021, 26 pgs.

Furcoiu, Aurelian Ioan; Non-Final Office Action for U.S. Appl. No. 15/966,796, filed Apr. 20, 2018, dated Feb. 24, 2020, 40 pgs.

Furcoiu, Aurelian Ioan; Non-Final Office Action for U.S. Appl. No. 15/966,796, filed Apr. 30, 2018, dated Sep. 3, 2020, 19 pgs.

Furcoiu, Aurelian Ioan; Requirement for Restriction/Election for U.S. Appl. No. 15/966,796, filed Apr. 30, 2018, dated Sep. 27, 2019, 8 pgs.

Furcoiu, Aurelian Ioan; Supplemental Notice of Allowance for U.S. Appl. No. 15/966,796, filed Apr. 30, 2018, dated May 19, 2021, 6 pgs.

Furcoiu, Aurelian Ioan; Supplemental Notice of Allowance for U.S. Appl. No. 15/966,796, filed Apr. 30, 2018, dated Aug. 3, 2021, 7 pgs.

Furcoiu, Aurelian Ioan; Corrected Notice of Allowance for U.S. Appl. No. 16/121,132, filed Sep. 4, 2018, dated Aug. 12, 2020, 8 pgs.

Furcoiu, Aurelian Ioan; Final Office Action for U.S. Appl. No. 16/121,132, filed Sep. 4, 2018, dated Apr. 20, 2020, 17 pgs.

Furcoiu, Aurelian Ioan; Non-Final Office Action for U.S. Appl. No. 16/121,132, filed Sep. 4, 2018, dated Jun. 12, 2019, 31 pgs.

Furcoiu, Aurelian Ioan; Notice of Allowance for U.S. Appl. No. 16/121,132, filed Sep. 4, 2018, dated Jun. 12, 2020, 9 pgs.

Furcoiu, Aurelian Ioan; Advisory Action for U.S. Appl. No. 16/109,204, filed Aug. 22, 2018, dated Aug. 19, 2021, 10 pgs.

Furcoiu, Aurelian Ioan; Final Office Action for U.S. Appl. No. 16/109,204, filed Aug. 22, 2018, dated Jun. 14, 2021, 22 pgs.

Furcoiu, Aurelian Ioan; Non-Final Office Action for U.S. Appl. No. 16/109,204, filed Aug. 22, 2018, dated Dec. 22, 2020, 65 pgs.

Furcoiu, Aurelian Ioan; Requirement for Restriction/Election for U.S. Appl. No. 16/109,204, filed Aug. 22, 2018, dated Oct. 27, 2020, 6 pgs.

Furcoiu, Aurelian Ioan; Non-Final Office Action for U.S. Appl. No. 16/266,835, filed Feb. 4, 2019, dated Mar. 24, 2021, 62 pgs.

Furcoiu, Aurelian Ioan; Notice of Allowance for U.S. Appl. No. 16/266,835, filed Feb. 4, 2019, dated Jul. 2, 2021, 11 pgs.

Furcoiu, Aurelian Ioan; Requirement for Restriction/Election for U.S. Appl. No. 16/266,835, filed Feb. 4, 2019, dated Feb. 22, 2021, 6 pgs.

Furcoiu, Aurelian Ioan; Supplemental Notice of Allowance for U.S. Appl. No. 16/266,835, filed Feb. 4, 2019, dated Aug. 17, 2021, 7 pgs.

Furcoiu, Aurelian Ioan; International Preliminary Report on Patentability for PCT Application No. PCT/US18/23554, filed Mar. 21, 2018, dated Oct. 31, 2019, 8 pgs.

Furcoiu, Aurelian Ioan; International Search Report for PCT Application No. PCT/US18/23554, filed Mar. 21, 2018, dated Jun. 6, 2018, 10 pgs.

Furcoiu, Aurelian Ioan; Office Action for European patent application No. 18787054.8, filed Mar. 21, 2018, dated Dec. 22, 2020, 3 pgs.

Furcoiu, Aurelian Ioan; Office Action for European patent application No. 18787054.8, filed Mar. 21, 2018, dated Oct. 31, 2022, 8 pgs.

Furcoiu, Aurelian Ioan; Non-Final Office Action for U.S. Appl. No. 16/854,369, filed Apr. 21, 2020, dated Sep. 22, 2021, 51 pgs.

Furcoiu, Aurelian Ioan; Corrected Notice of Allowance for U.S. Appl. No. 15/908,096, filed Feb. 28, 2018, dated Nov. 1, 2021, 8 pgs.

Furcoiu, Aurelian Ioan; Non-Final Office Action for U.S. Appl. No. 16/942,996, filed Jul. 30, 2020, dated Sep. 29, 2021, 44 pgs.

Furcoiu, Aurelian Ioan; Non-Final Office Action for U.S. Appl. No. 16/109,204, filed Aug. 22, 2018, dated Sep. 23, 2021, 19 pgs.

Furcoiu, Aurelian Ioan; Supplemental Notice of Allowance for U.S. Appl. No. 16/266,835, filed Feb. 4, 2019, dated Oct. 6, 2021, 7 pgs.

Furcoiu, Aurelian Ioan; Extended European Search Report for patent application No. 18787054.8, filed Mar. 21, 2018, dated Mar. 17, 2021 (received by European counsel for Applicant on Aug. 20, 2021), 9 pgs.

(56) References Cited

OTHER PUBLICATIONS

Furcoiu, Aurelian Ioan; Corrected Notice of Allowance for U.S. Appl. No. 15/908,096, filed Feb. 28, 2018, dated Nov. 10, 2021, 7 pgs.
Furcoiu, Aurelian Ioan; Supplemental Notice of Allowance for U.S. Appl. No. 15/966,796, filed Apr. 30, 2018, dated Nov. 10, 2021, 6 pgs.
Furcoiu, Aurelian Ioan; Notice of Allowance for U.S. Appl. No. 16/575,013, filed Sep. 18, 2019, dated Nov. 9, 2021, 13 pgs.
Furcoiu, Aurelian Ioan; Non-Final Office Action for U.S. Appl. No. 17/409,945, filed Aug. 24, 2021, dated Nov. 17, 2022, 62 pgs.
Furcoiu, Aurelian Ioan; Advisory Action for U.S. Appl. No. 17/409,945, filed Aug. 24, 2021, dated Apr. 27, 2023, 7 pgs.
Furcoiu, Aurelian Ioan; Final Office Action for U.S. Appl. No. 17/409,945, filed Aug. 24, 2021, dated Feb. 9, 2023, 13 pgs.
Furcoiu, Aurelian Ioan; Non-Final Office Action for U.S. Appl. No. 17/124,912, filed Dec. 17, 2020, dated Mar. 20, 2023, 77 pgs.
Furcoiu, Aurelian Ioan; Notice of Allowance for U.S. Appl. No. 17/490,872, filed Sep. 30, 2021, dated Apr. 7, 2023, 61 pgs.
Furcoiu, Aurelian Ioan; Extended European Search Report for application No. 23155872.7, filed Mar. 21, 2018, dated Apr. 11, 2023, 18 pgs.
Furcoiu, Aurelian Ioan; Non-Final Office Action for U.S. Appl. No. 17/409,945, filed Aug. 24, 2021, dated May 30, 2023, 8 pgs.
Furcoiu, Aurelian Ioan; Examination Report for UAE Application No. P6001471/2019, filed Mar. 21, 2018, dated Jun. 9, 2023, 9 pgs.
Furcoiu, Aurelian loan; Notice of Allowance for U.S. Appl. No. 17/409,945, filed Aug. 24, 2021, dated Sep. 1, 2023, 12 pgs.
Furcoiu, Aurelian loan; Final Office Action for U.S. Appl. No. 17/124,912, filed Dec. 17, 2020, dated Aug. 23, 2023, 23 pgs.
Furcoiu, Aurelian loan; Final Office Action for U.S. Appl. No. 17/124,912, filed Dec. 17, 2020, dated Nov. 20, 2023, 23 pgs.

* cited by examiner

JOINT RESTRAINT DEVICE

CROSS-REFERENCE TO RELATED APPLICATIONS

This application is a divisional of U.S. patent application Ser. No. 15/966,796, filed Apr. 30, 2018, entitled "Joint Restraint Device," which is continuation-in-part of U.S. patent application Ser. No. 15/882,512, filed Jan. 29, 2018, entitled "Joint Restraint Device," which is a continuation-in-part of U.S. patent application Ser. No. 15/490,926, filed Apr. 19, 2017, which issued into U.S. Pat. No. 10,677,381, on Jun. 9, 2020, entitled "Joint Restraint Device," all of which are hereby specifically incorporated by reference herein in their entireties.

TECHNICAL FIELD

This disclosure relates to pipe connections. More specifically, this disclosure relates to a joint restraint for a mechanical joint pipe connection.

BACKGROUND

Mechanical joint pipe connections are a common method for attaching a pipe length to a piping element such as a valve, a coupling, or a fitting, such as a tee or elbow, or another pipe. The mechanical joint pipe connection can comprise a female socket, a gland, a gasket, and a pipe length. The piping element commonly defines a female socket configured to receive a plain end of the pipe length and a gasket. A gland is commonly provided which slips over the plain end of the pipe length, and the gland is tightened by a series of bolts which draw the gland towards the female socket, thereby compressing the gasket. Compression of the gasket causes the gasket to engage an outer surface of the plain end of the pipe length, thereby forming a seal between the pipe length and the element.

Mechanical joint pipe connections are popular because mechanical joint pipe connections function with the plain end of the pipe length, unlike groove connections or flanged connections that require preparation of the plain end of the pipe length. The ability to function with the plain end allows for the pipe length to be cut to size in a field installation without requiring the time and field equipment necessary to weld a flange to the plain end or to cut a new groove in the plain end. Mechanical joint pipe connections can be assembled quickly with common hand tools such as a wrench or ratchet.

However, typical mechanical joint pipe connections do not provide for a positive retention mechanism other than friction of the gasket acting on the plain end of the length. The lack of a positive retention mechanism can compromise the seal or lead to the plain end pulling out of the female socket when the connection is subjected to high tension force or effects such as water hammer. Some mechanical joint pipe connections can incorporate a joint restraint mechanism configured to mechanically engage the plain end of the pipe; however, existing joint restraint mechanisms can exert high stresses upon the plain end of the pipe length which can lead to deformation, creep, and cracking of the plain end of the pipe length during installation or operation. Deformation, creep, and cracking can lead to failure of the seal or failure of the pipe length itself which can result in leaks or environmental contamination.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

A gland includes an annular ring, the annular ring defining a gland bore, the gland bore defining a gland axis extending through the annular ring; and a joint restraint assembly, the joint restraint assembly including a restraint base, the restraint base attached to the annular ring, the restraint base defining a restraint pocket, the restraint base including a structural rail; a gripper, the gripper disposed within the restraint pocket and configured to move in the restraint pocket; a spring biasing the gripper to move inwards towards the gland axis; and a cover contacting at least a portion of the restraint base.

A mechanical joint includes a piping element, the piping element including an element flange, the piping element defining a socket extending inwards from the element flange; a pipe length, the pipe length extending through the element flange into the socket, the pipe length defining an outer pipe surface; and a gland, the pipe length extending through the gland, the gland including a joint restraint assembly, the joint restraint assembly including a restraint base; and a gripper disposed within the restraint pocket, the gripper configured to move in the restraint pocket, the gripper further configured to engage the outer pipe surface to prevent removal of the pipe length from the socket, wherein the joint restraint assembly is selectably configurable from a prepared position to an activated position.

A gripper for use in a mechanical joint assembly includes a first end defining a first lateral extent of the gripper; a second end defining a second lateral extent of the gripper; a front wall defining a front extent of the gripper; a rear wall defining a rear extent of the gripper; an engagement end defining a lower extent of the gripper, the engagement end defining a plurality of gripping protuberances; and a plurality of gripper arms extending from the engagement end, each gripper arm including a body portion and a lever end, the lever end defining an upper extent of the gripper, wherein the gripper arms including at least a first gripper arm and a second gripper arm, and wherein a rail space is defined between the first gripper arm and the second gripper arm.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
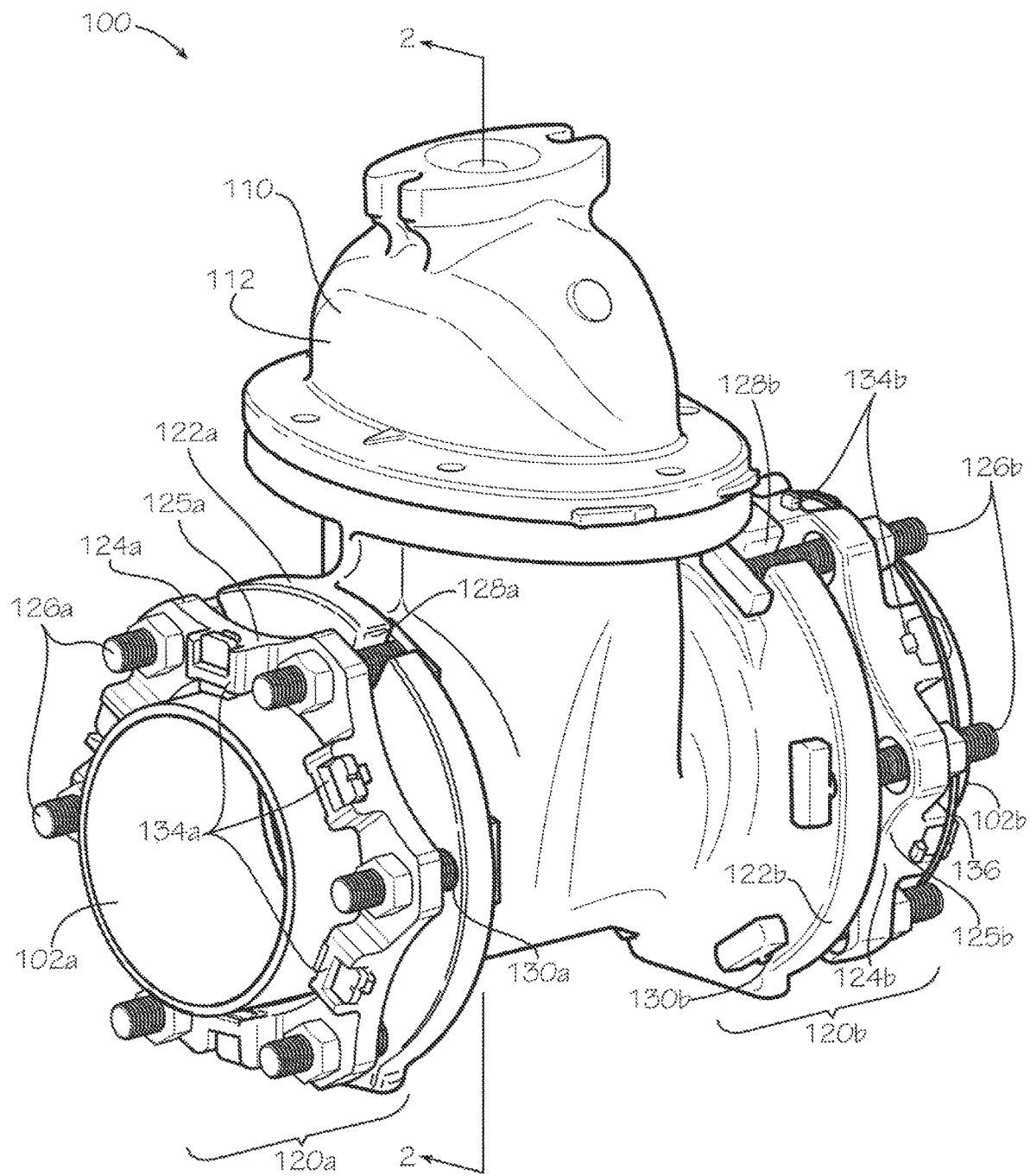
FIG. 1 is a perspective view of a piping element assembly in accordance with one aspect of the disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a gland and associated methods, systems, devices, and various apparatus. The gland comprises an annular ring and a joint restraint assembly. It would be understood by one of skill in the art that the disclosed gland is described in but a few exemplary embodiments among many. No particular terminology or description should be considered limiting on the disclosure or the scope of any claims issuing therefrom.

FIG. 1 shows a perspective view of a piping element assembly 100. The pipe element assembly 100 can comprise a piping element 110, a first gland 124a, a second gland 124b, a first pipe length 102a, and a second pipe length 102b. The pipe lengths 102a,b are shown as relatively short lengths for exemplary purposes, and each of the pipe lengths 102a,b can be significantly longer than shown. In application, the pipe lengths 102a,b can be comprised by a piping system or a piping infrastructure, such as a municipal water infrastructure or any other piping system or piping infrastructure.

In the present aspect, the piping element 110 can be a valve 112, such as a gate valve, a ball valve, a butterfly valve, a globe valve, or any other suitable type of valve. In other aspects, the piping element 110 can be a coupling configured to mechanically couple and seal the first pipe length 102a with the second pipe length 102b in fluid communication. In other aspects, the piping element 110 can be a pipe fitting, such as a tee, an elbow, a reducer, a wye, a shaped fitting, or any other suitable type of pipe fitting. In other aspects, the piping element 110 can be equipment such as a fire hydrant. In such aspects, the piping element assembly 100 may not comprise the second gland 124b and the second pipe length 102b, and the fire hydrant can define an end of a leg of the municipal water infrastructure.

The piping element 110 can comprise a first element flange 122a and a second element flange 122b. The first element flange 122a can be disposed opposite from the second element flange 122b. The first element flange 122a, the first gland 124a, and the first pipe length 102a can define a first mechanical joint 120a. The second element flange 122b, the second gland 124b, and the second pipe length 102b can define a second mechanical joint 120b. The first mechanical joint 120a can be configured to mechanically couple and seal the first pipe length 102a to the piping element 110, and the second mechanical joint 120b can be configured to mechanically couple and seal the second pipe length 102b to the piping element 110.

The first gland 124a can be coupled to the first element flange 122a by a first plurality of fasteners 126a. In the present aspect, the first plurality of fasteners 126a can be T-bolts; however in other aspects, the fasteners 126a can be bolts, studs, or any other suitable type of fasteners. Each of the first plurality of fasteners 126a can engage, a flange slot 128a, a flange hole 130a, or similar flange slots 128a or flange holes 130a defined by the first element flange 122a. The first plurality of fasteners 126a can be configured to draw the first gland 124a towards the first element flange 122a.

The first gland 124a can comprise a first annular ring 125a and a first plurality of joint restraint assemblies 134a. In the present aspect, the first gland 124a can comprise six joint restraint assemblies 134a; however, the quantity of joint restraint assemblies 134a should not be viewed as limiting, and the first gland 124a can comprise greater or fewer joint restraint assemblies 134a in other aspects. In the present aspect, the joint restraint assemblies 134a can be equally spaced about a circumference of the first annular ring 125a; however, this distribution should not be viewed as limiting, and the joint restraint assemblies 134a can be distributed in any suitable arrangement.

The first gland 124a is shown in FIG. 1 in an activated configuration. In the activated configuration, each of the joint restraint assemblies 134a of the first gland 124a can engage the first pipe length 102a in order to prevent removal of the first pipe length 102a from the piping element 110.

The second gland 124b can be coupled to the second element flange 122b by a second plurality of fasteners 126b. In the present aspect, the second plurality of fasteners 126b can be T-bolts; however, in other aspects, the fasteners 126b can be bolts, studs, or any other suitable type of fasteners. Each of the second plurality of fasteners 126b can engage a flange slot 128b, a flange hole 130b, or similar flange slots 128b or flange holes 130b defined by the second element flange 122b. The second plurality of fasteners 126b can be configured to draw the second gland 124b towards the second element flange 122b.

The second gland 124b can comprise a second annular ring 125b and a second plurality of joint restraint assemblies 134b. In the present aspect, the second gland 124b can be similar in structure to the first gland 124a. The second gland 124b can comprise six joint restraint assemblies 134b; however, the quantity of joint restraint assemblies 134b should not be viewed as limiting, and the second gland 124b can comprise greater or fewer joint restraint assemblies 134b in other aspects. In the present aspect, the joint restraint assemblies 134b can be equally spaced about a circumference of the second annular ring 125b; however, this distribution should not be viewed as limiting, and the joint restraint assemblies 134b can be distributed in any suitable arrangement.

The second gland 124b is shown in FIG. 1 in a deactivated configuration in which each of the joint restraint assemblies 134b of the second gland 124b is prevented from engaging the second pipe length 102b by a deactivation mechanism 136. In the present aspect, the deactivation mechanism 136 can be an o-ring, rubber band, bungee cord, or similar elastic member, and is discussed in further detail below.

Figure 2:
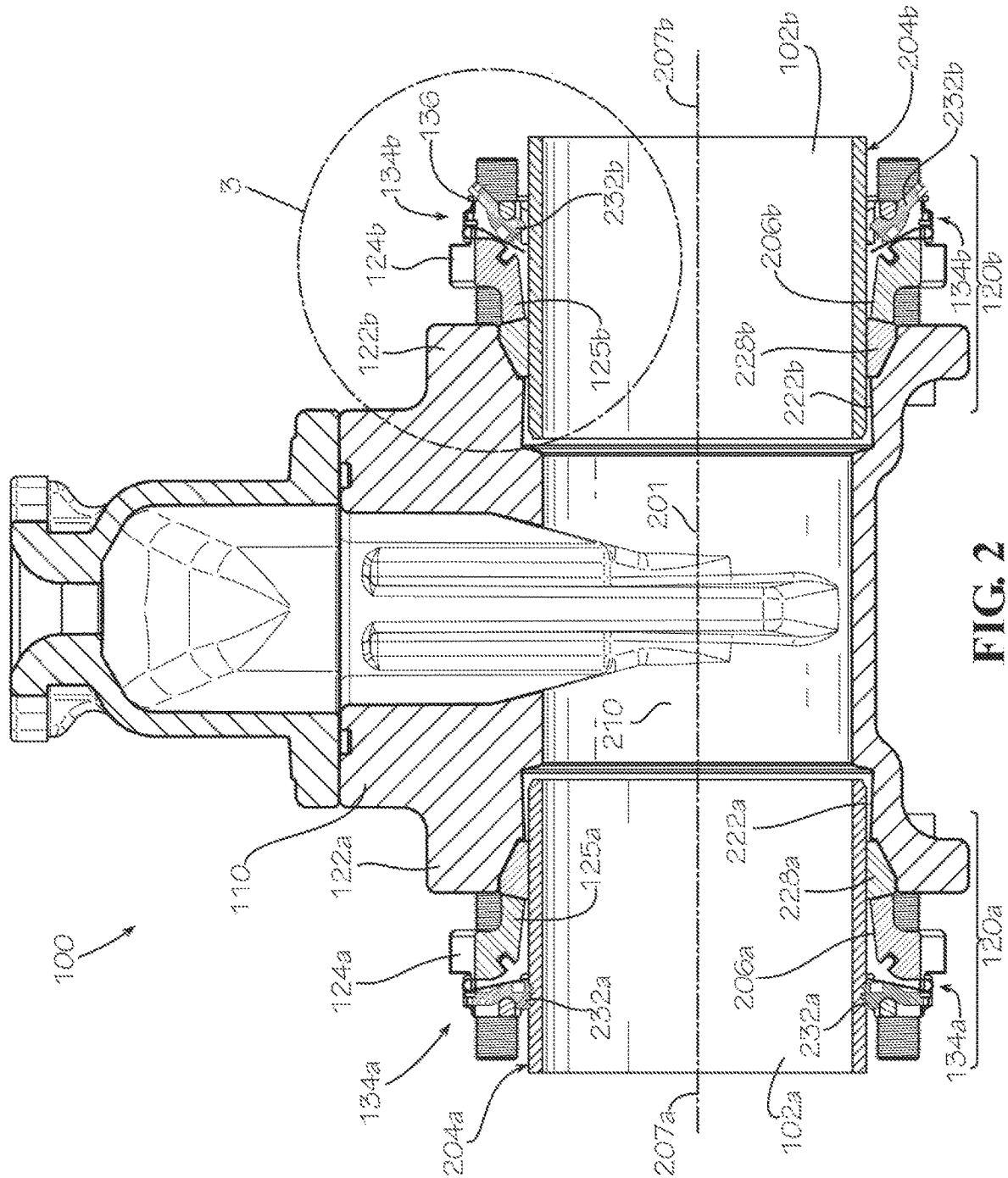
FIG. 2 is cross sectional view of the pipe element assembly of FIG. 1 taken across line 2-2 shown in FIG. 1.

FIG. 2 is a cross sectional view of the pipe element assembly 100 of FIG. 1 taken across line 2-2 shown in FIG. 1. The piping element 110 can define a first socket 222a sized to accept the piping element 110 within the first element flange 122a. The piping element 110 can also define a second socket 222b sized to accept the piping element 110 within the second element flange 122b. The piping element can define an element bore 210 extending through the piping element 110 from the first socket 222a to the second socket 222b. The element bore 210 can be representative of any piping element 110, such as a coupling or pipe fitting. In aspects in which the piping element 110 is an angled fitting such as an elbow fitting, the element bore 210 can be curved or angled. In aspects in which the piping element 110 is a fitting such as a tee or a wye, the element bore 210 can be forked or defined by multiple bores intersecting each other. In the present aspect, the element bore 210 can be substantially cylindrical, and the element bore 210 can define an element bore axis 201 therethrough.

The first annular ring 125a of the first gland 124a can define a first gland bore 206a. The first gland bore 206a can define a first gland axis 207a which can be substantially coincident with the element bore axis 201 such that the first gland bore 206a and the element bore 210 can be coaxial. The first pipe length 102a can extend through the first gland bore 206a into the first socket 222a. The first pipe length 102a can be substantially coaxial with the first gland axis 207a and the element bore axis 201.

The second annular ring 125b of the second gland 124b can define a second gland bore 206b. The second gland bore 206b can define a second gland axis 207b which can be substantially coincident with the element bore axis 201 and the first gland axis 207a such that the first gland bore 206a, the second gland bore 206b, and the element bore 210 can be substantially coaxial. The second pipe length 102b can extend through the second gland bore 206b into the second socket 222b. The second pipe length 102b can be substantially coaxial with the first gland axis 207a, the second gland axis 207b, and the element bore axis 201.

The mechanical joint 120a of the pipe element assembly 100 can further comprise a first gasket 228a, and the mechanical joint 120b of the pipe element assembly 100 can further comprise a second gasket 228b. The first gasket 228a can be disposed axially between the piping element 110 and the first gland 124a within the first socket 222a. The first gasket 228a can be configured to seal against a first outer pipe surface 204a defined by the first pipe length 102a. The second gasket 228b can be disposed axially between the piping element 110 and the second gland 124b within the second socket 222b. The second gasket 228b can be configured to seal against a second outer pipe surface 204b defined by the second pipe length 102b.

As previously described, the first gland 124a is shown in the activated configuration wherein a first gripper 232a of each of the joint restraint assemblies 134a can be positioned to engage the first outer pipe surface 204a. In the present aspect, the first grippers 232a are in a final engagement position which prevents any withdrawal of the first pipe length 102a from the first socket 222a. The final engagement position is shown and further described below with respect to FIG. 5.

The second gland 124b is shown in the deactivated configuration wherein a second gripper 232b of each of the joint restraint assemblies 134b can be disengaged from the second outer pipe surface 204b by the deactivation mechanism 136. In the present aspect, the second grippers 232b are shown in a disengaged position in which the second pipe length 102b can freely be inserted, withdrawn, or completely removed from the second socket 222b. The disengaged position is shown and further described below with respect to FIG. 3.

Figure 3:
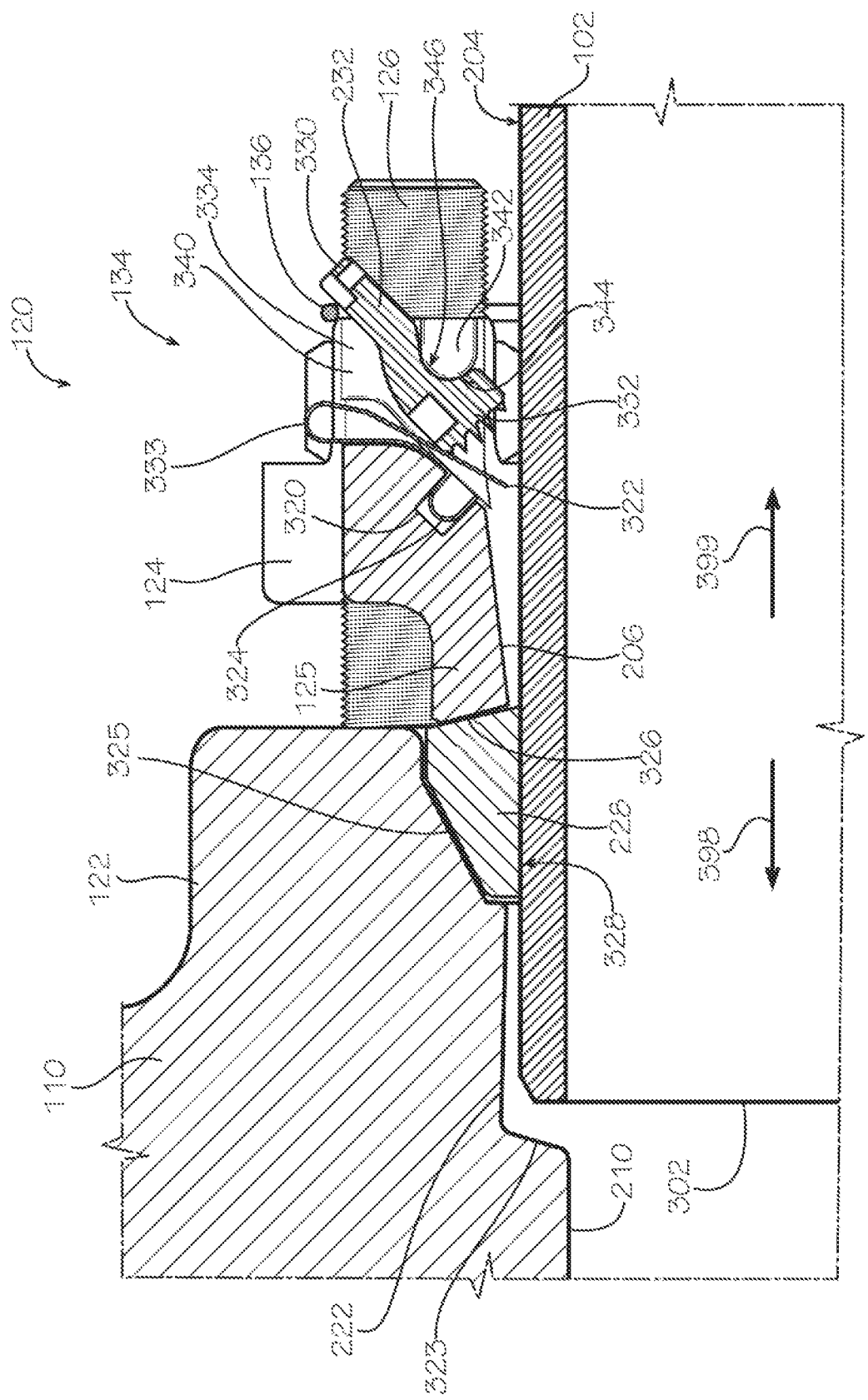
FIG. 3 is a detail view of a mechanical joint of the pipe element assembly comprising a gland taken from Detail 3 shown in FIG. 2.

FIG. 3 is a detail view of the second mechanical joint 120b of the pipe element assembly 100 taken from Detail 3 shown in FIG. 2. The second mechanical joint 120b can be representative of either of the aspects of the mechanical joints 120a,b as shown in FIG. 1, and components of the pipe element assembly 100 are referred to in generality hereafter. For example, the second mechanical joint 120b is simply referred to as the mechanical joint 120 below.

As previously described, the gland 124 in the present aspect can be placed in the deactivated configuration, and the gripper 232 can thereby be placed in the disengaged position which allows the pipe length 102 to freely move into the socket 222 in an insertion direction 398 or outwards from the socket 222 in a withdrawal direction 399. The piping element 110 can define a pipe shoulder 323 between the socket 222 and the element bore 210. The pipe shoulder 323 can be configured to provide a positive stop for a plain end 302 of the pipe length 102 which can limit a depth of insertion of the pipe length 102 into the socket 222.

The pipe element 110 can define a gasket groove 325. The gasket groove 325 can define a taper, and the gasket groove 325 can define a substantially triangular or trapezoidal profile. The gasket groove 325 can be shaped to receive the gasket 228. The annular ring 125 of the gland 124 can be configured to engage the gasket 228. The annular ring 125 can define an engagement bevel 326. The engagement bevel 326 can be substantially frustoconical in shape, and the engagement bevel 326 can face radially inward with respect to the bore axis 201 and the gland axis 207 (both shown in FIG. 2). Tightening of the fasteners 126 can draw the gland 124 towards the element flange 122 of the pipe element 110, thereby compressing the gasket 228 in the gasket groove 325. The engagement bevel 326 and the taper of the gasket groove 325 can cooperate to compress and deform the gasket 228 radially inward with respect to the bore axis 201 and gland axis 207. Compression and deformation of the gasket 228 can press an inner gasket surface 328 of the gasket 228 against the outer pipe surface 204, thereby energizing the gasket 228 and creating a seal between the gasket 228 and the outer pipe surface 204. With the gasket 228 compressed, friction between the inner gasket surface 328 and the outer pipe surface 204 can resist movement of the pipe length 102 in both the insertion direction 398 and the withdrawal direction 399.

The socket 222 can taper radially outward as the socket 222 extends axially away from the gasket groove 325 and towards the pipe shoulder 323. The gland bore 206 can taper radially outward as the gland bore 206 extends axially away from the engagement bevel 326. The respective tapers of the socket 222 and the gland bore 206 can provide clearance on either side of the gasket 228 to allow the pipe length 102 to tilt and demonstrate limited angular deflection relative to the bore axis 201 and gland axis 207 (shown in FIG. 2). In the present aspect, the pipe length 102 can demonstrate angular deflection of up to 3 degrees relative to the bore axis 201; however, this value should not be viewed as limiting. The socket 222 and the gland 124 can be sized and shaped to allow for larger or smaller angular deflection of the pipe length 102.

In the present aspect, the angular deflection can be limited by the size and geometry of the socket 222, and the gland 124; however, the joint restraint assembly 134 can tolerate larger values of angular deflection. The taper of the gland bore 206 can also aid in slipping the gland 124 over the plain end 302 of the pipe length 102 during installation. The taper and sizing of the gland bore 206 can be configured to provide clearance for the gripper 232 to clear the outer pipe surface 204 in the deactivated configuration.

Each joint restraint assembly 134 can comprise a restraint base 334, a spring clip 333, and a one of the grippers 232. The joint restraint assembly 134 can be assembled on the restraint base 334. In the present aspect, the restraint base 334 can be integrally defined by the gland 124; however in other aspects, the restraint base 334 can be a separate component which can be attached or fastened to the annular ring 125 of the gland 124. In some aspects, a position of the restraint base 334 on the annular ring 125 can be adjusted, such as by moving the restraint base 334 radially inward or outward relative to the gland axis 207 (shown in FIG. 2). Such adjustment can allow the gland 124 to be configured for different sizes of pipe lengths 102 having different outer diameters. In some aspects, the restraint bases 334 can also be adjusted on the annular ring 125 axially relative to the gland axis 207. The restraint base 334 can define a restraint pocket 340 and a restraint pivot 342. The gripper 232 and the spring clip 333 can be disposed within the restraint pocket 340.

The gripper 232 can rotate about the restraint pivot 342 such that the engagement end 332 of the gripper 232 can be drawn into and out of contact with the outer pipe surface 204. The gripper 232 can define a gripper bearing surface 346, and the restraint pivot 342 can define a restraint bearing surface 344. The gripper bearing surface 346 can be shaped complimentary to the restraint bearing surface 344, and the gripper bearing surface 346 can be in facing contact with the restraint bearing surface 344. The gripper bearing surface 346 can be configured to slide around the restraint bearing surface 344 as the gripper 232 rotates about the restraint pivot 342.

The gripper 232 can define an engagement end 332 and a lever end 330. The engagement end 332 can be disposed opposite from the lever end 330 with the gripper bearing surface 346 defined between the engagement end 332 and the lever end 330. The engagement end 332 can extend into the gland bore 206 towards the gland axis 207 (shown in FIG. 2). The spring clip 333 can bias the gripper 232 to rotate about the restraint pivot 342 towards engagement with outer pipe surface 204. Specifically, an engagement leg 322 of the spring clip 333 can press on the engagement end 332 of the gripper 232. A retention tab 324 of the spring clip 333 can engage a locator bore 320 defined by the restraint base 334. The engagement of the retention tab 324 with the locator bore 320 can position and secure the spring clip 333 within the restraint pocket 340, and the spring clip 333 can thereby maintain the engagement between the gripper 232 and the restraint pivot 342.

In the deactivated configuration, the deactivation mechanism 136 can prevent rotation of the gripper 232 towards engagement with the outer pipe surface 204. In the present aspect, the deactivation mechanism 136 can be elastic, and tension of the deactivation mechanism 136 can overpower the spring clips 333. The deactivation mechanism 136 can pull on the lever end 330 of the gripper 232 to position the gripper 232 in the disengaged position wherein the gripper 232 is out of contact with the outer pipe surface 204. The deactivation mechanism 136 can comprise a stretchable material such as an O-ring, a rubber band, a bungee cord, or any other suitable elastically stretchable material.

Figure 4:
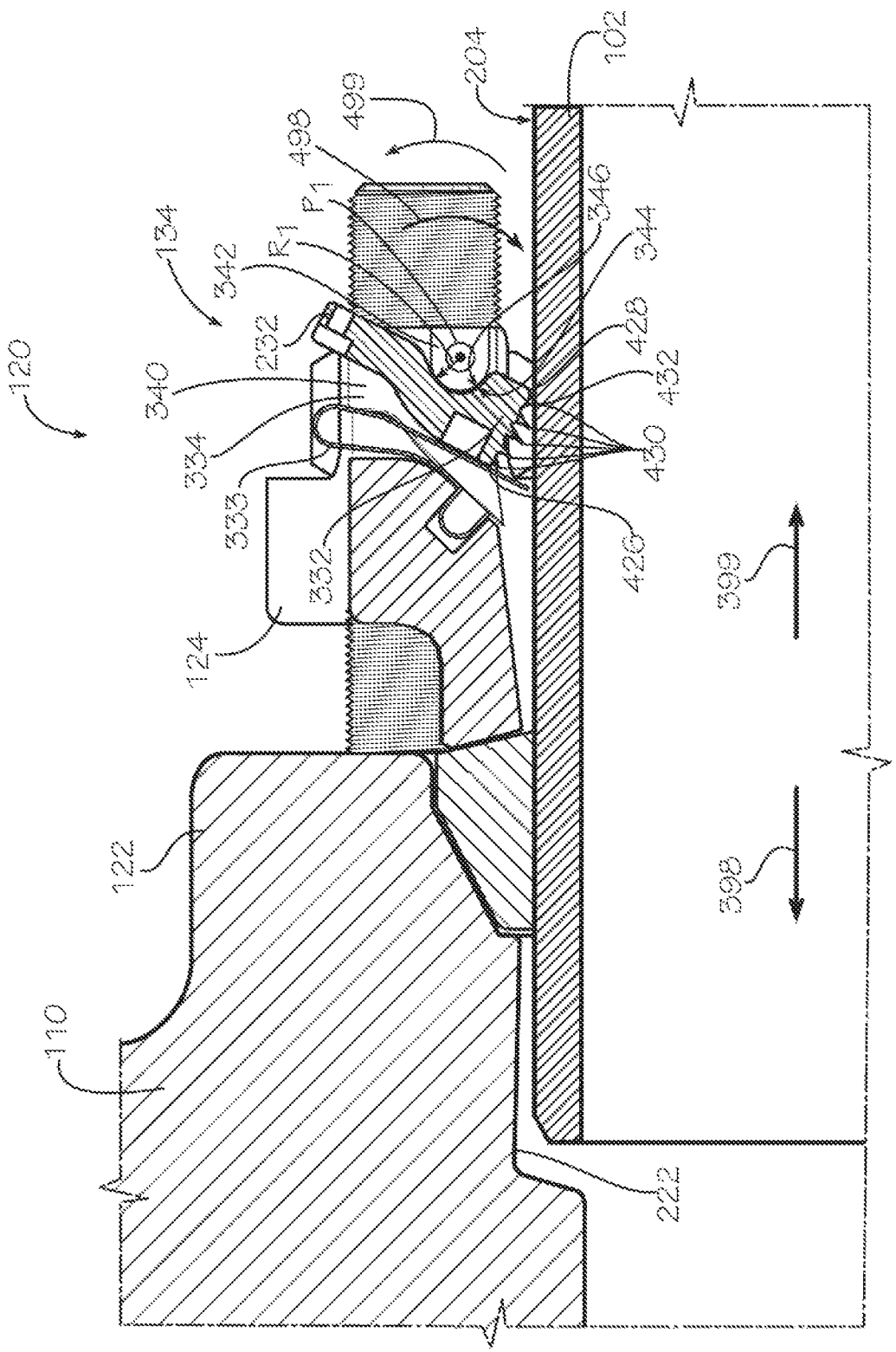
FIG. 4 is a detail view of the mechanical joint of the pipe element assembly taken from Detail 3 shown in FIG. 2 with a gripper of the gland of FIG. 3 in an initial engagement position.

In the present aspect, the deactivation mechanism 136 can simultaneously deactivate all of the joint restraint assemblies 134 of the gland 124. Removing the deactivation mechanism 136 from the gripper 232 can activate each joint restraint assembly 134, as shown in FIG. 4. The deactivation mechanism 136 can be individually slipped off of the lever end 330 of each gripper 232 to individually activate the respective joint restraint assembly 134, or the deactivation mechanism 136 can be cut, such as with scissors, which can simultaneously activate all of the joint restraint assemblies 134 of the gland 124. In some aspects, the lever end 330 can define a deactivation feature (not shown) such as an extension, a hook, or a pin configured to engage the deactivation mechanism 136. The deactivation feature can be configured to prevent pinching of the deactivation mechanism 136 between the lever end 330 and the restraint base 334 which can bind the gripper 232 under some conditions.

FIG. 4 is a detail view of the mechanical joint 120 of the pipe element assembly 100 taken from Detail 3 shown in FIG. 2 with the gripper 232 shown in an initial engagement position. The gripper 232 can rotate about the restraint pivot 342 under the bias of the spring clip 333. The restraint bearing surface 344 can define a pivot radius of curvature $R_1$ and a pivot center axis $P_1$. The pivot center axis $P_1$ can be perpendicular to both an axial direction and a radial direction with respect to the gland axis 207 (shown in FIG. 12). The complimentary shapes of the gripper bearing surface 346 and the restraint bearing surface 344 allows the gripper 232 to rotate around the pivot center axis $P_1$ while maintaining facing contact between the gripper bearing surface 346 and the restraint bearing surface 344.

The spring clip 333 biases the gripper 232 to rotate about the pivot center axis $P_1$ in an engagement direction 499 (counter-clockwise in the aspect shown). The deactivation mechanism 136 (shown in FIG. 3) biases the gripper 232 to rotate in a disengagement direction 498 (clockwise in the aspect shown). Once the deactivation mechanism 136 (shown in FIG. 3) has been removed and the joint restraint assembly 134 is placed in the activated configuration, the gripper 232 can rotate in the engagement direction 499 such that the engagement end 332 engages the outer pipe surface 204.

The gripper 232 can define a leading edge 428 and a trailing edge 426 at opposite sides of the engagement end 332. The leading edge 428 and the trailing edge 426 are named with respect to rotation in the engagement direction 499. The gripper 232 can comprise a plurality of gripping protuberances 430 disposed on the engagement end 332. Each gripping protuberance 430 can extend outwards from the engagement end 332, and the gripping protuberances 430 can be configured to engage or dig into the outer pipe surface 204 of the pipe length 102. In the present aspect, a row of gripping protuberances 430 disposed closest to the leading edge 428 can define a leading row 432 of gripping protuberances 430.

The initial engagement position can describe a position of the gripper 232 when the leading row 432 first contacts the outer pipe surface 204 when rotating the gripper 232 in the engagement direction 499. In the initial engagement position, the leading row 432 can rest in light contact with the outer pipe surface 204 under the bias of the spring clip 333, and the leading row 432 of gripping protuberances 430 has not yet significantly dug into the outer pipe surface 204. As shown, those gripping protuberances 430 not in the leading row 432 are disengaged from the outer pipe surface 204 in the initial engagement position.

In the initial engagement position, the gripper 232 does not substantially resist movement of the pipe length 102 in the insertion direction 398 into the socket 222. The gripping protuberances 430 are biased to permit movement of the pipe length 102 in the insertion direction 398 without digging into the outer pipe surface 204. The gripper 232 can rotate imperceptibly in the disengagement direction 498 to allow the leading row 432 of gripping protuberances 430 to slide across the outer pipe surface 204.

However, moving the pipe length 102 in the withdrawal direction 399 outwards from the socket 222 can cause the leading row 432 of gripping protuberances 430 to "bite" and dig into the outer pipe surface 204. Once the leading row 432 of gripping protuberances 430 dig into the outer pipe surface 204, movement of the pipe length 102 in the withdrawal direction 399 causes rotation of the gripper 232 in the engagement direction 499. The engagement end 332 of the gripper 232 can be configured to exert increasing pressure on the outer pipe surface 204 when the gripper 232 is rotated about the restraint pivot 342 in the engagement direction 499. Rotational movement of the gripper 232 about the restraint pivot in the engagement direction 499 results in a radially inward component of movement of the engagement end 332 towards the gland axis 207 (shown in FIG. 2). As the engagement end 332 rotates in the engagement direction 499 and moves radially inward, an increasing number of the gripping protuberances 430 engage the outer pipe surface 204.

The radially inward component of movement of the engagement end 332 results in an inward pinching action of the pipe length 102 between opposing pairs of joint restraint assemblies 134. The inward pinching action causes the gripping protuberances 430 to exert increasing pressure on the outer pipe surface 204. The pipe length 102 resists the inward pinching action which prevents further rotation of the grippers 232 in the engagement direction which thereby resists further movement of the pipe length 102 in the withdrawal direction 399. Movement of the pipe length 102 in the insertion direction 398 can relax the inward pinching action by rotating the grippers 232 slightly in the disengagement direction 498.

Accordingly, each joint restraint assembly 134 reacts and self-adjusts to a withdrawal force acting on the pipe length 102 in the withdrawal direction 399 by exerting only as much force and pressure as required to prevent further movement of the pipe length 102 in the withdrawal direction 399. The self-adjustment and variable engagement of the grippers 232 also allows each joint restraint assembly 134 to adjust to variations of the outer diameter of the pipe length 102. Variation in the outer diameter of the pipe length 102 can be caused, for example and without limitation, by manufacturing tolerance, a wall thickness of the pipe length 102, different dimensional specifications for pipe lengths 102 manufactured to different industry standards, ovality of the pipe length 102, or deformation of the pipe length 102. The joint restraint assemblies 134 are insensitive to such variations because each joint restraint assembly 134 can self-adjust independent of the other joint restraint assemblies 134. In other aspects, the joint restraint assembly 134 can also be adjusted radially inward and outward to accommodate pipe lengths 102 of significantly different outer diameters. In other aspects, the grippers 232 can be provided with engagement ends 332 of different lengths, and the grippers 232 can be interchanged to accommodate pipe lengths 102 of significantly different outer diameters. For example, the grippers 232 of an aspect of the gland 124 configured for use with a 6" pipe can be replaced with grippers 232 with an elongated engagement end 332 to convert the gland 124 for use with a 4" pipe.

Figure 5:
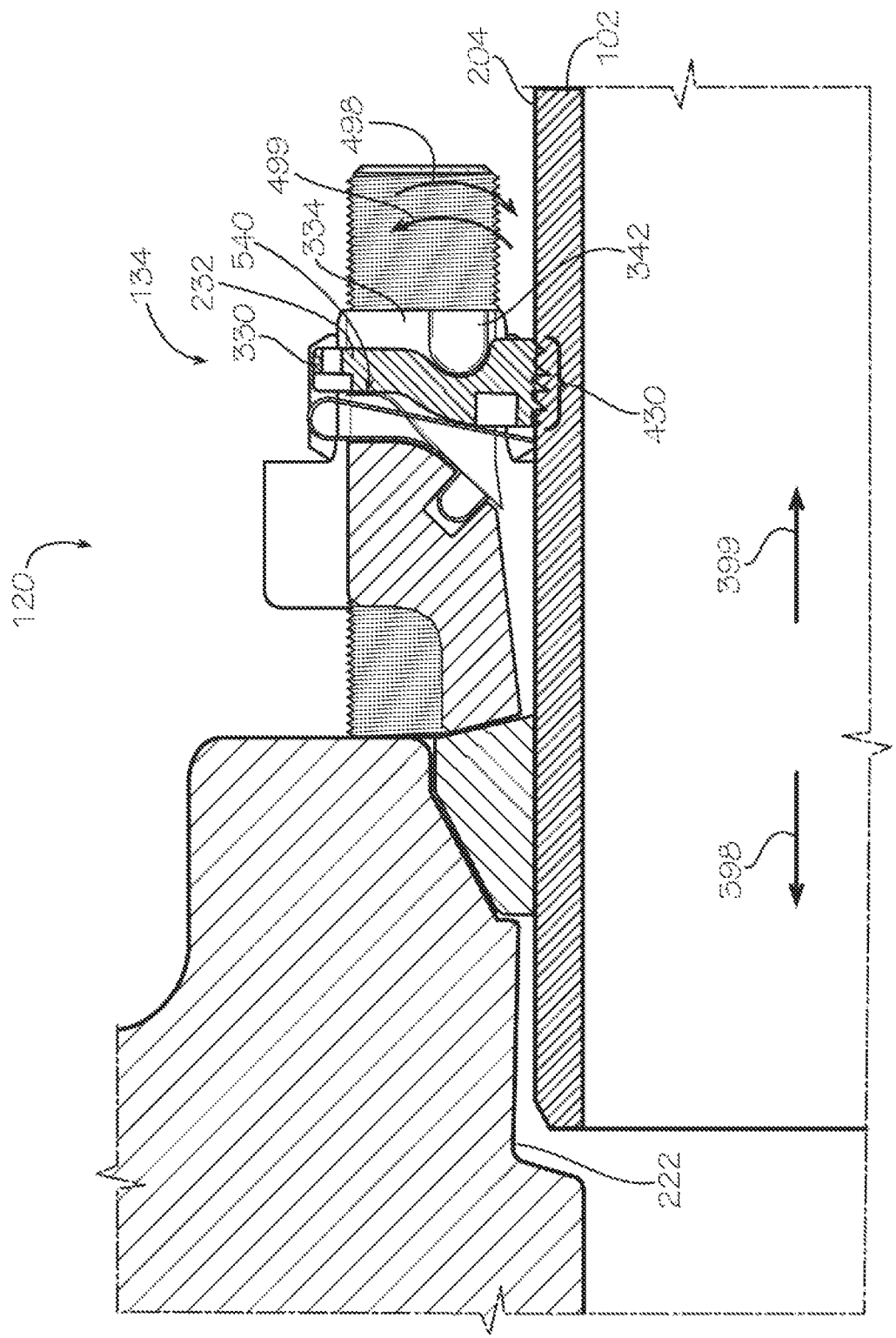
FIG. 5 is a detail view of the mechanical joint of the pipe element assembly taken from Detail 3 shown in FIG. 2 with the gripper of the gland of FIG. 3 in a final engagement position.

If the withdrawal of the pipe length 102 continues, the gripper 232 can continue to rotate in the engagement direction 499 until the lever end 330 of the gripper 232 contacts a stop surface 540 defined by the restraint base 334, as shown in FIG. 5. FIG. 5 is a detail view of the mechanical joint 120 of the pipe element assembly 100 taken from Detail 3 shown in FIG. 2 with the gripper 232 shown in the final engagement position. Contact between the gripper 232 and the stop surface 540 can prevent further rotation of the gripper 232 about the restraint pivot 342. When the lever end 330 contacts the stop surface 540, the gripper 232 can be in the final engagement position.

In the final engagement position, all of the gripping protuberances 430 can be engaged with the outer pipe surface 204, thereby maximizing traction of the gripper 232 on the pipe length 102. The stop surface 540 prevents the gripper 232 from further rotating in the engagement direction 499, thereby preventing further movement of the pipe length 102 in the withdrawal direction 399 without bending the gripping protuberances 430 or shearing the gripping protuberances 430 or material from the outer pipe surface 204. The pipe length 102 can still readily move in the insertion direction 398, resulting in rotation of the gripper 232 in the disengagement direction 498 and ultimately reducing the inward pinching action acting on the pipe length 102.

Engagement by the gripper 232 of each joint restraint assembly 134 can occur over a full range of motion between the initial engagement position and the final engagement position. The grippers 232 independently engage the pipe length 102, and the degree of engagement can be based on numerous variables. The gripper 232 of each joint restraint assembly 134 can be in a different position and a different degree of engagement. For instance, a first gripper 232 of the mechanical joint 120 can be in the initial engagement position, a second gripper 232 of the mechanical joint 120 can be positioned between the initial engagement position and the final engagement position, and a third gripper 232 of the mechanical joint 120 can be in the final engagement position. Relevant variables include, but are not limited to, the outer diameter of the pipe length 102, ovality of the pipe length 102, angular deflection of the pipe length 102 relative to the gland axis 207 (shown in FIG. 2), and a magnitude of force exerted on the pipe length 102 to insert or withdrawal the pipe length 102 from the socket 222. As conditions change, each gripper 232 can independently react to increase or decrease engagement with the pipe length 102. For example, if the pipe element assembly 100 is buried and settles over time or is subjected to a disruptive event such as an earthquake, each individual joint restraint assembly 134 can adjust independently to the new conditions of tension and angular alignment of the pipe length 102.

Figure 6:
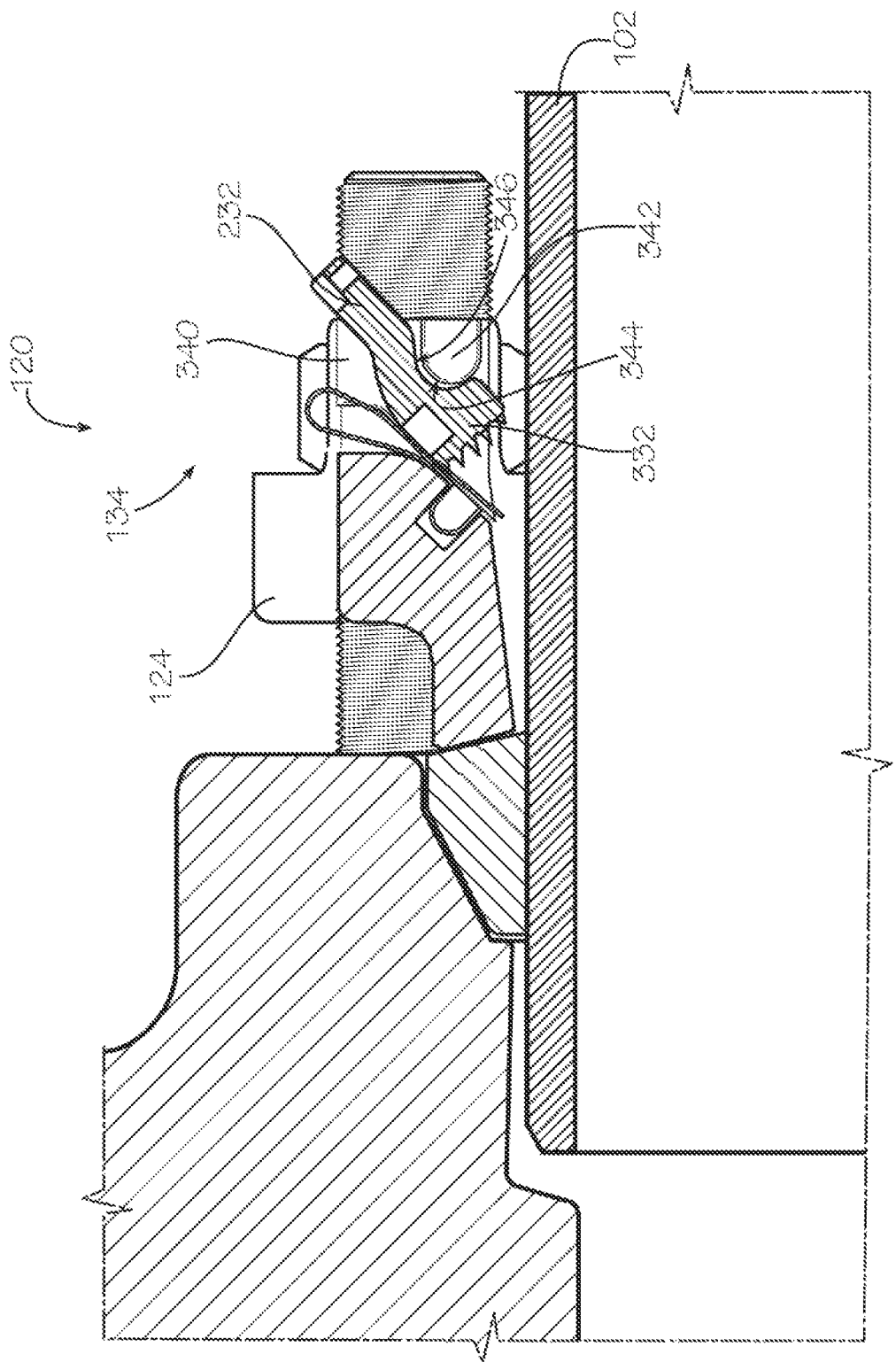
FIG. 6 is a detail view of the mechanical joint of the pipe element assembly taken from Detail 3 shown in FIG. 2 with the gripper of the gland of FIG. 3 in a lifted position.

FIG. 6 is a detail view of the mechanical joint 120 of the pipe element assembly 100 taken from Detail 3 shown in FIG. 2 with the gripper 232 shown in a lifted position. The lifted position is not a normal operating position, but can exemplify the ability of the joint restraint assembly 134 to compensate and adjust for misalignment during installation of the gland 124 over the pipe length 102.

In the lifted position, the gripper 232 can lift off of the restraint pivot 342 such that the gripper bearing surface 346 at least partially breaks contact with the restraint bearing surface 344. In the lifted position, the engagement end 332 can move radially outwards with respect to the gland axis 207 (shown in FIG. 2) further than normally allowable in the disengaged position of FIG. 3. The ability for the gripper 232 to lift off of the restraint pivot 342 can provide additional clearance for inserting the pipe length 102 through the gland 124. In other aspects, the restraint pocket 340 can be sized and shaped to prevent lifting of the gripper 232 relative to the restraint pivot 342. In other aspects, the restraint pivot 342 can be configured to prevent lifting of the gripper 232. For example, in some aspects, the restraint pivot 342 can be a bolt, a rod, or a similar fastener extending through a bore defined by the gripper 232.

Figure 7:
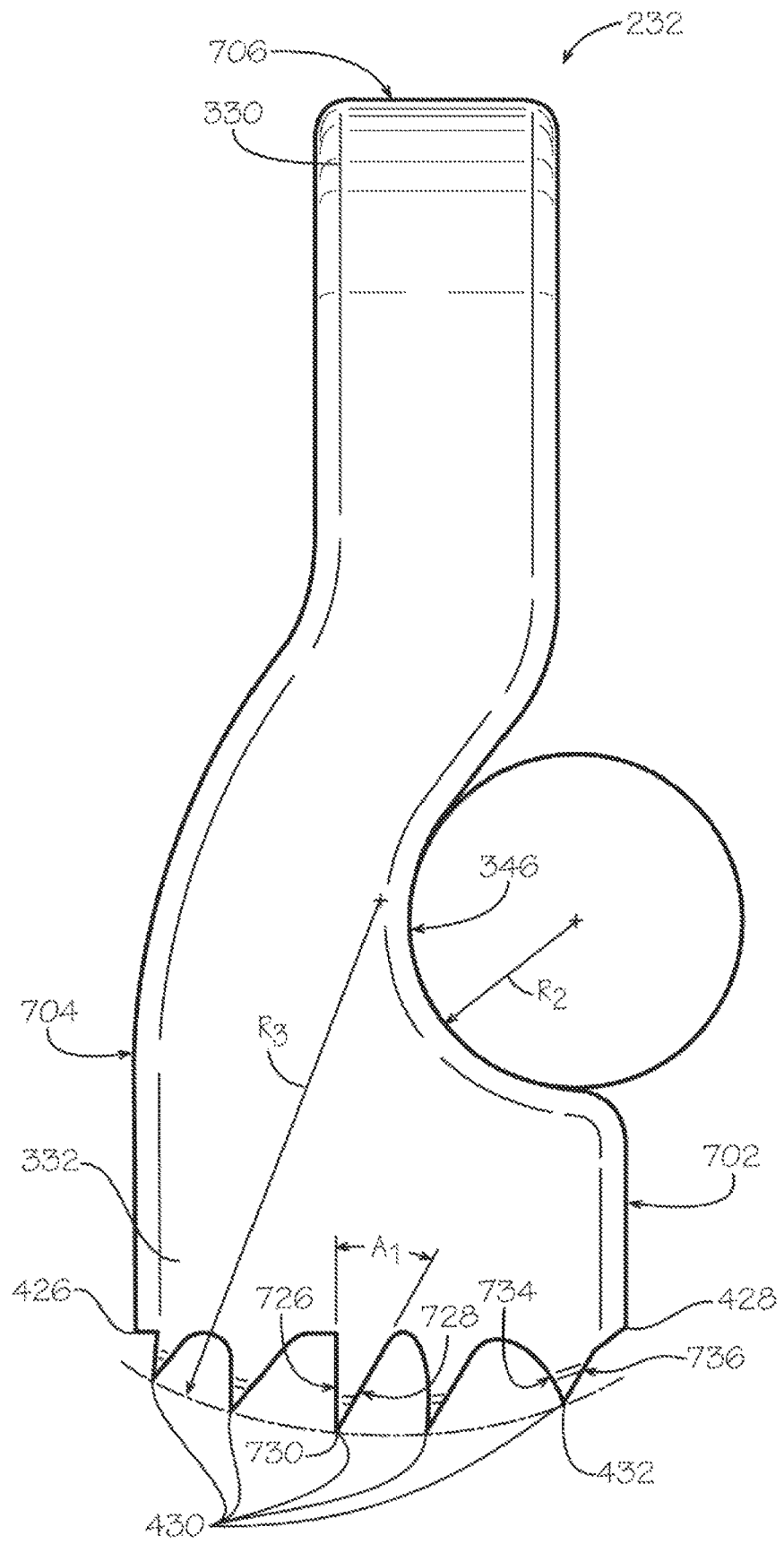
FIG. 7 is a side view of the gripper of the gland of FIG. 3.

FIG. 7 is a side view of the gripper 232 of FIG. 2. The gripper 232 can define a first gripper surface 702 and a second gripper surface 704 disposed opposite from the first gripper surface 702. The gripper bearing surface 346 can be defined by a portion of the first gripper surface 702. The second gripper surface 704 can define the trailing edge 426, and the first gripper surface 702 can define the leading edge 428. The gripper 232 can also define a top gripper surface 706 disposed on the lever end 330 opposite from the plurality of gripping protuberances 430. The gripper bearing surface 346 can be shaped complimentary to the restraint bearing surface 344 (shown in FIG. 3). The gripper bearing surface 346 can define a gripper radius of curvature $R_2$ which can be substantially equal to the pivot radius of curvature $R_1$ (shown in FIG. 4).

A contour of the edges of the plurality of gripping protuberances 430 can define an engagement radius of curvature $R_3$ of the gripping protuberances 430. The engagement radius of curvature $R_3$ can smoothly roll the gripping protuberances 430 into increasing engagement with the outer pipe surface 204 (shown in FIG. 3) as the pipe length 102 is moved in the withdrawal direction 399 (shown in FIG. 3) and the gripper 232 is rotated in the engagement direction 499 (shown in FIG. 4). The rolling of the gripping protuberances 430 can smoothly increase pressure applied to the pipe length 102 by each gripper 232. A horizontal offset between a center point of the radius of curvature $R_3$ and a center point of the gripper radius of curvature $R_2$, among other variables, can also affect a magnitude to the inward pinching action of the engagement end 332 of the gripper 232. By increasing the horizontal offset, a radially inward component of the motion of the engagement end 332 can be increased when rotating the gripper 232 in the engagement direction 499. By decreasing or eliminating the horizontal offset, the radially inward component of the motion of the engagement end 332 can be minimized when rotating the gripper 232 in the engagement direction 499.

The contour of the edges of the gripping protuberances 430 can effectively act as a cam profile controlling the pressure and stress exerted on the pipe length 102 upon withdrawal. In the present aspect, the engagement radius of curvature $R_3$ can define a constant value. In other aspects, the contour of the edges of the gripping protuberances 430 can define a different shape without a constant engagement radius of curvature $R_3$. In other aspects, the edges of the gripping protuberances 430 can all be coplanar. In such an aspect, the stress and pressure exerted by the engagement end 332 can reach a maximum between the initial engagement position and the final engagement position, and the stress and pressure can then reduce as the engagement end 332 rolls over center into the final engagement position. In such an aspect, the gripper 232 can be biased to remain in the final engagement position, and the pipe length 102 can be subjected to reduced residual stresses in the final engagement position.

In the present aspect, a center row 730 of gripping protuberances 430 can define a leading surface 728 and a trailing surface 726. Each of the leading surface 728 and the trailing surface 726 can be substantially planar. In the final engagement position, the trailing surface can be substantially perpendicular to the gland axis 207 (shown in FIG. 2). An engagement angle Ai can be defined between the leading surface 728 and the trailing surface 726, and the center row 730 can define an angled profile. The angled profile of the center row 730 can be configured to slide over the outer pipe surface 204 when the pipe length 102 is moved in the insertion direction 398 (as shown in FIG. 3) and to bite into the outer pipe surface 204 when the pipe length 102 is moved in the withdrawal direction 399 (as shown in FIG. 3). In the present aspect, the engagement angle Ai can have a value substantially equal to 30 degrees; however, this value should not be viewed as limiting. In other aspects, the value of the engagement angle Ai can range from 15 degrees to 60 degrees. In some aspects, some or all of the gripping protuberances 430 can each define the engagement angle Ai.

In the present aspect, the leading row 432 of gripping protuberances 430 can define a leading surface 736 and a trailing surface 734. The leading surface 736 can be substantially planar and the trailing surface 734 can be a curved surface swept slightly backwards towards the trailing edge 426, thereby defining a curved profile. The curved surface of the trailing surface 734 can aid the leading row 432 in biting into the outer pipe surface 204 when the pipe length 102 is moved in the withdrawal direction 399 (as shown in FIG. 3).

In various other aspects, the angled profile of the center row 730 and the curved profile of the leading row 432 can be exemplary of any of the gripping protuberances 430. In some aspects, all or some of the gripping protuberances 430 can define the angled profile. In other aspects, all or some of the gripping protuberances 430 can define the curved profile. In the present aspect, the gripping protuberances 430 can define a mix of curved profiles and angled profiles.

Figure 8:
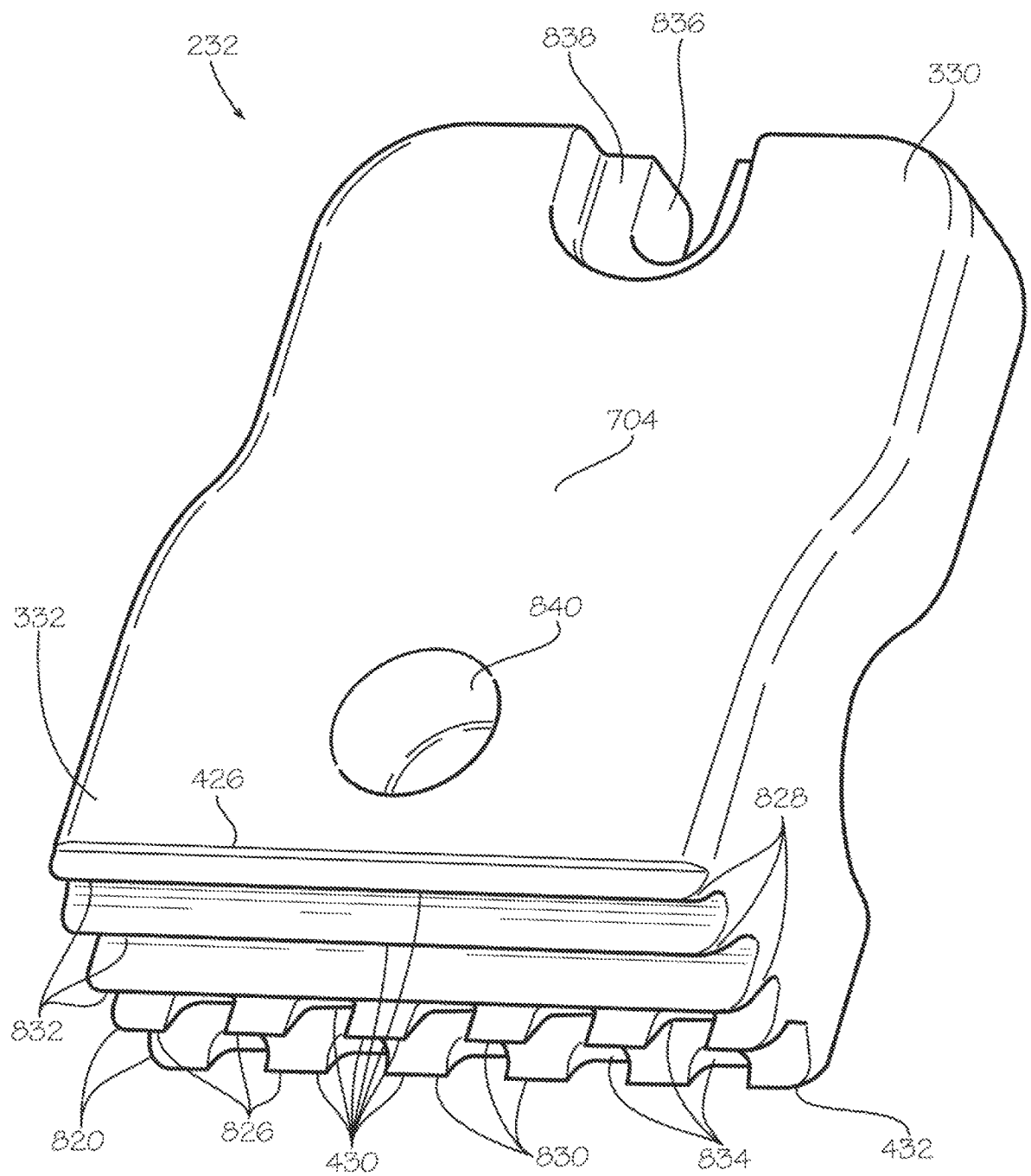
FIG. 8 is a perspective view of the gripper of the gland of FIG. 3.

FIG. 8 is a perspective view of the gripper 232 of FIG. 2. As shown, the plurality of gripping protuberances 430 can comprise teeth 826 and ribs 828. In the present aspect, the ribs 828 can be disposed proximate the trailing edge 426, and the teeth 826 can be disposed proximate the leading edge 428 (shown in FIG. 7). For example, the leading row 432 can be teeth 826 in the present aspect.

The ribs 828 can each define a rib knife edge 832 extending across a width of the respective rib 828. In the present aspect, the gripper 232 can define a width of 1.5", and the rib knife edges 832 can each define a length of 1.5" long; however, the width of the gripper 232 and the length of the rib knife edge 832 should not be viewed as limiting. The grippers 232 can range from 0.15" to 5" in width in various aspect, but can have widths outside this range in other aspects. The width can be dependent upon, for example and without limitation, an outside diameter of the pipe length 102 as well as a number of grippers 232 engaging the pipe length 102 and an operating pressure of the pipe length 102. In the present aspect, each rib knife edge 832 can be substantially linear; however in other aspects, each rib knife edge 832 can be curved or scalloped. For example, each rib knife edge 832 can be curved to compliment a radius of curvature of the outside diameter of the pipe length 102 in order to increase engagement area between each gripper 232 and the pipe length 102. In some aspects, each rib knife edge 832 can be serrated.

Each tooth 826 can define a tooth knife edge 830 extending across a width of the respective tooth 826. In other aspects, each tooth 826 can define a tooth point (not shown) instead of a tooth knife edge 830. In the present aspect, each tooth knife edge 830 can be linear; however, in other aspects, each tooth knife edge 830 can be curved or serrated. The teeth 826 can be separated by notches 834 disposed between adjacent teeth 826. The tooth knife edges 830, the tooth points (not shown), and the rib knife edges 832 can each be configured to dig into the outer pipe surface 204 (shown in FIG. 3). The teeth 826 can be separated by notches 834 disposed between adjacent teeth 826. The teeth 826 and notches 834 can be configured to reduce available contact area of the collective tooth knife edges 830 compared to the rib knife edges 832 which can increase contact pressure at the tooth knife edges 830 of the teeth 826. Increasing contact pressure at the tooth knife edges 830 of the teeth 826 can aid the teeth 826 in digging or cutting into the outer pipe surface 204.

In the present aspect, the teeth 826 can be arranged in two teeth rows 820; however, in other aspects, the teeth 826 may not be arranged in rows and instead can be positioned in other arrangements such as a staggered arrangement or any other suitable arrangement. Other aspects can comprise greater or fewer teeth rows 820. In the present aspect, the ribs 828 and the teeth rows 820 can be substantially parallel to the trailing edge 426; however in other aspects, the ribs 828 and the teeth rows 820 can be diagonally-oriented relative to the trailing edge 426. In some aspects, all of the gripping protuberances 430 can be teeth 826, and in other aspects, all of the gripping protuberances 430 can be ribs 828. The ribs 828 and teeth 826 can be disposed in any arrangement.

The second gripper surface 704 can define a gripper pocket 840 extending into the gripper 232. The gripper pocket 840 can be a blind hole which does not extend completely through the gripper 232. In the present aspect, the gripper 232 can be biased towards engagement with the pipe length 102 by the spring clip 333 (shown in FIG. 3); however, in other aspects, a coil spring (not shown) can be positioned within the gripper pocket 840, and the coil spring can bias the gripper 232 towards engagement with the pipe length 102. Alternatively, in some aspects, the gripper pocket 840 can receive the retention tab 324 (shown in FIG. 3) to locate and retain the spring clip 333.

A deactivation catch 836 can also be defined at the lever end 330 of the gripper 232. In the present aspect, the deactivation catch 836 can be a notch extending through the lever end 330 from the second gripper surface 704 to the first gripper surface 702 (shown in FIG. 7) and inward from the top gripper surface 706 (shown in FIG. 7). In other aspects, the deactivation catch 836 can be a through hole which extends through the lever end 330 from the second gripper surface 704 to the first gripper surface 702 but can be enclosed by the top gripper surface 706 to form an aperture rather than a notch. In other aspects, the deactivation catch 836 can be a blind hole which does not extend completely through the gripper 232 to the first gripper surface 702. The deactivation catch 836 can also define a countersunk shoulder 838 disposed around the notch, the through hole, or the blind hole. The deactivation catch 836 can be configured to engage some aspects of the deactivation mechanism 136, as shown and further described below with respect to FIGS. 13 and 14.

Figure 9:
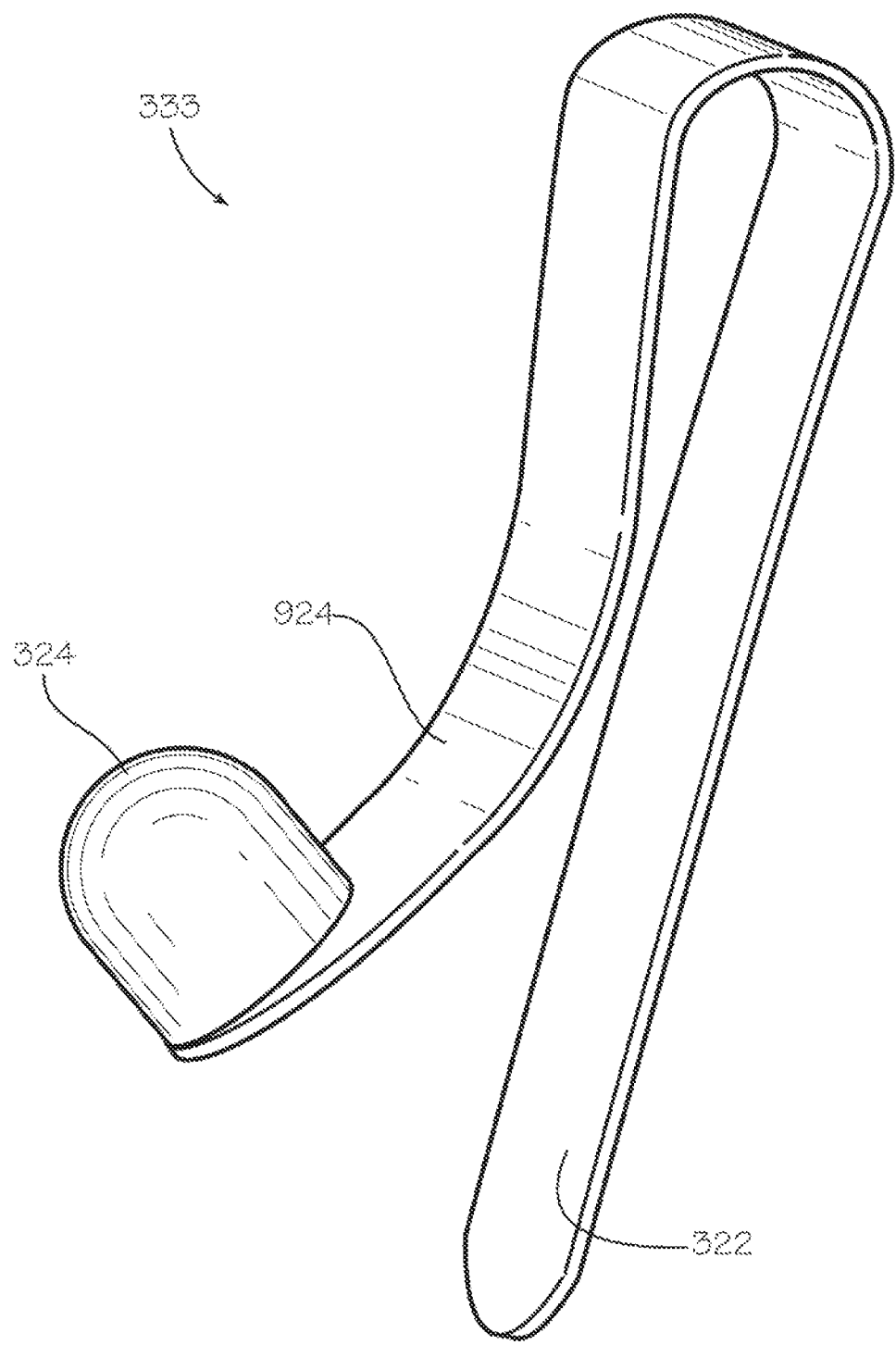
FIG. 9 is a perspective view of a spring clip of the gland of FIG. 3.

FIG. 9 is a perspective view of the spring clip 333 of FIG. 2. The retention tab 324 can be disposed on a retention leg 924. The retention leg 924 can be disposed opposite from the engagement leg 322. In some aspects, the retention tab 324 can define a slit (not shown) which can allow the retention tab 324 to spread apart in order to frictionally engage the locator bore 320 (shown in FIG. 3). In other aspects, the retention tab 324 can comprise petals (not shown) defined by intersecting slits configured to frictionally engage the locator bore 320. The spring clip 333 can demonstrate positional memory, and the engagement leg 322 can be configured to repeatedly elastically deform relative to the retention leg 924 without plastically deforming or taking a permanent set. The spring clip 333 can comprise a material such as spring steel or any other suitable material. In the present aspect, the spring clip 333 can be a flat spring or V-spring; however in other aspects, the spring clip 333 can be a wire spring or any other suitable type of spring.

Figure 10:
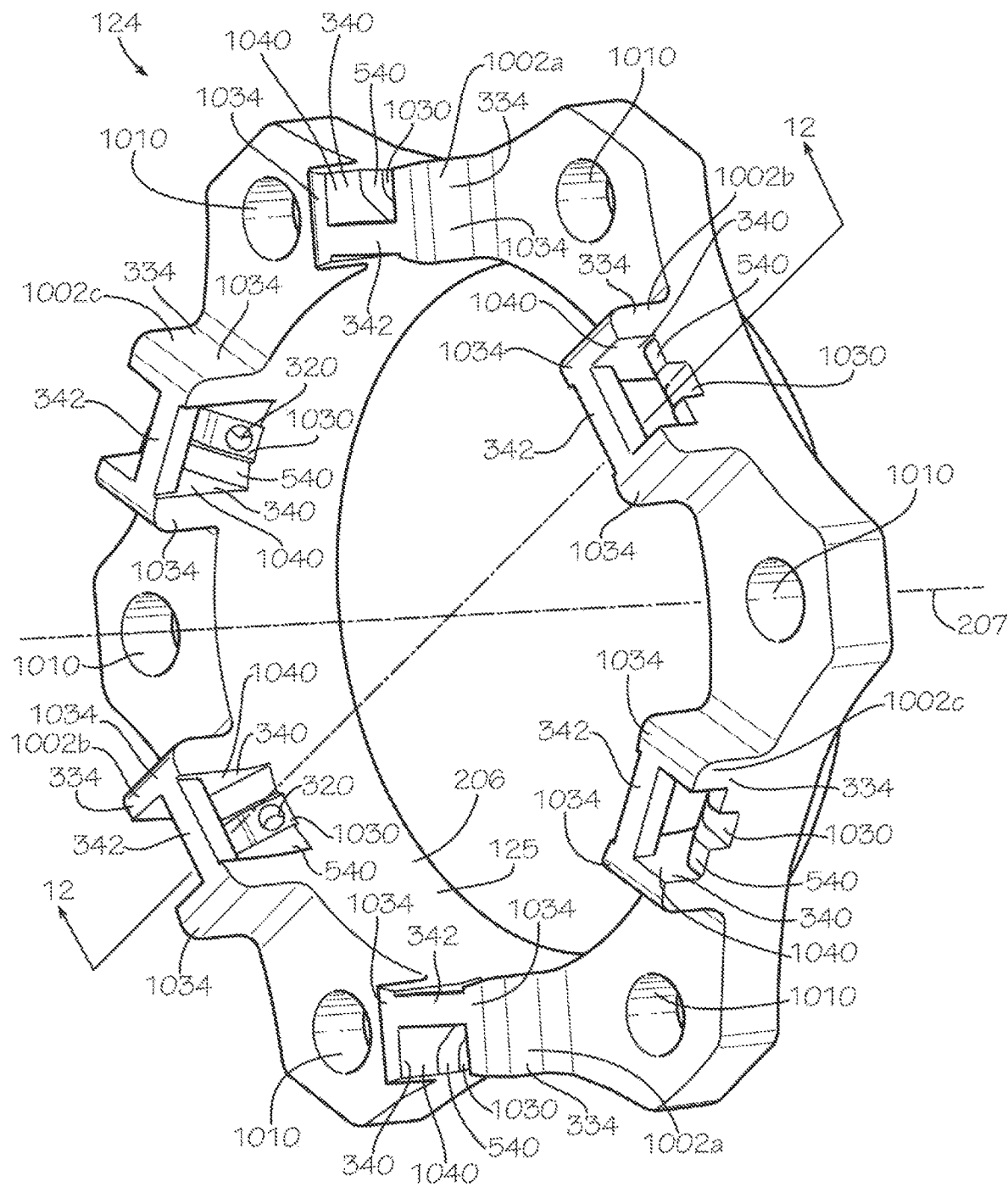
FIG. 10 is a perspective view of a gland of FIG. 3.

FIG. 10 is a perspective view of the gland 124 of FIG. 2. In the present aspect, the gland 124 can define six restraint bases 334. The number of restraint bases 334 should not be viewed as limiting, however. Each gland 124 can define greater or fewer than six restraint bases 334. The number of restraint bases 334 can also vary with a size of the gland 124. For instance, an aspect configured for use with a 24" diameter pipe can define more restraint bases 334 than an aspect configured for use with a 3" diameter pipe. In the present aspect, the restraint bases 334 can also be evenly distributed around the annular ring 125 of the gland 124, and the restraint bases 334 can be distributed as opposing pairs 1002a,b,c of restraint bases 334. In other aspects, such as when the gland 124 defines an odd number of restraint bases 334, the restraint bases 334 may not be distributed as opposing pairs.

Figure 11:
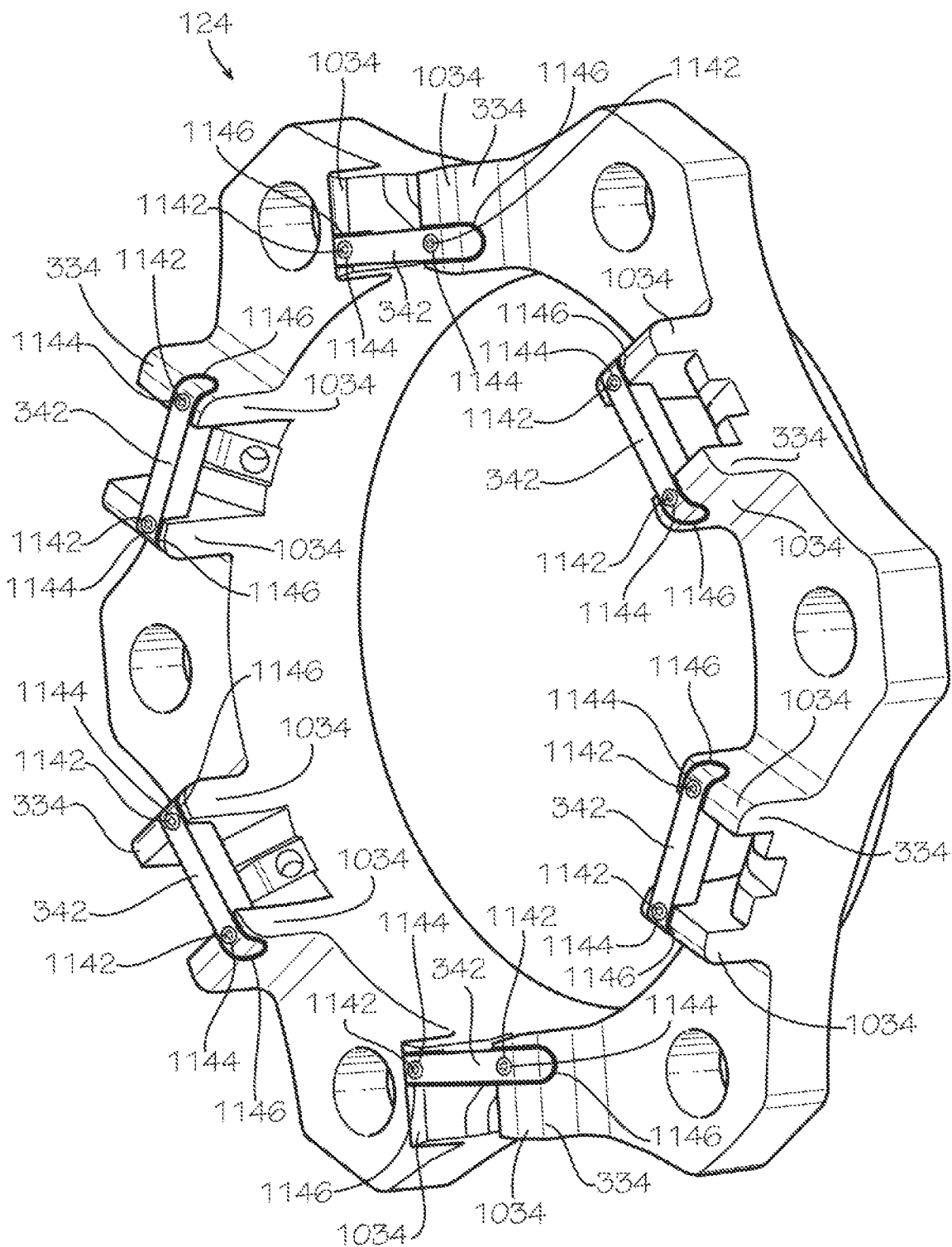
FIG. 11 is a perspective view of the gland in accordance with another aspect of the disclosure.

In the present aspect, each restraint base 334 can define a pair of sidewalls 1034 and the respective restraint pivot 342. In the present aspect, the sidewalls 1034 and the restraint pivot 342 can be integrally formed with the gland 124. In other aspects, the restraint base 334 can be a separate component which can be fastened or attached to the gland 124. In the aspect of FIG. 11, the sidewalls 1034 of the restraint base 334 can be integrally formed with the gland 124, and the restraint pivot 342 can be a separate component fastened to the sidewalls 1034. In other aspects, each restraint base 334 can define multiple restraint pivots 342, and multiple grippers 232 (shown in FIG. 3) can be disposed within each restraint pocket 340. In some other aspects, multiple grippers 232 can be engaged with a single restraint pivot 342.

The sidewalls 1034 of each restraint base 334 can define a pair of sidewall surfaces 1040. In the present aspect, the sidewall surfaces 1040 of each restraint base 334 can be substantially parallel and can be in a facing relationship. The stop surface 540 can be substantially perpendicular to the sidewall surfaces 1040, and the stop surface 540 can extend between the sidewall surface 1040. The sidewall surfaces 1040 and the stop surface 540 of each restraint base 334 can define the respective restraint pocket 340.

The stop surface 540 of each restraint base 334 can define a spring groove 1030 recessed into the respective stop surface 540, and the locator bores 320 can be disposed within the respective spring grooves 1030. The spring grooves 1030 and the locator bores 320 can cooperate to position and retain the spring clips 333 (shown in FIG. 3) within each restraint pocket 340, respectively. The gland 124 can also define a plurality of fastener holes 1010, each configured to receive a one of the fasteners 126.

FIG. 11 is a perspective view of another aspect of the gland 124. In the present aspect, the restraint pivots 342 can be a separate component which can each be attached to the respective restraint base 334 by a pair of fasteners 1142. In the present aspect, the fasteners 1142 can be socket-head screws which can extend through a pair of countersunk bores 1144 defined by each restraint pivot 342 and into the respective sidewalls 1034. Each sidewall 1034 can define a pivot notch 1146 sized and shaped complimentary to the restraint pivots 342. Each restraint pivot 342 can be received and secured within a pair of pivot notches 1146 of each respective restraint bases 334. Removable restraint pivots 342 can be desirable in some aspects in order to provide for easier manufacturing methods. The removable restraint pivots 342 can also be made of a different material from the gland 124. For example, the gland 124 can comprise cast iron, and the removable restrain pivots 342 can comprise a material such as bronze which demonstrates desirable bearing properties such as high hardness values and low friction coefficients. Removable restraint pivots 342 can also be used with aspects of the grippers 232 which define gripper bearing bores (not shown) rather than gripper bearing surfaces 346. In such aspects, the removable restraint pivots 342 can be passed through the gripper bearing bores in order to mount the grippers 232.

Figure 12A:
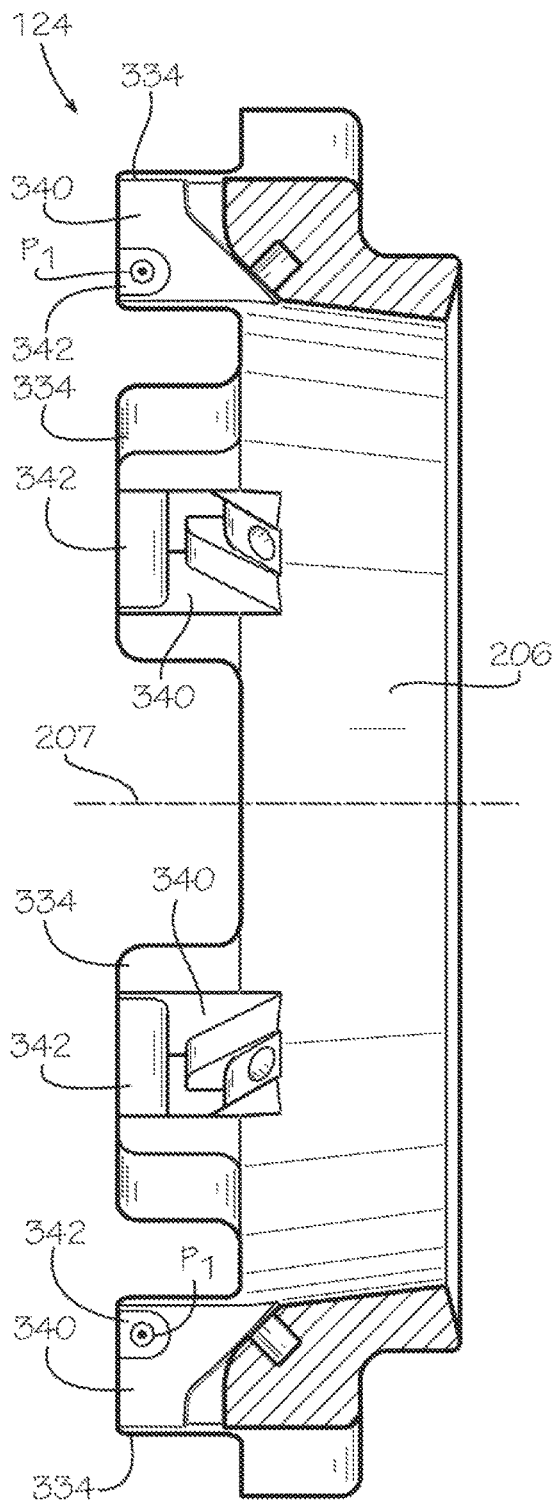
FIG. 12A is a cross-sectional view of the gland of FIG. 3 taken along line 12-12 shown in FIG. 10.
Figure 12B:
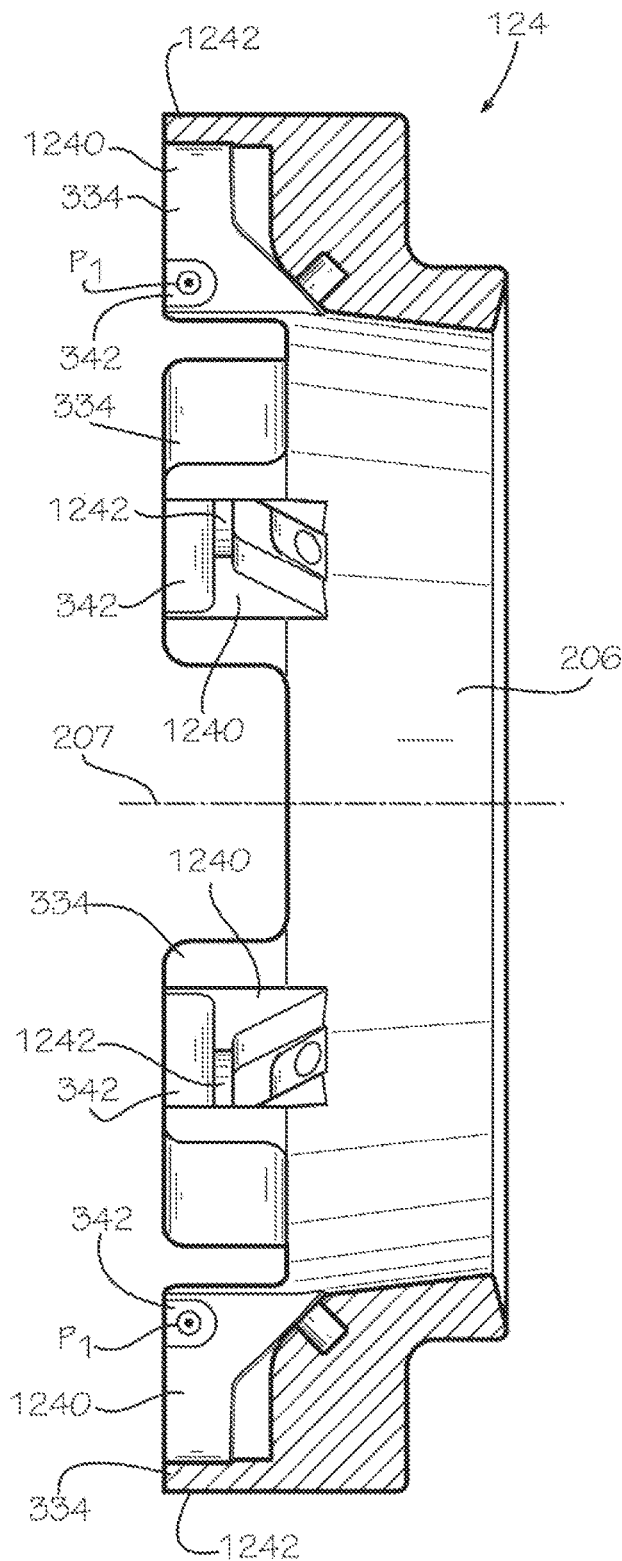
FIG. 12B is a cross-sectional view of the gland in accordance with another aspect of the disclosure.

FIG. 12A is a cross-sectional view of the gland 124 of FIG. 2 taken along line 12-12 shown in FIG. 10. FIG. 12B is a cross-sectional view of another aspect of the gland 124. As shown in FIG. 12B, the restraint bases 334 can each comprise a pocket hood 1242, and the restraint bases 334 can each define a hooded restraint pocket 1240. Each pocket hood 1242 can be disposed radially external to the respective hooded restraint pocket 1240, and each pocket hood 1242 can cover a radially outer portion of the respective hooded restraint pocket 1240. The pocket hoods 1242 can be configured to protect the hooded restraint pockets 1240 against entry of debris, such as when the piping element assembly 100 (shown in FIG. 1) is buried underground. Debris in the restraint pockets 340 or hooded restraint pockets 1240 can jam the grippers 232 (shown in FIG. 3) and spring clips 333 (shown in FIG. 3) and prevent the grippers 232 from rotating about the respective restraint pivots 342. As previously described, the pivot center axis $P_1$ of each restraint pivot 342 can be perpendicular to both the axial direction and the radial direction with respect to the gland axis 207.

Figure 13:
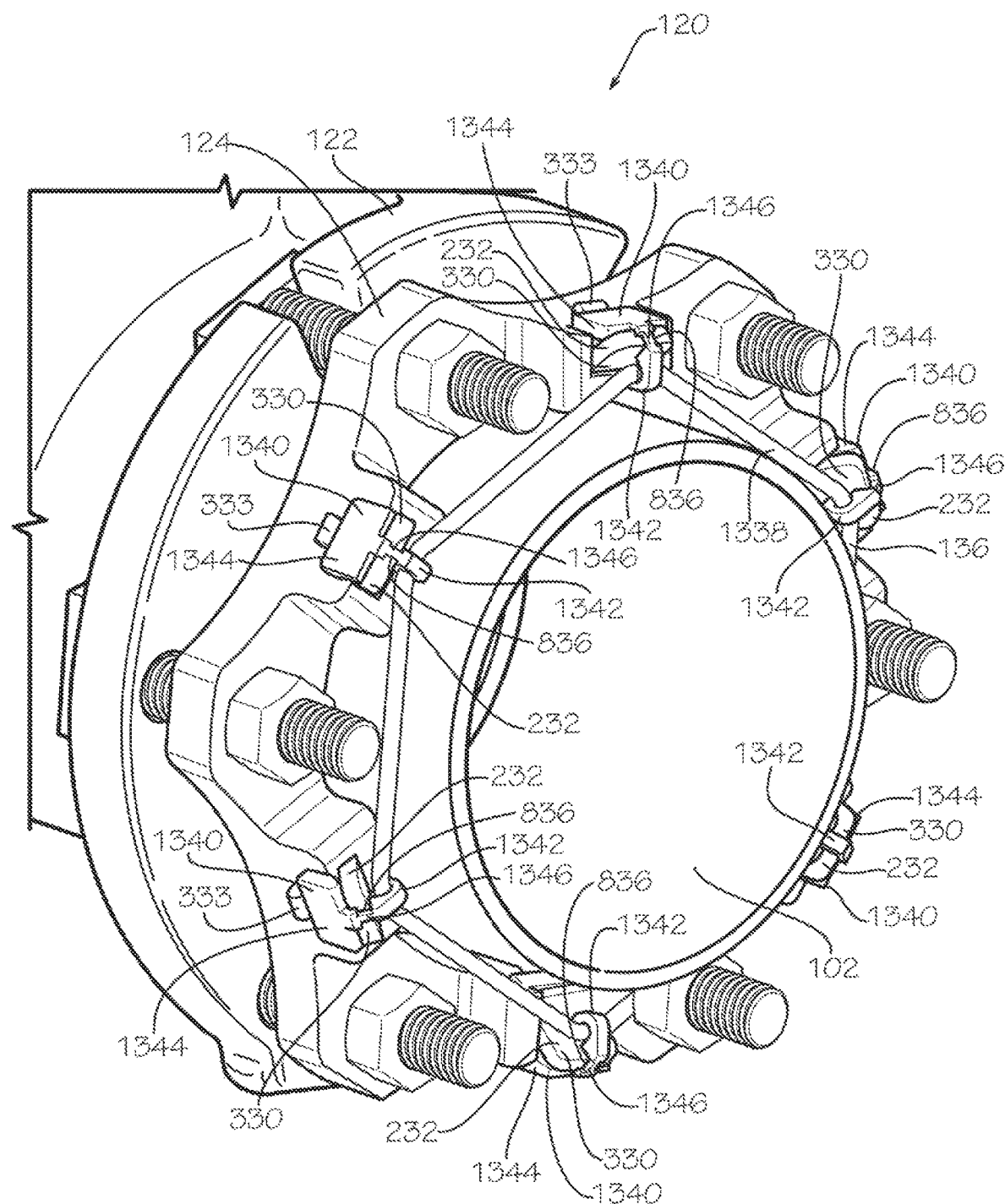
FIG. 13 is a perspective view of the mechanical joint of FIG. 3 comprising a deactivation mechanism in accordance with one aspect of the disclosure.

FIG. 13 is a perspective view of the mechanical joint 120 of FIG. 1 comprising another aspect of the deactivation mechanism 136. The deactivation mechanism 136 of the present aspect can comprise an elastic member 1338, such as an O-ring, a rubber band, a bungee cord, or any other suitable stretchable material. The deactivation mechanism 136 can further comprise a plurality of deactivation blocks 1340 which can each be attached to the elastic member 1338 by a hooked portion 1342 of each respective deactivation block 1340. Each deactivation block 1340 can further define a blocking portion 1344 and a neck portion 1346, and the neck portion 1346 can be defined between the blocking portion 1344 and the hooked portion 1342, thereby connecting the blocking portion 1344 to the hooked portion 1342.

The neck portion 1346 can be sized and shaped to engage the deactivation catch 836 defined by each gripper 232. Under tension from the elastic member 1338, engagement between the deactivation catches 836 and neck portions 1346 at each gripper 232 can bias the grippers 232 towards the deactivated position shown and described with respect to FIG. 3. The blocking portion 1344 can also fit between the lever end 330 of each gripper 232 and the respective spring clip 333. The blocking portion 1344 can provide a positive stop to prevent the grippers 232 from rotating towards the engagement position. The blocking portions 1344 can also cover and protect the restraint pockets 340 (shown in FIG. 3) to prevent debris from entering the restraint pockets 340. In some aspects, the blocking portions 1344 can define a wedge-shape configured to be inserted into the respective restraint pocket 340.

To activate the mechanical joint 120, each of the deactivation blocks 1340 can be disengaged from the respective gripper 232. The deactivation mechanism 136 can be left around the pipe length 102 as a method to store the deactivation mechanism 136 should the mechanical joint 120 need to be disassembled in the future. Alternatively, the elastic member 1338 can be cut, and the deactivation mechanism 136 can be removed from the mechanical joint 120 and pipe length 102. Attaching each deactivation block 1340 to the elastic member 1338 can ensure that no deactivation blocks 1340 are accidentally left on the mechanical joint 120 after removal. In the present aspect, the deactivation blocks 1340 can also be configured to automatically eject from the respective restraint pockets 340 (shown in FIG. 3) when tension from the elastic member 1338 is relieved.

Figure 14:
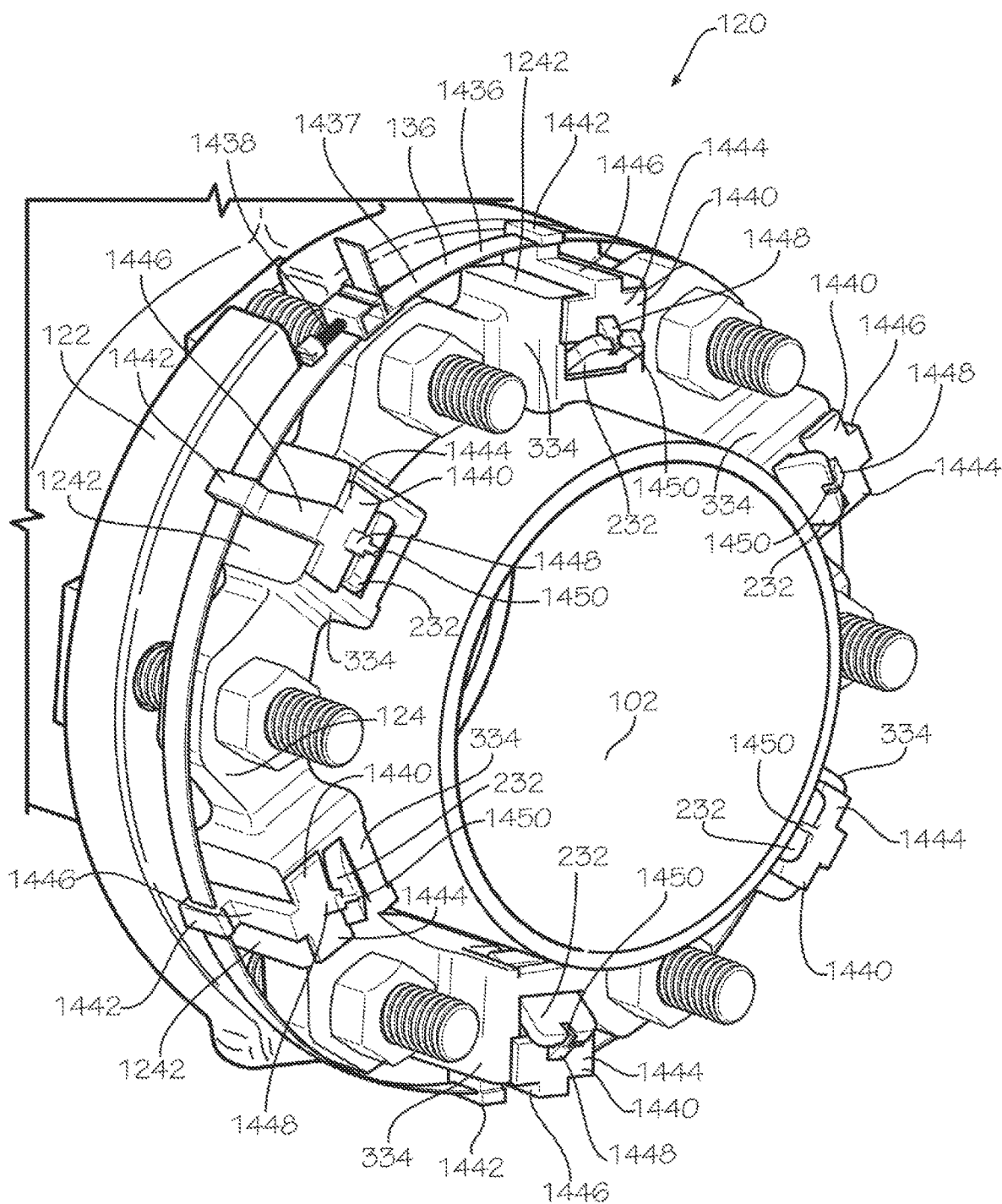
FIG. 14 is a perspective view of the mechanical joint of FIG. 3 comprising the gland of FIG. 12B and the deactivation mechanism in accordance with another aspect of the disclosure.

FIG. 14 is a perspective view of the mechanical joint 120 of FIG. 1 comprising the gland 124 of FIG. 12B and another aspect of the deactivation mechanism 136. In the present aspect, the deactivation mechanism 136 comprises a clamp 1436, such as a pipe clamp or hose clamp. The clamp 1436 can comprise a band 1437 and a tensioner 1438. The band 1437 can be a metal band, a plastic band, a composite strap, or any other suitable strap or banding material. The tensioner 1438 can be configured to tighten the band 1437 or relax the band 1437, such as for installation and removal of the deactivation mechanism 136, respectively. The tensioner 1438 can be a jack bolt, a worm gear, a turnbuckle, or any other suitable tensioning mechanism. In other aspects, the clamp 1436 may not comprise a tensioner 1438, and instead can comprise a buckle. In such aspects, the band 1437 can be tensioned by a separate tensioning device and secured by the buckle.

The deactivation mechanism 136 can comprise deactivation blocks 1440 which can be attached to the band 1437 by a hooked portion 1442 of each deactivation block 1440. The deactivation block 1440 can further define a neck portion 1446 and a blocking portion 1444. The neck portion 1446 can be defined between the hooked portion 1442 and the blocking portion 1444. The clamp 1436 can secure the hooked portion 1442 and the neck portion 1446 in facing contact with the pocket hood 1242 of each respective restraint base 334. The blocking portion 1444 can further cover the hooded restraint pocket 1240 (shown in FIG. 12B) of each restraint base 334. Each blocking portion 1444 can prevent debris from entering the respective hooded restraint pocket 1240 and also block the respective gripper 232 from rotating into engagement with the pipe length 102.

Each deactivation block 1440 can further define a blocking arm 1448 and a blocking post 1450 extending from the respective blocking portion 1444. The blocking arm 1448 can be wider than the blocking post 1450, and the blocking arm 1448 can be configured to engage the countersunk shoulder 838 (shown in FIG. 8) and the blocking post 1450 can be configured to extend into the deactivation catch 836 (shown in FIG. 8) of the respective gripper 232. The blocking portion 1444, the blocking arm 1448, and the blocking post 1450 can cooperate to prevent engagement between the respective gripper 232 and the pipe length 102 by blocking the rotating motion of the respective gripper 232.

In other aspects, individual deactivation blocks (not shown) can comprise the blocking portion 1444, the blocking arm 1448, and the blocking post 1450 without being attached to the neck portion 1446. The individual deactivation blocks can individually engage a one of the grippers 232 without the use of an elastic member or clamp and can be retained by the force of the spring clip 333 (shown in FIG. 3). In other aspects such as with the gland 124 of FIG. 10, the individual deactivation blocks can engage the restraint pocket 340 to remain in position.

In practice, to couple the pipe length 102 to the piping element 110, the gland 124 in the deactivated configuration can first be slid over the plain end 302 of the pipe length 102 with the engagement bevel 326 facing the plain end 302. The gasket 228 can then be slid over the plain end 302 of the pipe length 102, and the plain end 302 can be inserted into the socket 222 until the plain end 302 contacts the pipe shoulder 323. The gasket 228 can be positioned in the gasket groove 325. The fasteners 126 can be inserted through the notches 128 or bores 130 of the element flange 122 and through the corresponding fastener holes 1010 of the gland 124.

The fasteners 126 can be tightened, thereby drawing the gland 124 towards the element flange 122 and compressing the gasket 228 within the gasket groove 325. Compressing the gasket 228 can press an inner gasket surface 328 of the gasket 228 against the outer pipe surface 204 of the pipe length 102, thereby forming a seal between the gasket 228 and the pipe length 102. Once the gland 124 has been fastened to the element flange 122, and the seal between the gasket 228 and the pipe length 102 has been formed, the deactivation mechanism 136 can be removed from the gland 124, thereby activating the joint restraint assemblies 134. Upon activation of the joint restraint assemblies 134, the gripper 232 of each joint restraint assembly 134 can rotate about the respective restraint pivot 342 to engage the pipe length 102. Once engaged with the pipe length 102, the joint restraint assemblies 134 can allow limited movement of the pipe length 102 in the withdrawal direction 399; however, the joint restraint assemblies 134 prevent removal of the pipe length 102 from the socket 222. In this context, the term "removal" indicates complete withdrawal of the pipe length 102 from the socket 222.

Upon activation of the joint restraint assemblies 134, each gripper 232 self-adjusts and engages the pipe length 102 based on variables such as the outside diameter of the pipe length 102, the ovality of the pipe length 102, and the angular deflection of the pipe length 102 from the gland axis 207. For example, if the pipe length 102 demonstrates a high degree of ovality, upon activation some of the grippers 232 can rotate to the initial engagement position while other grippers can rotate to a position between the initial engagement position and the final engagement position. In situations in which the outer diameter of the pipe length 102 is significantly undersized, the grippers 232 can rotate to the final engagement position upon initial activation. As the pipe length 102 moves in either the insertion direction 398 or the withdrawal direction 399 or angularly deflects relative to the gland axis 207, the joint restraint assemblies 134 individually adjust to increase engagement and stress on the pipe length 102 as needed or to decrease engagement and relieve stress on the pipe length 102 if not required to restraint the pipe length 102. The self-adjusting nature of the joint restraint assemblies 134 can be desirable over other joint restraint methods which induce high levels of residual stress in pipe lengths 102 which can lead to cracking, creep and deformation, or failure over time of the connection.

In some applications, the engagement ends 332 of the grippers 232 can be treated with a substance or a chemical which can bond the gripping protuberances 430 to the outer pipe surface 204. For example, an adhesive such as a cement, an epoxy, a glue, a mastic, or any other suitable adhesive can be applied to the grippers 232 to bond the gripping protuberances 430 to the pipe lengths 102. Another example, a chemical agent configured to react and soften the material of the pipe lengths 102 can be applied to the gripping protuberances 430, and the grippers 232 can chemically weld to the outer pipe surface 204 upon re-hardening of the material of the pipe length 102.

The joint restraint assemblies 134 can also be desirable over connection methods which require special end configurations for the pipe lengths 102 rather than plain ends 302. For example, some connection methods require that the pipe length 102 define a feature such as a flange, groove, or threading at the end of the pipe length 102. Unfortunately, in field environments, a required length of the pipe length 102 for a given application can vary, and therefore the pipe lengths 102 cannot be provided off-the-shelf in the required length for each application. Consequently, the ends of the pipe lengths 102 must be prepared in the field for such methods, such as by welding on a flange, machining a groove, or cutting threads. Such methods can be time consuming and require expensive equipment and skilled labor to perform in the field. By contrast, with the mechanical joint 120 and the joint restraint assemblies 134 shown, the pipe length 102 can simply be cut to the required length, and the mechanical joint 120 can be quickly completed with only a wrench or other simple hand tools.

The joint restraint assemblies 134 are not limited to use in mechanical joints 120, and the joint restraint assemblies 134 can be disposed directly on the piping element 110 rather than on the gland 124. For example, the piping element 110 can be a coupling which forms a seal with the pipe lengths 102 by a means other than compressing the gasket 228 with the gland 124. In such application, the joint restraint assemblies 134 can be attached directly to the pipe coupling. In other aspects, the joint restraint assembly 134 can be attached to piping elements 110 such as valves, hydrants, couplings, fittings, or other suitable types of piping elements.

The gland 124 and the grippers 232 can comprise a material such as cast iron, ductile iron, steel, brass, metal, plastic, or any other suitable material. In some aspects, the grippers 232 can be heat treated to strengthen the gripping protuberances 430. In the present aspect, either or both of the gland 124 and the grippers 232 can be manufactured by a casting operation such as investment casting, die casting, sand casting, or any other suitable method of casting. In some aspects, a mold used to cast either or both of the gland 124 and the grippers 232 can be made through an additive manufacturing process such as 3D sand printing. In other aspects, either or both of the gland 124 and the grippers 232 can be formed by an additive manufacturing process such as 3D printing. In some aspects, either or both of the gland 124 and the grippers 232 can be formed by a metalworking process such as forging, sintering, metal injection molding, machining, or any other suitable process. The pipe lengths 102 can comprise a material such as polyvinyl chloride, chlorinated polyvinyl chloride, fiber-reinforced plastic, polypropylene, polyethylene, polybutylene, steel, iron, brass, copper, stainless steel, or any other suitable material.

Figure 15A:
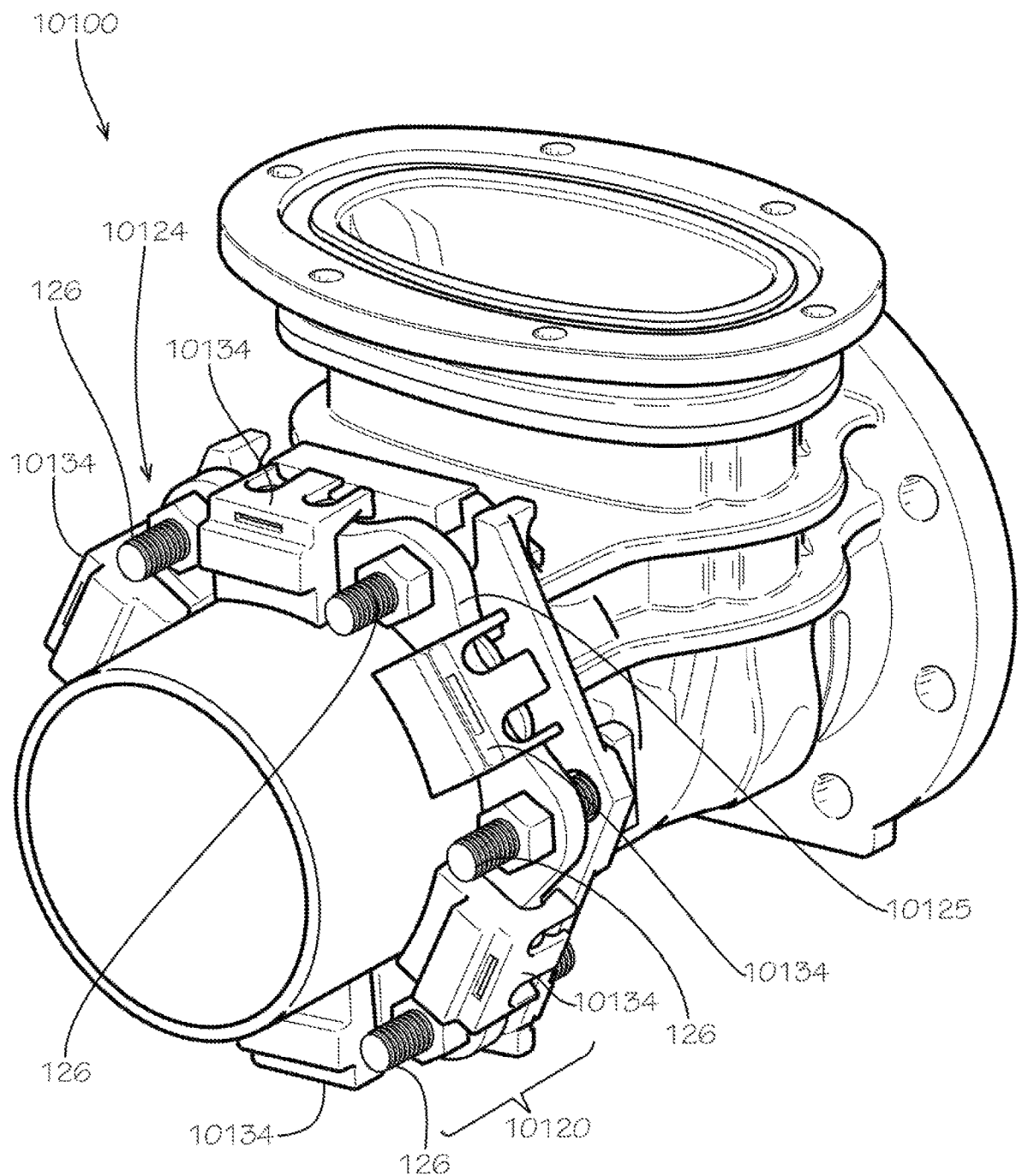
FIG. 15A is a perspective of a piping element assembly in accord with one aspect of the current disclosure.
Figure 15B:
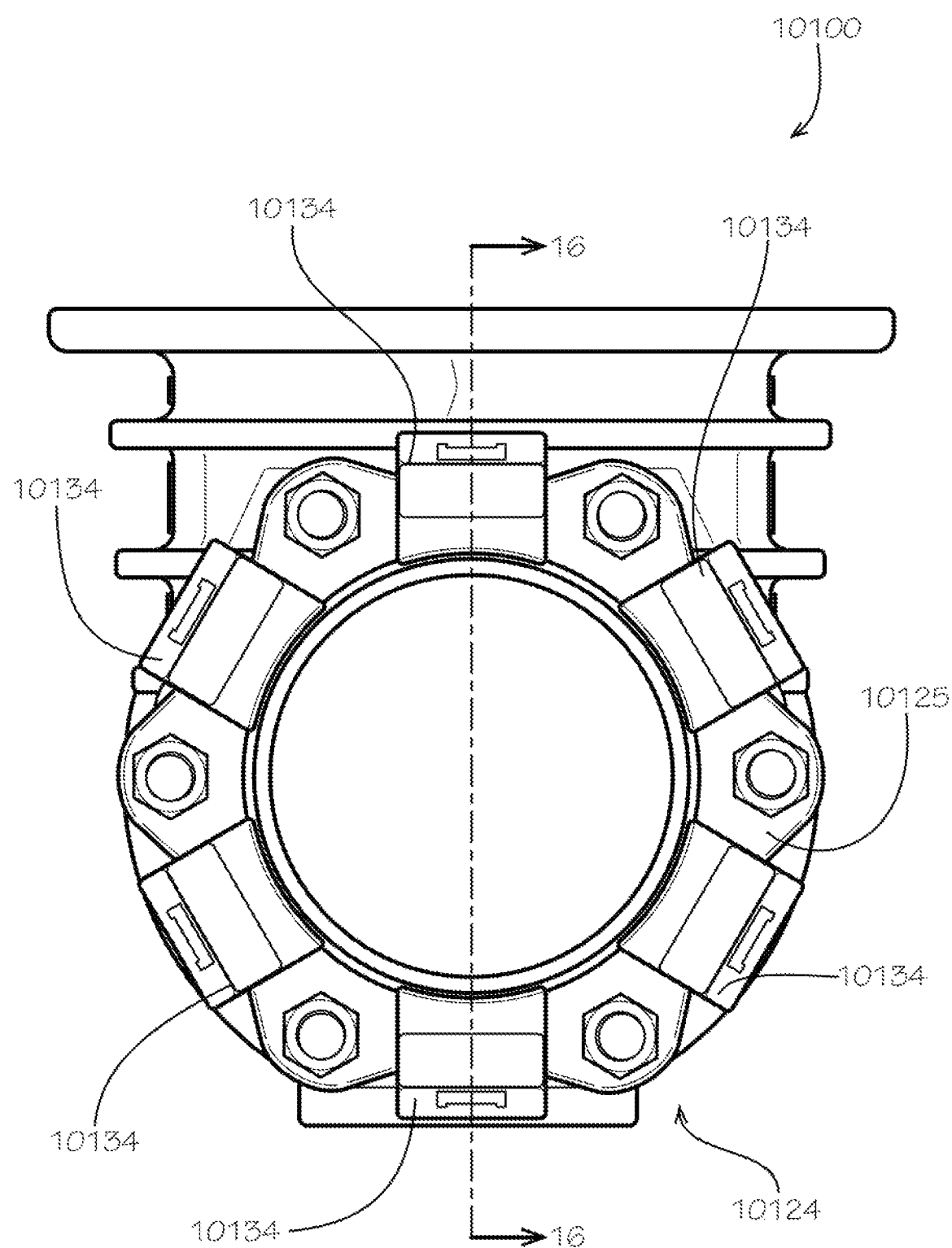
FIG. 15B is a side view of the piping element assembly of FIG. 15A.

With reference to FIGS. 15A and 15B, in another aspect of the disclosure, a piping element assembly 10100 can comprise various arrangements and elements similar to piping element assembly 100. Features similarly drawn but not described can be understood by one of skill in the art to be coordinating, and various features and elements can be similar between the various aspects. The piping element assembly 10100 can comprise piping element 10110 and a mechanical joint assembly 10120, among other possible components. The mechanical joint assembly 10120 can comprise a gland 10124, which itself can comprise an annular ring 10125 and a plurality of joint restraint assemblies 10134. In the present aspect, the gland 10124 can comprise six joint restraint assemblies 10134; however, the quantity of joint restraint assemblies 10134 should not be viewed as limiting, and the gland 10124 can comprise greater or fewer joint restraint assemblies 10134 in other aspects. In the present aspect, the joint restraint assemblies 10134 can be equally spaced about a circumference of the annular ring 10125; however, this distribution should not be viewed as limiting, and the joint restraint assemblies 10134 can be distributed in any suitable arrangement.

Figure 16:
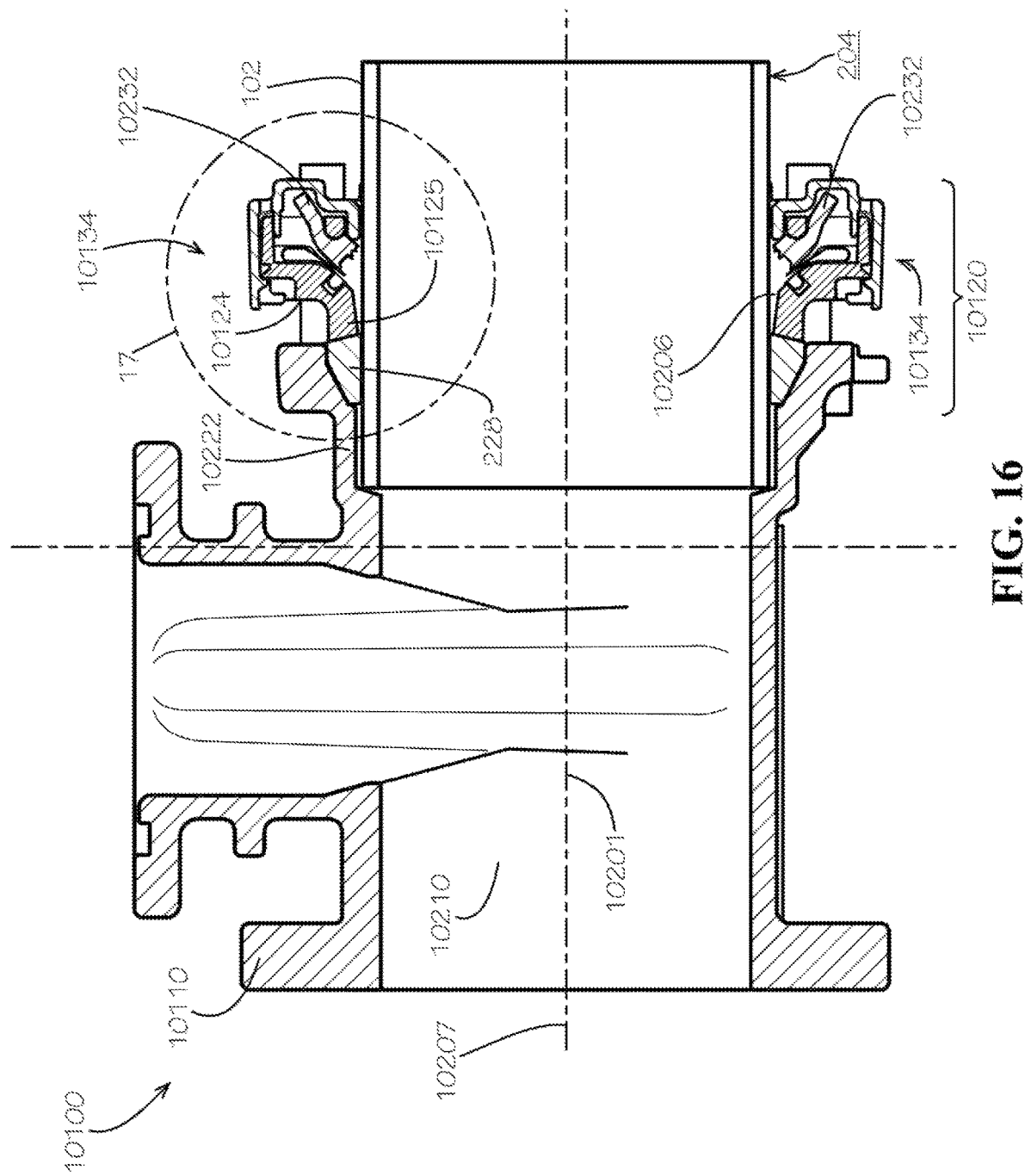
FIG. 16 is a cross-sectional view of the piping element assembly of FIG. 15A taken along line 16-16 shown in FIG. 15B.

As seen with reference to FIG. 16, the annular ring 10125 of the gland 10124 can define a gland bore 10206. The gland bore 10206 can define a gland axis 10207 which can be substantially coincident with an element bore axis 10201 of an element bore 10210 of the piping element 10110 such that the gland bore 10206 and the element bore 10210 can be coaxial. In various aspects, the gland axis 10207 can be out of alignment with the element bore axis 10201. Pipe length 102 can extend through the gland bore 10206 into a socket 10222 of the piping element 10110. The pipe length 102 can be substantially coaxial with the gland axis 10207 and the element bore axis 10201, although in various aspects the elements can be out of alignment.

The mechanical joint 10120 of the pipe element assembly 10100 can further comprise the gasket 228. The gasket 228 can be disposed axially between the piping element 10110 and the gland 10124 within the socket 10222. The gasket 228 can be configured to seal against the outer pipe surface 204 defined by the pipe length 102.

As will be discussed in greater detail to follow, the gland 10124 can be configured in various arrangements, including a prepared or deactivated arrangement or position, an initial engagement arrangement or position, and a final engagement arrangement or position. The initial engagement position and the final engagement position can both be termed "activated positions" or "engagement positions," as a gripper 10232 can be unrestrained with the gland 10124 in these positions. The gripper 10232 of each of the joint restraint assemblies is seen in FIG. 16 in a prepared arrangement. The joint restraint assembly 10134 can be positioned to engage the outer pipe surface 204 in various arrangements. In various arrangements, the grippers 10232 can be positioned in final engagement position to prevent withdrawal of the pipe length 102 from the socket 10222.

Figure 17:
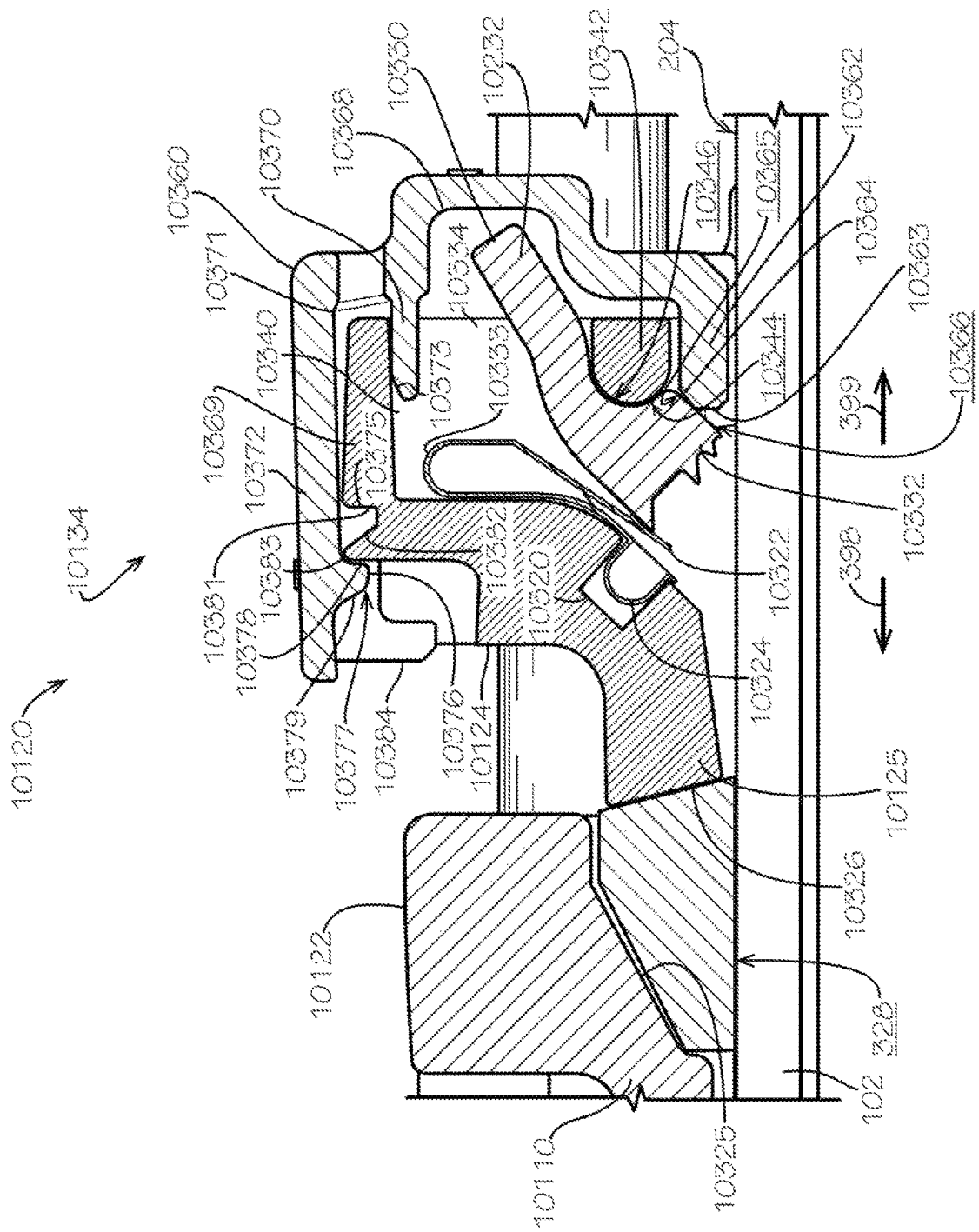
FIG. 17 is a detail view of a mechanical joint of the piping element assembly of FIG. 15A in a deactivated position as annotated by Detail 17 in FIG. 16.

As seen with reference to FIG. 17 and with returning reference to FIG. 16, the gland 10124 in the present aspect can be placed in the prepared or deactivated configuration. As such, each joint restraint assembly 10134 can be in the prepared or deactivated configuration, and the gripper 10232 can thereby be placed in the disengaged position which allows the pipe length 102 to freely move into the socket 10222 in the insertion direction 398 or outwards from the socket 10222 in the withdrawal direction 399.

The pipe element 10110 can define a gasket groove 10325. The gasket groove 10325 can define a taper, and the gasket groove 10325 can define a substantially triangular or trapezoidal profile. The gasket groove 10325 can be shaped to receive the gasket 228. The annular ring 10125 of the gland 10124 can be configured to engage the gasket 228. The annular ring 10125 can define an engagement bevel 10326. The engagement bevel 10326 can be substantially frustoconical in shape, and the engagement bevel 10326 can face radially inward with respect to the bore axis 201 and the gland axis 10207 (both shown in FIG. 16). Tightening of the fasteners 126 can draw the gland 10124 towards an element flange 10122 of the pipe element 10110, thereby compressing the gasket 228 in the gasket groove 10325. The engagement bevel 10326 and the taper of the gasket groove 10325 can cooperate to compress and deform the gasket 228 radially inward with respect to the bore axis 201 and gland axis 10207. Compression and deformation of the gasket 228 can press the inner gasket surface 328 of the gasket 228 against the outer pipe surface 204, thereby engaging the gasket 228 and creating a seal between the gasket 228 and the outer pipe surface 204. With the gasket 228 compressed, friction between the inner gasket surface 328 and the outer pipe surface 204 can resist movement of the pipe length 102 in both the insertion direction 398 and the withdrawal direction 399.

As shown in FIG. 17, each joint restraint assembly 10134 can comprise a restraint base 10334, a spring clip 10333 substantially similar to spring clip 333, at least one of the grippers 10232, and a cover 10360. The joint restraint assembly 10134 can be assembled on the restraint base 10334. In the present aspect, the restraint base 10334 can be integrally defined by the gland 10124; however in other aspects, the restraint base 10334 can be a separate component which can be attached or fastened to the annular ring 10125 of the gland 10124. In some aspects, a position of the restraint base 10334 on the annular ring 10125 can be adjusted, such as by moving the restraint base 10334 radially inward or outward relative to the gland axis 10207. Such adjustment can allow the gland 10124 to be configured for different sizes of pipe lengths 102 having different outer diameters. In some aspects, the restraint bases 10334 can also be adjusted on the annular ring 10125 axially relative to the gland axis 10207. The restraint base 10334 can define a restraint pocket 10340 and a restraint pivot 10342. The gripper 10232 and the spring clip 10333 can be disposed within the restraint pocket 10340.

The gripper 10232 can rotate about the restraint pivot 10342 such that the engagement end 10332 of the gripper 10232 can be drawn into and out of contact with the outer pipe surface 204. The gripper 10232 can define a gripper bearing surface 10346, and the restraint pivot 10342 can define a restraint bearing surface 10344. The gripper bearing surface 10346 can be shaped complimentary to the restraint bearing surface 10344, and the gripper bearing surface 10346 can be in facing contact with the restraint bearing surface 10344. The gripper bearing surface 10346 can be configured to slide around the restraint bearing surface 10344 as the gripper 10232 rotates about the restraint pivot 10342.

The gripper 10232 can define the engagement end 10332 and a lever end 10330. The engagement end 10332 can be disposed opposite from the lever end 10330 with the gripper bearing surface 10346 defined between the engagement end 10332 and the lever end 10330. The engagement end 10332 can extend into the gland bore 10206 towards the gland axis 10207. The spring clip 10333 can bias the gripper 10232 to rotate about the restraint pivot 10342 towards engagement with outer pipe surface 204. Specifically, an engagement leg 10322 of the spring clip 10333 can press on the gripper 10232 at an area proximate the engagement end 10332 of the gripper 10232. A retention tab 10324 of the spring clip 10333 can engage a locator bore 10320 defined by the restraint base 10334. The engagement of the retention tab 10324 with the locator bore 10320 can position and secure the spring clip 10333 within the restraint pocket 10340, and the spring clip 10333 can thereby maintain the engagement between the gripper 10232 and the restraint pivot 10342.

The cover 10360 provided can help isolate the elements of the joint restraint assembly 10134 to prevent dirt, various fluids, and debris from compromising the functioning of the gripping mechanism. The cover 10360 can also help prevent unnecessary tampering with the joint restraint assembly 10134.

As seen in FIG. 17, the cover 10360 can include a stop leg 10362. In the current aspect, the stop leg 10362 can provide a point of contact between the cover 10360 and the gripper 10232. In the current aspect, the cover 10360 can comprise a chamfer 10364 at a contact end 10363. The chamfer 10364 can be arranged at an angle to provide a contact surface 10365 to engage a contact surface 10366 of the gripper 10232. When the contact surface 10365 is engaged against the contact surface 10366 in the position shown, the cover 10360 can provide mechanical resistance against the spring force of the spring clip 10333, which can be biased toward engagement of the gripper 10232 with the outer pipe surface 204. The cover 10360 can define a lever recess 10368 that can provide space for the lever end 10330 of the gripper 10232. In the current aspect, the gland 10124 can comprise an outer wall 10369 that partially defines the restraint pocket 10340 along a radially outward extent of the restraint base 10334. The outer wall 10369 can assist the cover 10360 in preventing dirt and debris from compromising the functioning of the gripping mechanism. The outer wall 10369 in the current aspect can by tapered to improve its ability to engage with the cover 10360. The cover 10360 can comprise a movement guide arm 10370. In the current aspect, the movement guide arm 10370 can extend from the cover 10360 and can be shaped to nest within the outer wall 10369 and within the restraint pocket 10340. A cover engagement wall 10372 of the cover 10360 can extend over a portion of the gland 10124. The cover engagement wall 10372 and the guide arm 10370 together can define a guide recess 10371. In the current aspect, the guide recess 10371 can be sized to accept the outer wall 10369. The guide arm 10370 can include a chamfer 10373 to assist in locating the outer wall 10369 within the guide recess 10371.

The gland 10124 can define a tab stop locator 10375. In the current aspect, the tab stop locator 10375 can be a groove, a hole, or various other locating definition. The cover engagement wall 10372 can comprise a tab stop 10377 that extends radially inwardly from the cover engagement wall 10372 toward the gland 10124. In the current aspect, the tab stop 10377 can comprise a frontal wall 10378 that can be arranged as a flat plane extending radially inwardly. The tab stop 10377 can also comprise a slope 10379 that is angled with respect to the frontal wall 10378. The frontal wall 10378 and the slope 10379 can come together at an end 10376 of the tab stop 10377. In the current aspect, the tab stop locator 10375 can also comprise a radial wall 10381 and a slope wall 10382. The slope wall 10382 leads to an end 10383 of the tab stop locator 10375. The radial wall 10381 in the current aspect can be sized and arranged about equivalently to the frontal wall 10378 and the slope wall 10382 can be sized and arranged about equivalently to the slope 10379 such that, in various engagement positions, the tab stop 10377 can fit within the tab stop locator 10375. In the current aspect, it should be noted that that features of the tab stop 10377 can comprise curvature, such as various fillets and radii. The various curves can assist in allowing portions of the cover 10360 to move relative to the gland 10124 where those features include interference. Additionally, fillets and radii of the various parts can allow for easier manufacturing, as sharp edges usually require small tolerances in manufacturing to achieve.

The cover 10360 also can include a rear stop 10384. In the current aspect, the rear stop 10384 can provide a limiter of motion of the cover 10360 when the cover 10360 is moved to engage the gripper 10232 system. The rear stop 10384 can thereby prevent complete removal of the cover 10360. In the current aspect, the cover 10360 can be made of a plastic material such as acetal (or, under the trade name Delrin®), polycarbonate (PC), acrylonitrile butadiene styrene (ABS), PC/ABS, polyethylene (PE), high density PE (HDPE), low density PE (LDPE), polyvinyl chloride (PVC), polypropylene (PP), polystyrene (PS), nylon, acrylic, combinations of the aforementioned, or various other types of plastics as would be understood by one of skill in the art. In various aspects, the cover 10360 can be made of thermoplastic or thermosetting polymers. In various aspects, the cover 10360 can be made of composite materials, such as carbon fiber reinforced epoxies, various resins, glass component materials, or other types of composites, including but not limited to plastic composites. In various aspects, the cover 10360 can be made of metals, wood, fibers, or other materials as determined to be suitable by one of skill in the art.

In the deactivated or prepared configuration as shown in FIG. 17, the stop leg 10362 can prevent rotation of the gripper 10232 towards engagement with the outer pipe surface 204. In the present aspect, the cover 10360 can serve as a deactivation mechanism.

Figure 18:
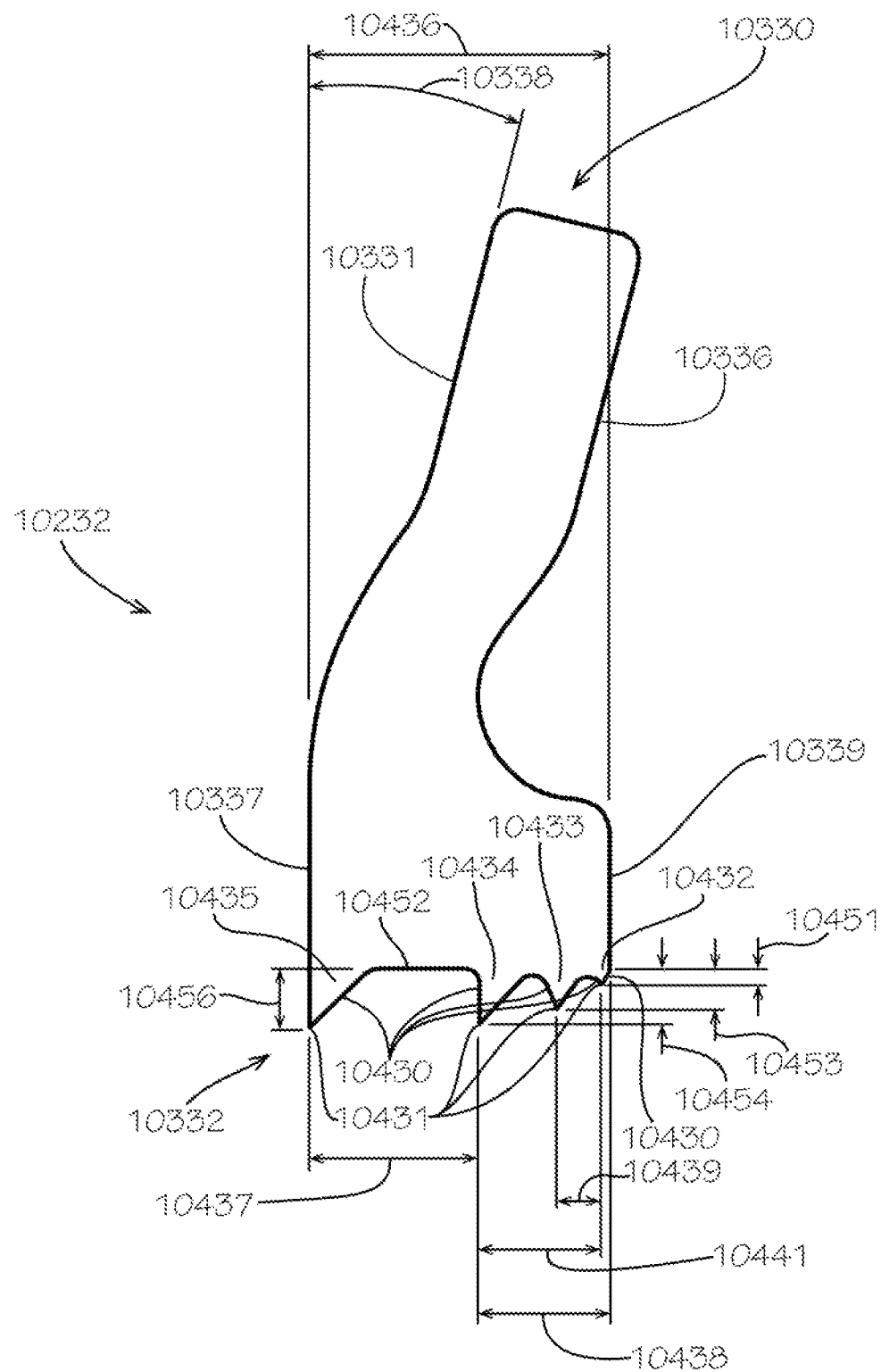
FIG. 18 is a side view of a gripper of the piping element assembly of FIG. 15A.

The gripper 10232 is seen with reference to FIG. 18. The gripper 10232 can comprise a plurality of gripping protuberances 10430. In the current aspect, the gripping protuberances 10430 can be wedge-shaped rails extending the length of the gripper 10232 with ends 10431 that descend to a point. The leading row 10432 can be small as compared to the remaining rows and, in the current aspect, can be referred to as the "touch-up row." The gripper 10232 can include a second row 10433, a middle row 10434, and a final row 10435. The gripper 10232 can be of a width 10436. In the current aspect, a distance 10437 between the end 10431 of the final row 10435 and the middle row 10434 can be slightly more than half of the width 10436. As such, a distance 10438 as measured from the end 10431 of the middle row 10434 to a rear wall 10339 of the gripper 10232 distal to the final row 10435 can be less than the distance 10437 as measured to the end 10431 of the final row 10435—which, in the current aspect, can be the same as the distance to a front wall 10337 of the gripper 10232 proximate to the final row 10435.

A distance 10439 as measured between the end 10431 of the second row 10433 and the end 10431 of the touch-up row 10432 can be slightly less than half of a distance 10441 between the end 10431 of the middle row 10434 and the end 10431 of the touch-up row 10432. As such, in the current aspect, the space between each row 10432, 10433, 10434, 10435 can become progressively larger.

In the current aspect, the rows 10432, 10433, 10434, 10435 can be linear rails, and the profile view of FIG. 18 can be simply extruded in space to form the gripper 10232. However, in various aspects, the rows 10432, 10433, 10434, 10435 can be curved to match the anticipated curvature of the pipe length 102 to aide engagement of the gripper 10232.

Additionally, a depth 10451 of the touch-up row 10432 as measured from a base 10452 of the gripper 10232 can be less than half of a depth 10453 of the second row 10433. The depth 10453 can be somewhat more than half of a depth 10454 of the middle row 10434. A depth 10456 of the final row 10435 can be about the same as the depth 10454.

As can be seen, the lever end 10330 can include a front wall 10331 and a rear wall 10336. In the current aspect, the front wall 10331 can be angled 10338 with respect to the front wall 10337.

Figure 19:
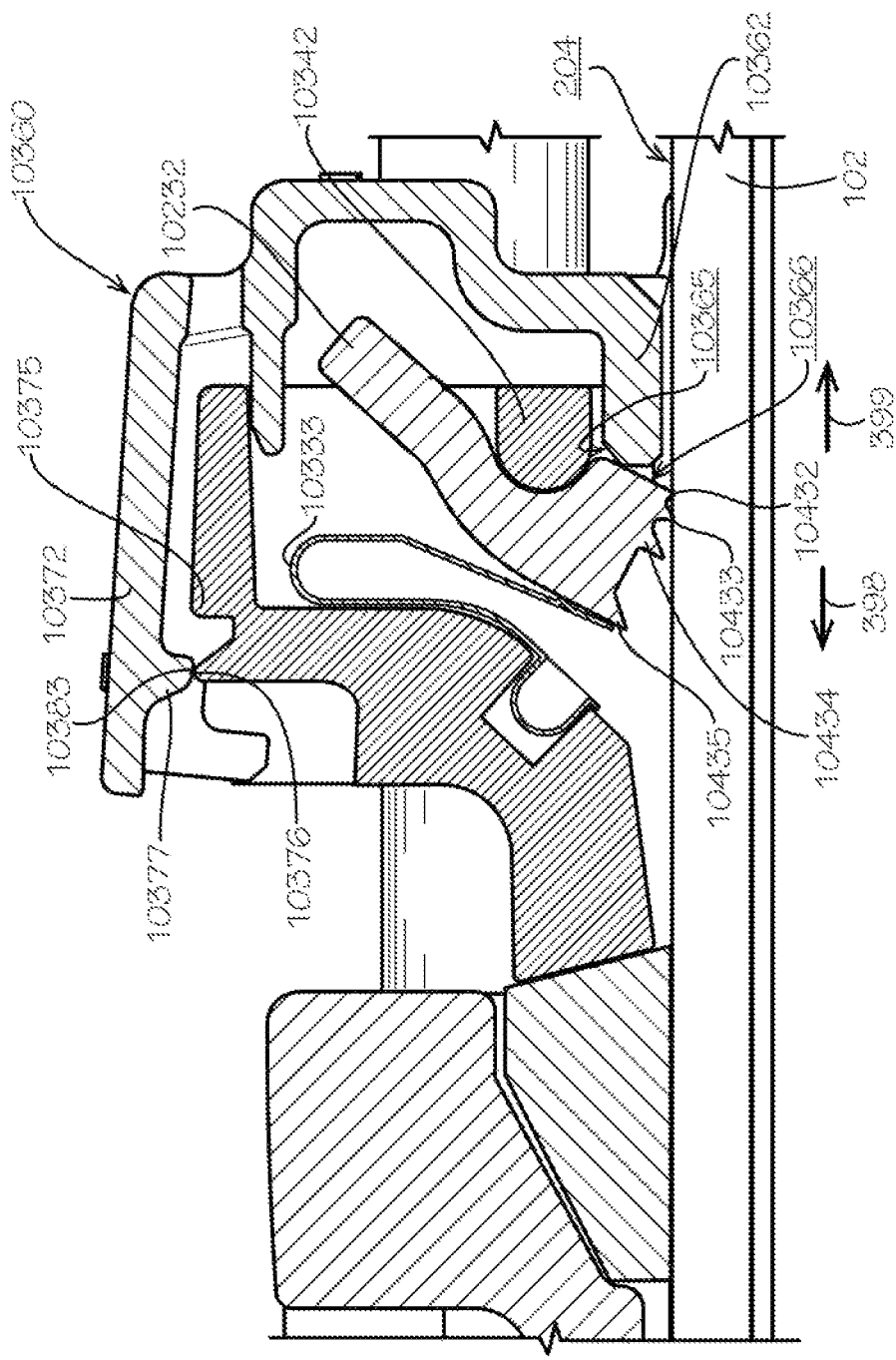
FIG. 19 is a detail view of the mechanical joint of FIG. 17 arranged in an initial engagement position.

An initial engagement position or arrangement is shown and described with reference to FIG. 19. In the initial engagement position, the gripper 10232 can be rotated about the restraint pivot 10342. Rotation can be allowed by movement of the cover 10360 first being dislocated from the restraint position shown in FIG. 17. As can be seen, the cover engagement wall 10372 can be bent with respect to the remaining portions of the cover 10360 and can behave like a leaf spring. Movement of the cover 10360 can be achieved by bending the cover engagement wall 10372 such that the end 10376 extends above and beyond the end 10383. When the cover engagement wall 10372 is bent as described, the cover 10360 can be linearly actuated, allowing it to move in the withdrawal direction 399. When the cover 10360 moves, the contact surface 10365 can move with respect to the contact surface 10366, and the stop leg 10362 can move in a withdrawal direction 399, and thereby the spring clip 10333 can bias the gripper 10232 into engagement with the pipe length 102 such that at least the leading row 10432 can come into contact with the pipe outer surface 204. In the current aspect, the second row 10433 can also come into contact with the pipe outer surface 204.

In various aspects, the cover 10360 can continue to move linearly in the withdrawal direction 399. In various aspects, the gripper 10232 will not continue to actuate into the pipe length 102 by spring force alone. In those aspects in which the gripper 10232 does not continue to actuate into the pipe length 102, the spring clip 10333 can be strong enough to bias the gripper 10232 into the pipe length 102 but not strong enough to cause full engagement. In various aspects, continued actuation of the cover 10360 can cause additional rotation of the gripper 10232 into the pipe length 102. Regardless, additional linear actuation of the cover 10360 can be achieved, and the tab stop 10377 can engage with the tab stop locator 10375 to locate the cover 10360 in a location that allows motion of the gripper 10232 while maintaining the purpose of the cover 10360.

In the current aspect, the cover 10360 can be actuated by hand, such that the cover engagement wall 10372 can be bent to allow motion of the cover 10360 simply by gripping it with a person's hand and pulling it into place. The spring force inherent in the material choice of the cover 10360 can prevent actuation of the cover engagement wall 10372 without intentional actuation. The cover engagement wall 10372 can be bent to stresses within the elastic deformation range of the material chosen in the current aspect. As such, actuation and/or engagement of the gripper 10232 can be achieved without the use of specialized tools or tools of any kind in the current aspect. In various aspects, various tools can be utilized to assist in actuating the cover engagement wall 10372 and locating the cover 10360. In the current aspect, movement of the cover 10360 achieved by motion of the cover engagement wall 10372 results in a change in state of the joint restraint assembly 10134 from the deactivated or prepared position to the activated or engagement position. In the current aspect, such achievement can be made solely by hand and without the use of tools.

Figure 20:
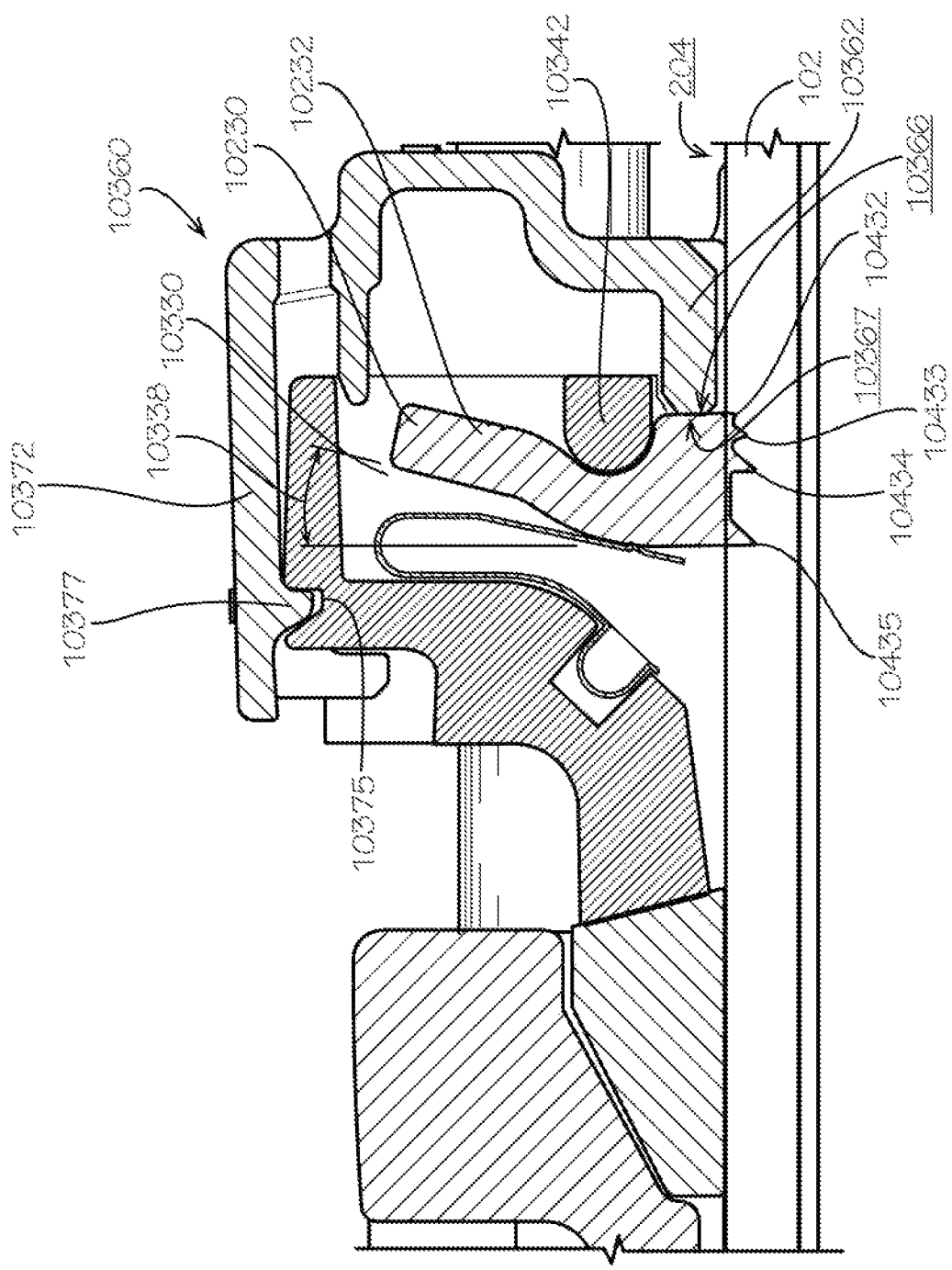
FIG. 20 is a detail view of the mechanical joint of FIG. 17 arranged in a final engagement position.

A final engagement arrangement or position can be seen with reference to FIG. 20. As can be seen, the cover 10360 can be moved into arrangement such that the tab stop 10377 can be located within the tab stop locator 10375. The gripper 10232 can be arranged such that the rows 10432, 10433, 10434, 10435 all engage the pipe length 102. The rows 10432, 10433, 10434, 10435 can be engaged by pullout force of the pipe length 102 that is typically caused by pressure in the water system. The angle 10338 can allow the gripper 10232 to rotate and can prevent the lever end 10330 from contacting the spring clip 10333. The contact surface 10366 can be rotated to be about orthogonal to the pipe outer surface 204. A facing surface 10367 of the stop leg 10362 can be in contact with the contact surface 10366 but need not be for the gripper 10232 to align in gripping arrangement of the final engagement position.

Figure 21:
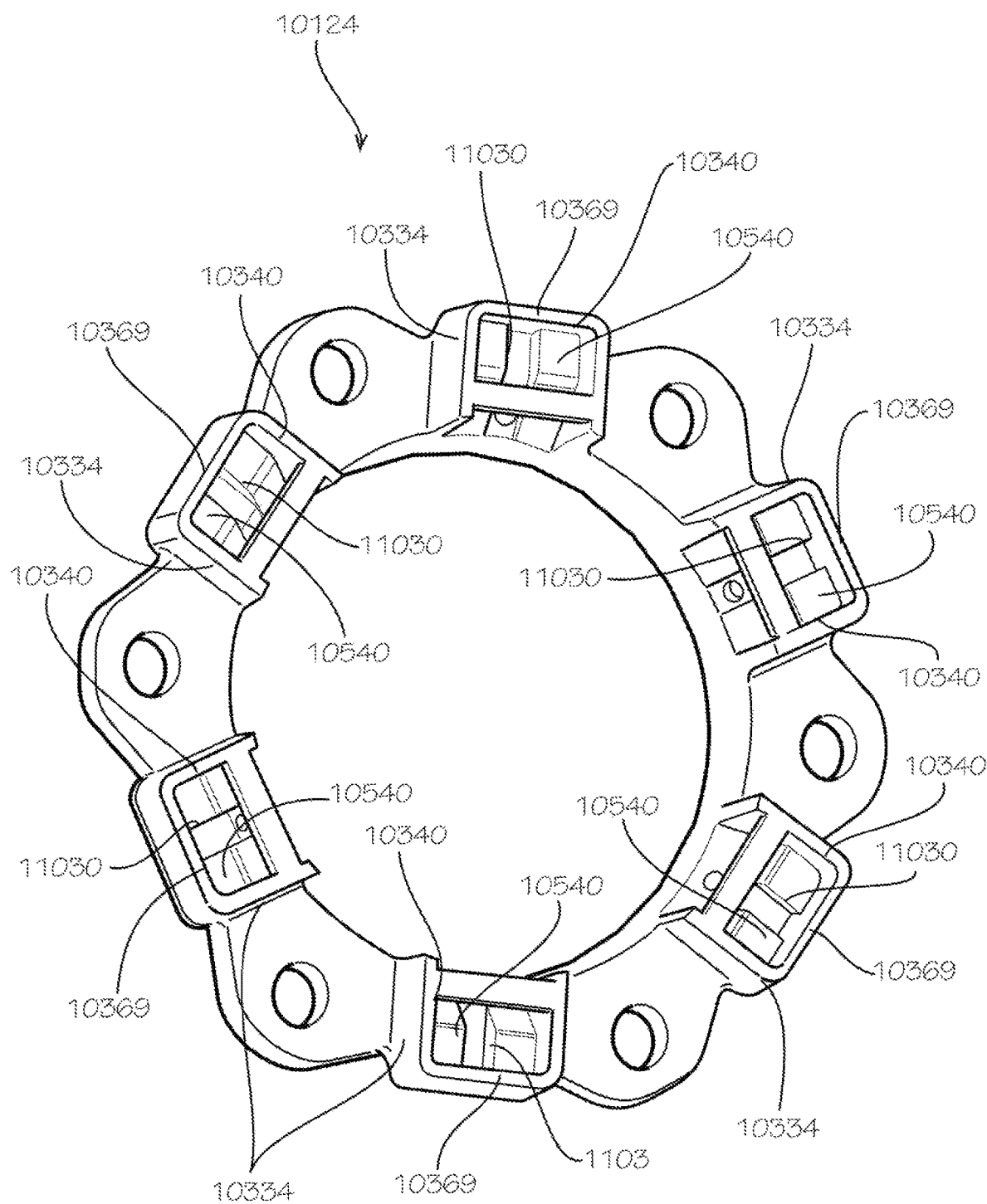
FIG. 21 is a perspective view of a gland of the piping element assembly of FIG. 15A.

The gland 10124 is shown with reference to FIG. 21. The outer wall 10369 can be seen on each restraint base 10334. A spring groove 11030 can be defined in a stop surface 10540 of each restraint base 10334 within each restraint pocket 10340.

Figure 22:
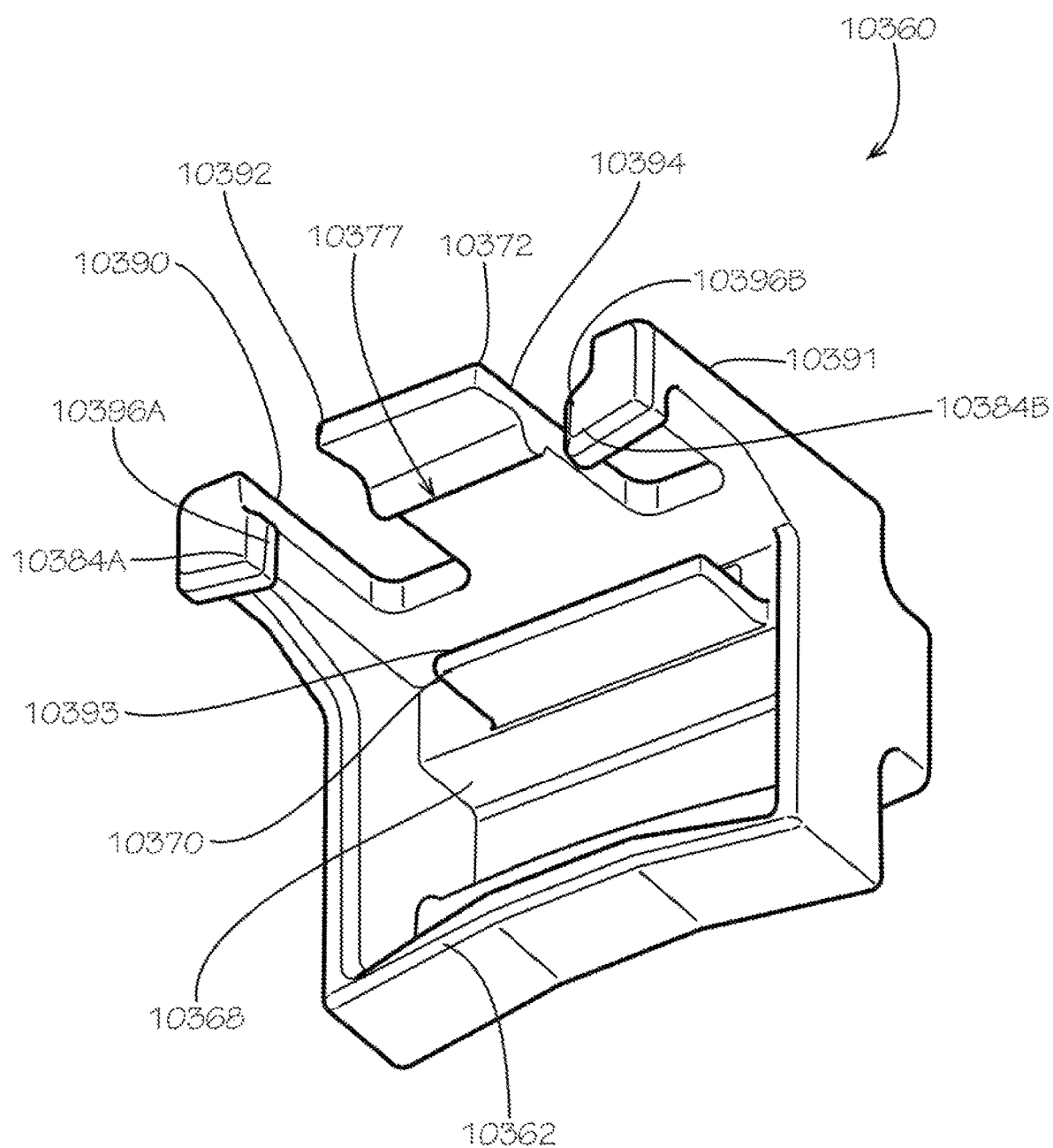
FIG. 22 is a perspective view of a cover of the piping element assembly of FIG. 15A.

The cover 10360 is shown with reference to FIG. 22. The cover engagement wall 10372 can extend between a first outer wall 10390 and a second outer wall 10391. A first channel 10392 can be defined between the first outer wall 10390 and the cover engagement wall 10372 and can extend beyond an end 10393 of the guide arm 10370, thereby exposing a portion of the guide arm 10370 from above the cover 10360. A second channel 10394 can be defined between the second outer wall 10391 and the cover engagement wall 10372 and can extend beyond an end 10393 of the guide arm 10370, thereby exposing another portion of the guide arm 10370 from above the cover 10360. Rear stops 10384a,b can extend from the first outer wall 10390 and the second outer wall 10391. The rear stops 10384a,b can be arranged to extend behind the restraint base 10334 and provide a positive stop for motion of the cover 10360 in changing the joint restraint assemblies 10134 from a prepared position to an initial engagement position or to a final engagement position. As such, the rear stops 10384a,b can prevent the removal of the cover 10360 in various aspects.

Each rear stop 10384a,b can comprise a catch tab 10396a,b extending laterally from the rear stop 10384a,b. Each catch tab 10396a,b can provide additional resistance to removal of the cover 10360. The lever recess 10368 can be defined in the cover 10360. The stop leg 10362 can be seen as an element of the cover 10360. In the current aspect, the stop leg 10362 can be a wall of the cover 10360 that assists in enclosing the cover 10360. In various aspects, the stop leg 10362 can be a separate element from the walls of the cover 10360. In various aspects, walls can be omitted. In various aspects, the cover 10360 can be an actuation mechanism and can include features that do not provide coverage of the joint restraint assembly 10134.

Figure 23:
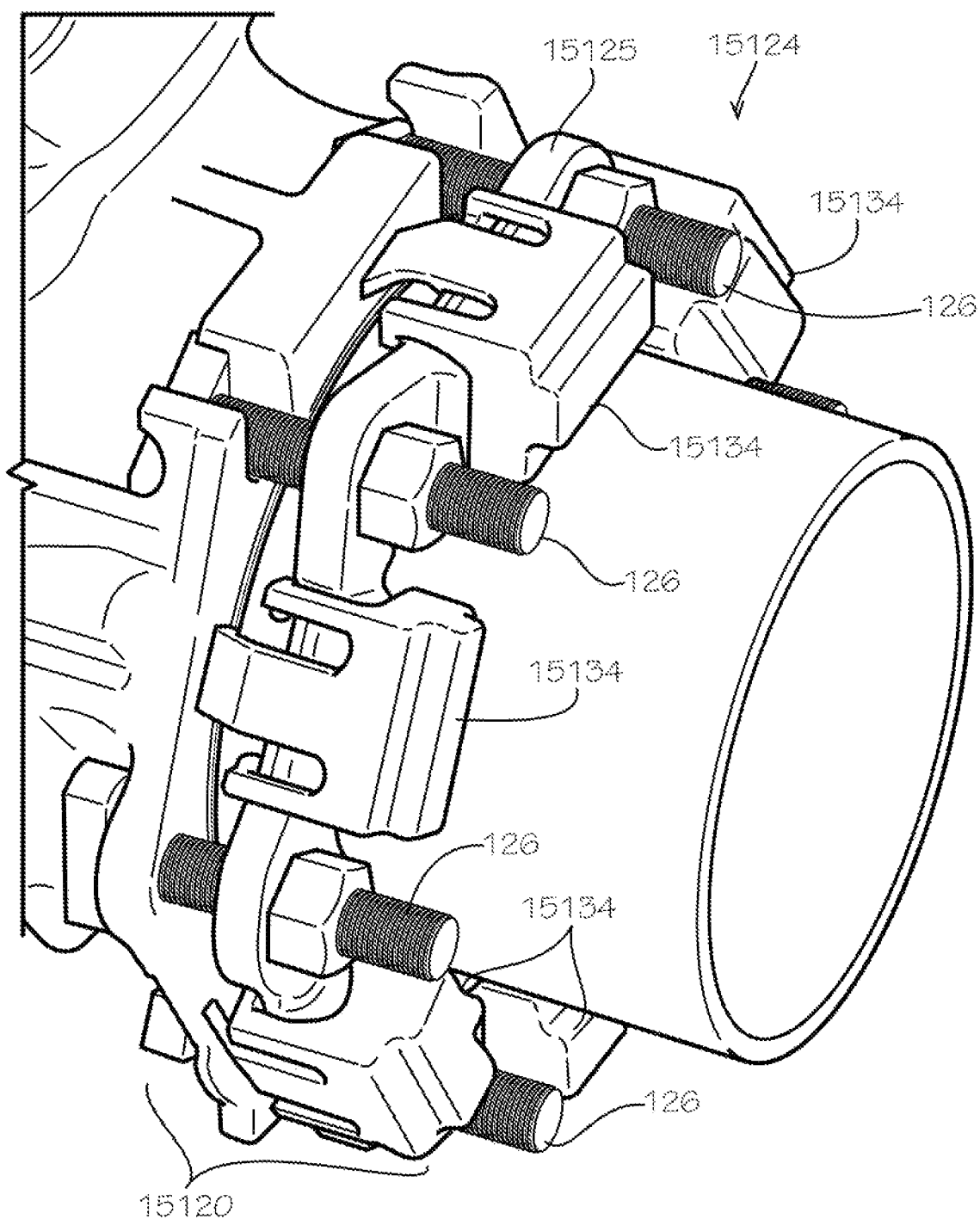
FIG. 23 is a perspective of a piping element assembly in accord with one aspect of the current disclosure.

A mechanical joint assembly 15120 can comprise another aspect of the current disclosure, as referenced with respect to FIG. 23. Features similarly drawn but not described can be understood by one of skill in the art to be coordinating, and various features and elements can be similar between the various aspects. The mechanical joint assembly 15120 can comprise a gland 15124 among other possible components, including those described elsewhere within this disclosure. The gland 15124 can comprise an annular ring 15125 and a plurality of joint restraint assemblies 15134. In the present aspect, the gland 15124 can comprise six joint restraint assemblies 15134; however, the quantity of joint restraint assemblies 15134 should not be viewed as limiting, and the gland 15124 can comprise greater or fewer joint restraint assemblies 15134 in other aspects. In the present aspect, the joint restraint assemblies 15134 can be equally spaced about a circumference of the annular ring 15125; however, this distribution should not be viewed as limiting, and the joint restraint assemblies 15134 can be distributed in any suitable arrangement.

Figure 24:
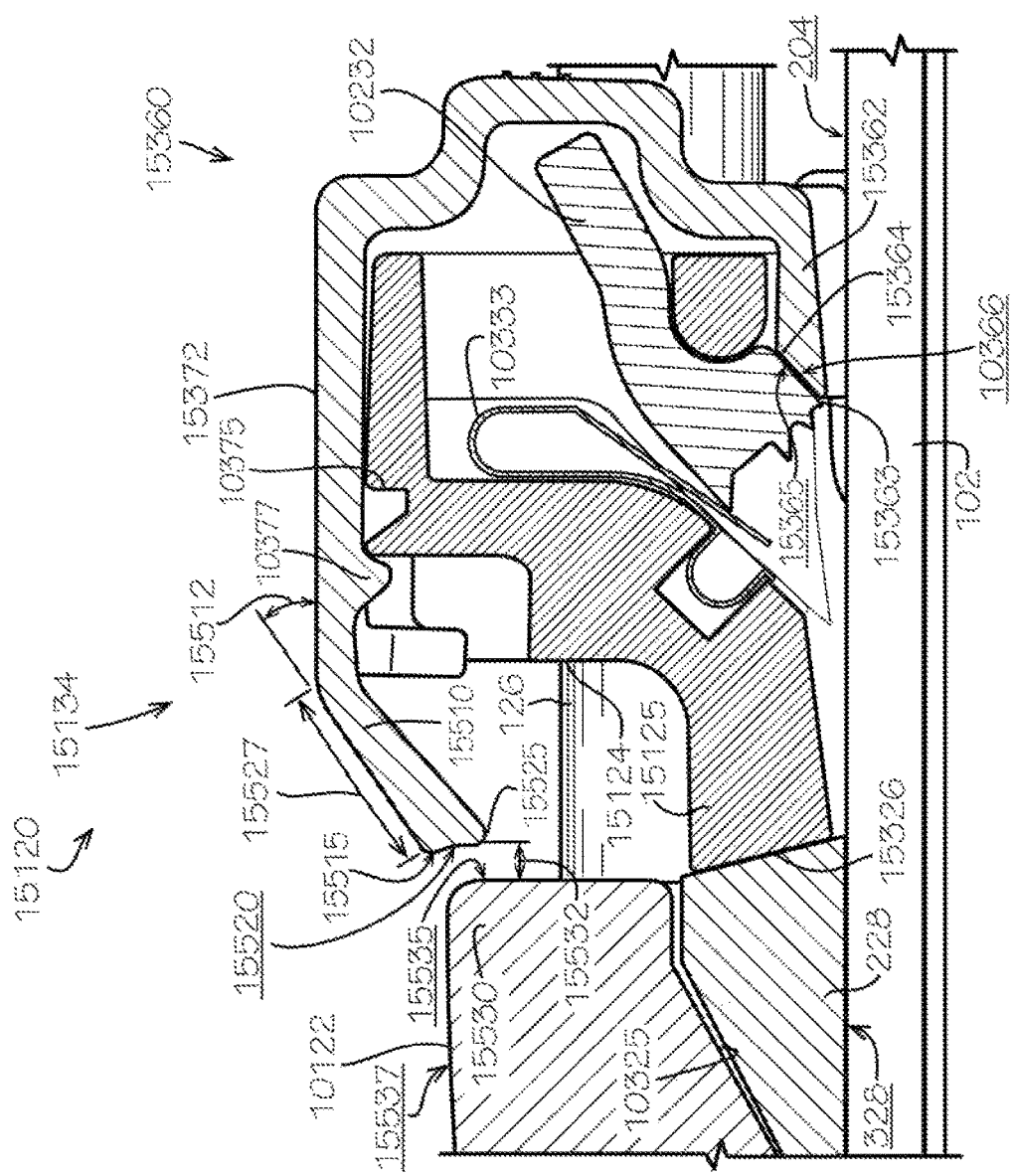
FIG. 24 is a detail cross-sectional view of a mechanical joint of the piping element assembly of FIG. 23 in a deactivated position.

As seen with reference to the cross-sectional view of FIG. 24, the joint restraint assembly 15134 can include a cover 15360 that can be similar in various features to cover 10360. A cover engagement wall 15372 of the cover 15360 can extend over a portion of the gland 15124. Although guide elements such as guide arm 10370 are not included in the view of FIG. 24, one of skill in the art would understand that features for guiding and locating the cover 15360 can include those described elsewhere in this disclosure.

The annular ring 15125 of the gland 15124 can be configured to engage the gasket 228. The annular ring 15125 can define an engagement bevel 15326. The engagement bevel 15326 can be substantially frustoconical in shape. Tightening of the fasteners 126 can draw the gland 15124 towards the element flange 10122 of the pipe element 10110, thereby compressing the gasket 228 in the gasket groove 10325. The engagement bevel 15326 and the taper of the gasket groove 10325 can cooperate to compress and to deform the gasket 228 radially inward. Compression and deformation of the gasket 228 can press the inner gasket surface 328 of the gasket 228 against the outer pipe surface 204, thereby engaging the gasket 228 and creating a seal between the gasket 228 and the outer pipe surface 204. With the gasket 228 compressed, friction between the inner gasket surface 328 and the outer pipe surface 204 can resist movement of the pipe length 102 in both the insertion direction 398 and the withdrawal direction 399.

The cover engagement wall 15372 can include an impact arm 15510. The impact arm 15510 can be integral with the cover 15360, although it need not be in all aspects. In various aspects, the impact arm 15510 can be connected to an end of the cover 15360 proximate the element flange 10122. The impact arm 15510 can extend beyond the restraint base 10334 toward the element flange 10122. The impact arm 15510 can be arranged at an angle 15512 with respect to the engagement wall 15372. The impact arm 15510 can include an axial end 15515 that can include a contact surface 15520. The impact arm 15510 can also include a radial end 15525 that can define the radial innermost extent of the impact arm 15510. As can be seen with reference to FIG. 24, the contact surface 15520 can have a curve shape in various aspects. In the current aspect, the impact arm 15510 can increase in thickness proximate the ends 15515, 15525 as compared to portions more distal the ends 15515, 15525. The impact arm 15510 can be of a length 15527.

The element flange 10122 can include an element shoulder 15530. The element shoulder 15530 can comprise a contact surface 15535. In the current aspect, the contact surface 15535 can include a radius at a corner of the element shoulder 15530, although in various aspects the contact surface 15535 need not, and can include simply a flat face or various other surface shapes. It would be understood by one of skill in the art that the contact surface 15520 can be curved to match the radius at the corner of the contact surface 15535, although various shapes can be utilized for the various elements.

The angle 15512 can be selected for the impact arm 15510 such that, at the selected length 15527, the radial end 15525 can be arranged radially closer to the pipe length 102 than an outer surface 15537 of the element flange 10122. The contact surface 15520 can be arranged at a distance 15532 from the element shoulder 15530. The distance 15532 can be greater than 0 when the engagement bevel 15326 is in contact with the gasket 228 before the gasket 228 is compressed.

The cover 15360 can include a stop leg 15362. In the current aspect, the stop leg 15362 can provide a point of contact between the cover 15360 and the gripper 10232. In the current aspect, the cover 15360 can comprise a slope 15364 at a contact end 15363. The slope 15364 can be arranged at an angle to provide a contact surface 15365 to engage a contact surface 10366 of the gripper 10232. When the contact surface 15365 is engaged against the contact surface 10366 in the position shown, the cover 15360 can provide mechanical resistance against the spring force of the spring clip 10333, which can be biased toward engagement of the gripper 10232 with the outer pipe surface 204.

When the distance 15532 is greater than 0, the cover 15360 can be out of contact with the element shoulder 15530. If the cover 15360 is out of contact with the element shoulder 15530, the gripper 10232 can be restricted from engagement with the outer pipe surface 204 by the stop leg 15362. In this position, the gasket 228 can be in contact with the gland 15124. Fasteners 126 can be untightened or can be somewhat tightened in this position.

Figure 25:
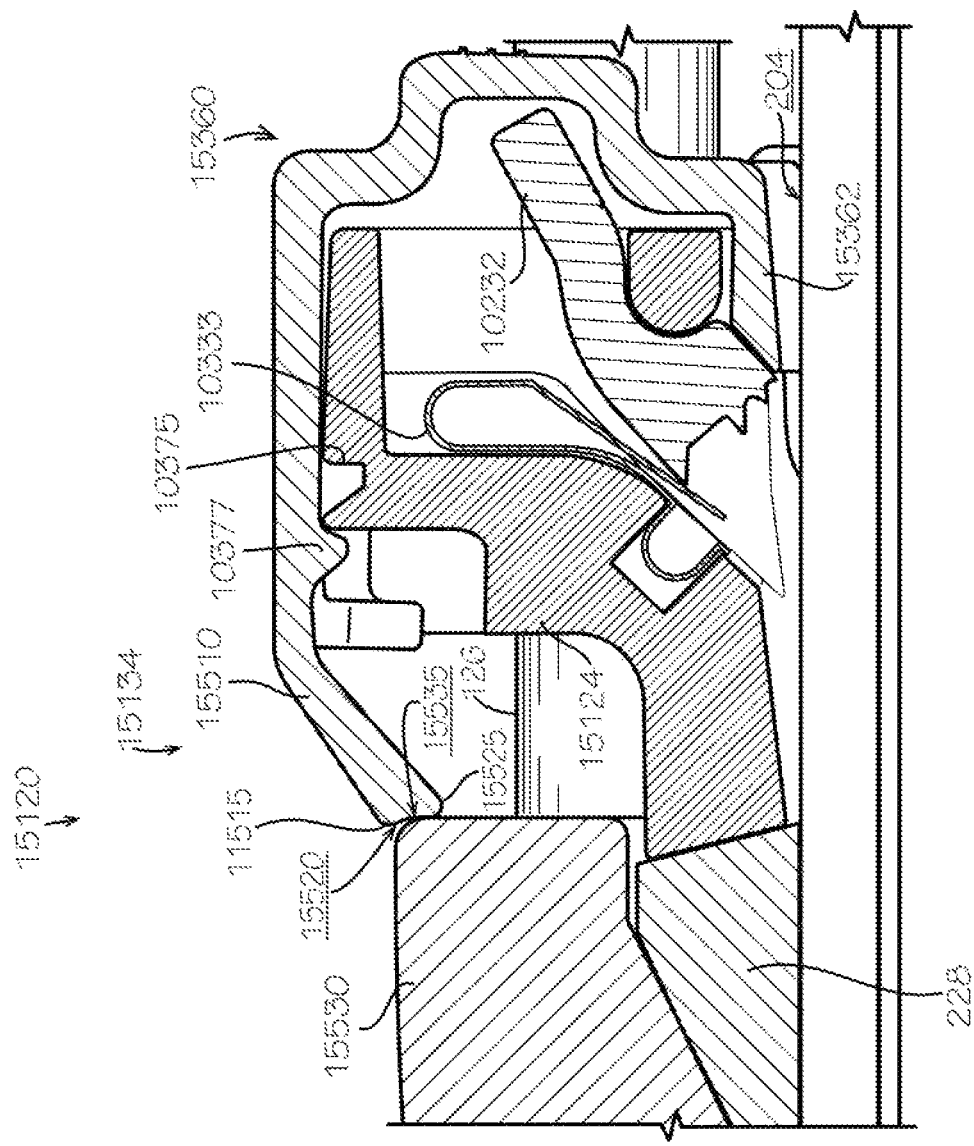
FIG. 25 is a detail cross-sectional view of a mechanical joint of the piping element assembly of FIG. 23 in a pre-engagement position.

As fasteners 126 are tightened, the distance 15332 can gradually decrease to 0, which can be described as the pre-engagement position shown with reference to FIG. 25. In this position, the contact surface 15520 can be in contact with the contact surface 15535. The gland 15124 can be drawn in by the tightening of the fasteners 126 to compress and/or to deform the gasket 228. In the arrangement of the current aspect, the joint restraint assembly 15134 can remain in the deactivated position and the gripper 10232 can remain in the disengaged position.

Figure 26:
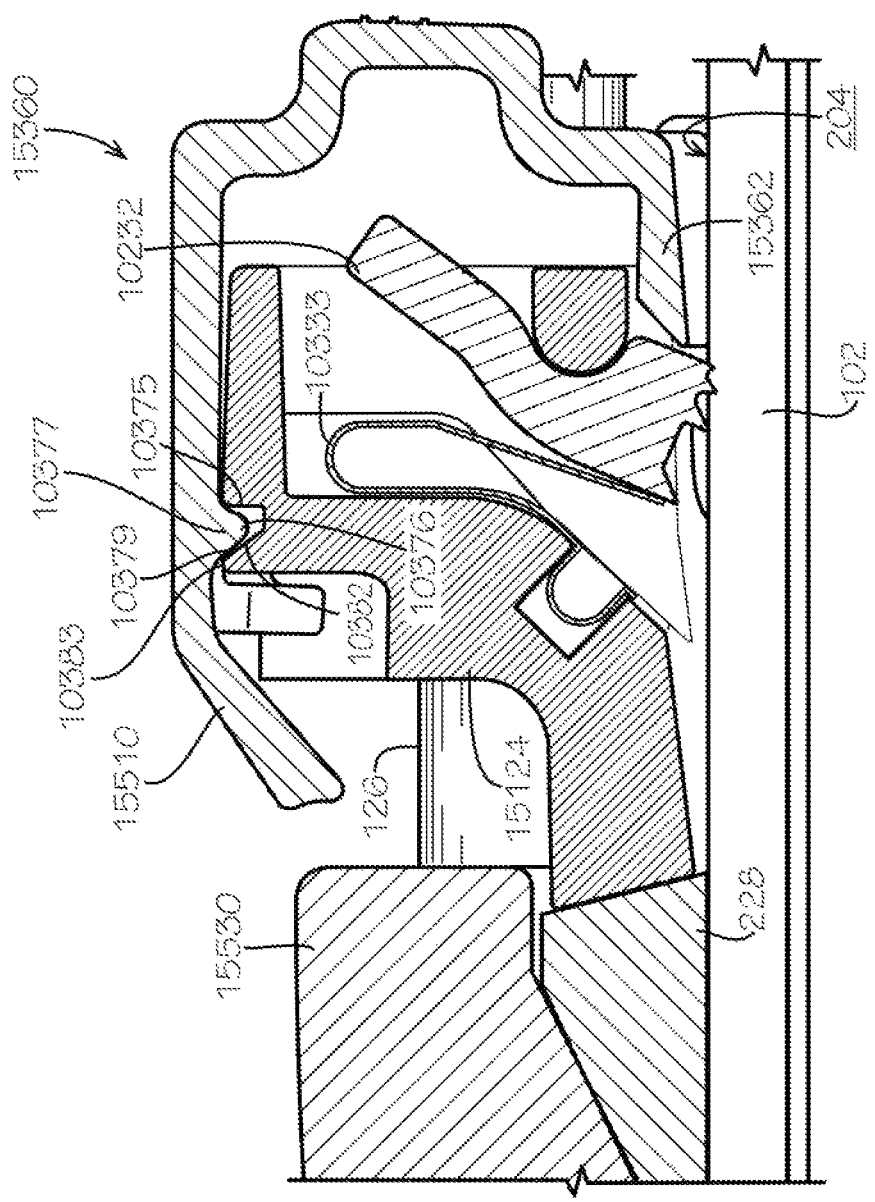
FIG. 26 detail cross-sectional view of a mechanical joint of the piping element assembly of FIG. 23 in an initial engagement position.

As seen with reference to FIG. 26, as the fasteners 126 can be further tightened, the gland 15124 can be further drawn into contact with and compression of the gasket 228. As described elsewhere in this disclosure, the gripper 10232 can be actuated when the tab stop 10377 engages with the tab stop locator 10375. In the current aspect, the tab stop 10377 can be actuated toward to the tab stop locator 10375 by further tightening of the fasteners 126. When the fasteners 126 are further tightened, the impact arm 15510 can engage with the element shoulder 15530 to prevent the cover 15360 from engaging further toward the element shoulder 15530. As such, the gland 15124 can move under the cover 15360, which itself can remain in-place against the element shoulder 15530. As the gland 15124 moves, the tab stop locator 10375—being an element of the gland 15124—can move closer to the tab stop 10377—being an element of the cover 15360. As the gland 15124 moves with respect to the cover 15360, the end 10376 can move close to the end 10383. Eventually, the end 10376 can be allowed to pass the end 10383. If the end 10376 passes the end 10383, then the slope 10379 can interact with the slope wall 10382 and can assist in pushing the cover 15360 away from the element shoulder 15530 to seat the tab stop 10377 in the tab stop locator 10375. Additionally, bias of the spring clip 10333 can push the gripper 10232 against the stop leg 15362 to assist in moving the cover 15360. When the cover 15360 moves, gripper 10232 can engage with the outer pipe surface 204 as described elsewhere in this disclosure. As such, the system of FIG. 23-26 can provide appropriate engagement of the gasket 228, the gland 15124, the grippers 10232, and the pipe length 102 simply by engagement of the fasteners 126.

Figure 27A:
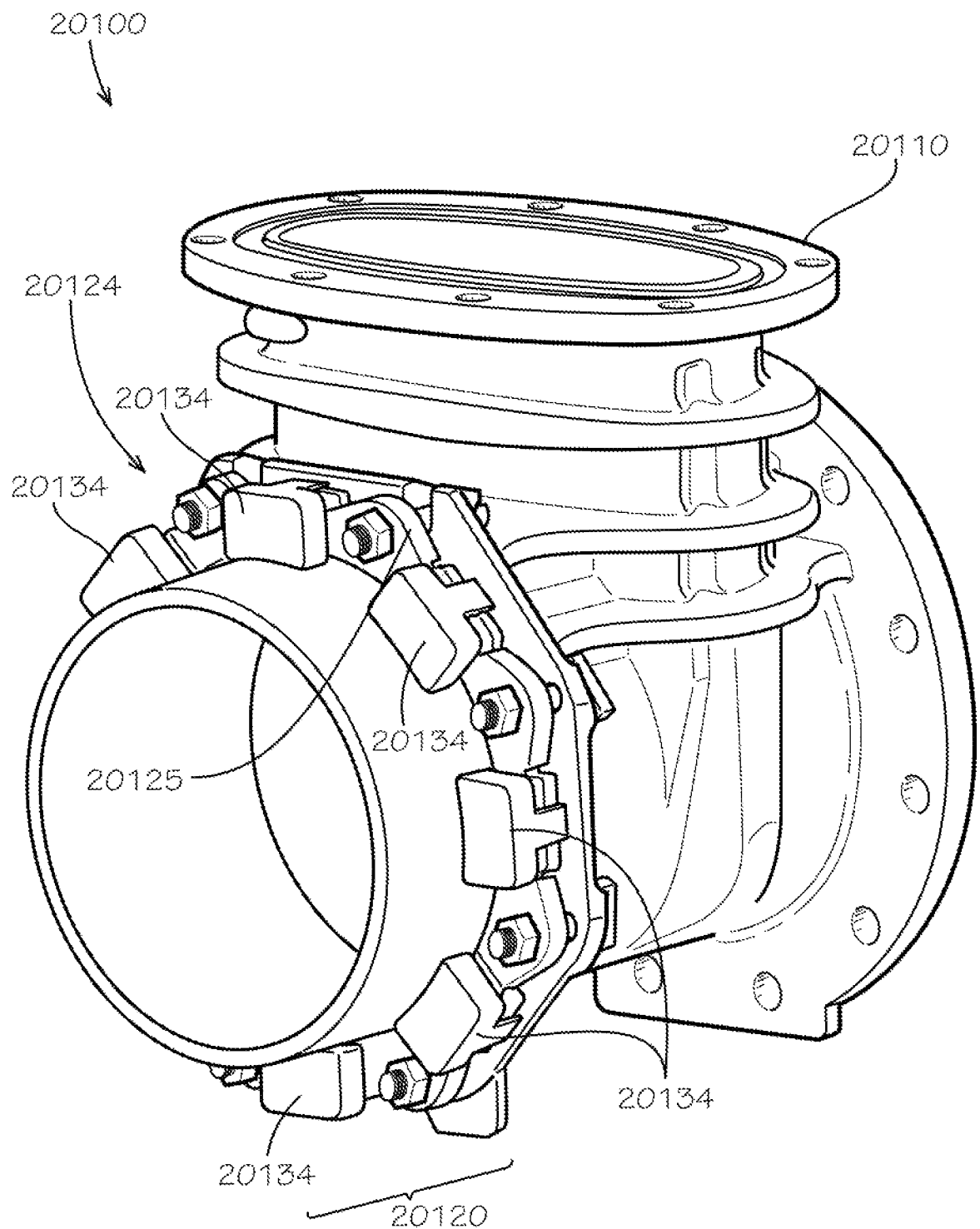
FIG. 27A is a perspective of a piping element assembly in accord with one aspect of the current disclosure.
Figure 27B:
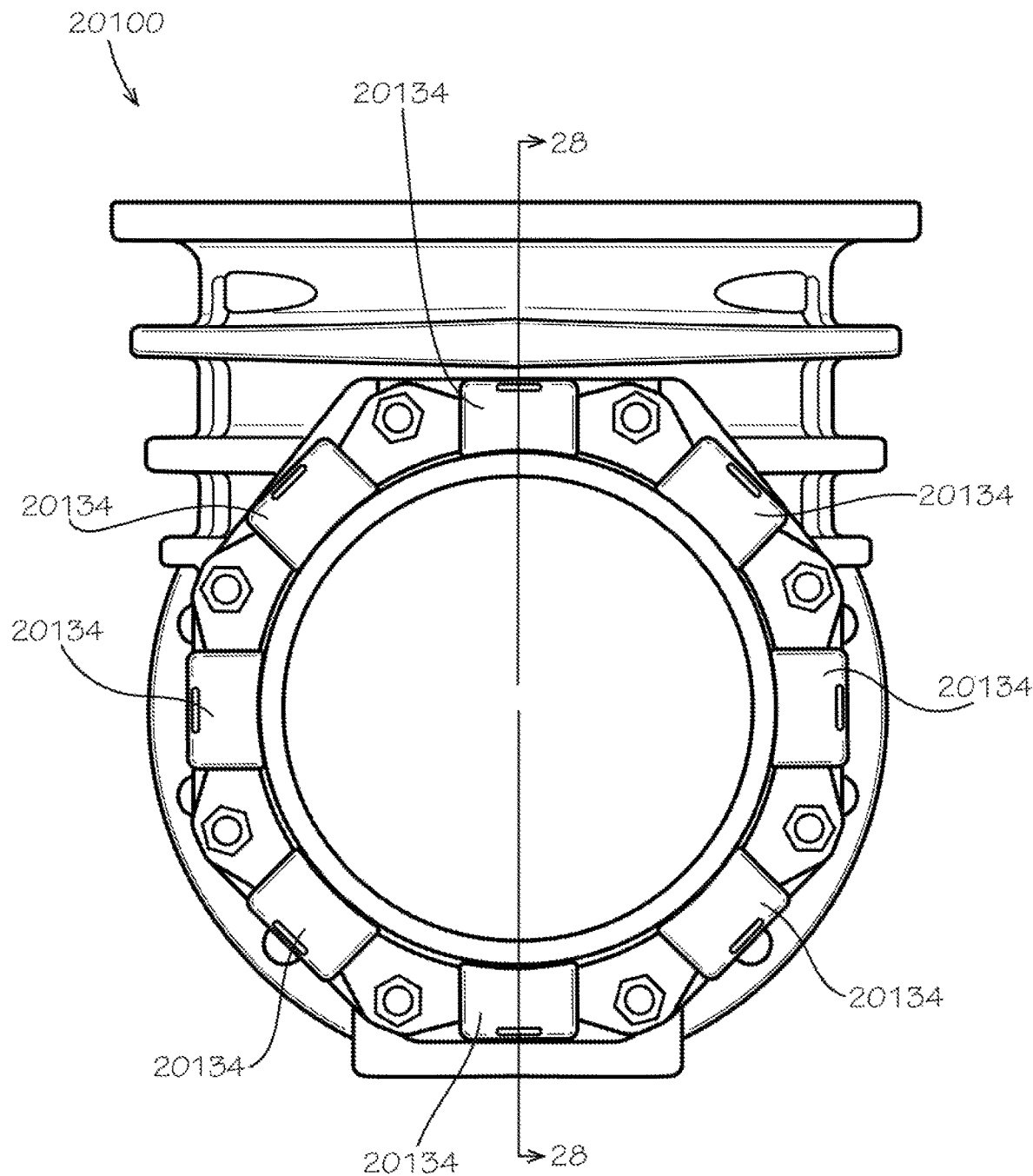
FIG. 27B is a side view of the piping element assembly of FIG. 27A.

With reference to FIGS. 27A and 27B, in another aspect of the disclosure, a piping element assembly 20100 can comprise various arrangements and elements similar to piping element assemblies 10100 and 100. Features similarly drawn but not described can be understood by one of skill in the art to be coordinating, and various features and elements can be similar between the various aspects. The piping element assembly 20100 can comprise piping element 20110 and a mechanical joint assembly 20120, among other possible components. The mechanical joint assembly 20120 can comprise a gland 20124, which itself can comprise an annular ring 20125 and a plurality of joint restraint assemblies 20134. In the present aspect, the gland 20124 can comprise eight joint restraint assemblies 20134; however, the quantity of joint restraint assemblies 20134 should not be viewed as limiting, and the gland 20124 can comprise greater or fewer joint restraint assemblies 20134 in other aspects. In the present aspect, the joint restraint assemblies 20134 can be equally spaced about a circumference of the annular ring 20125; however, this distribution should not be viewed as limiting, and the joint restraint assemblies 20134 can be distributed in any suitable arrangement.

Figure 28:
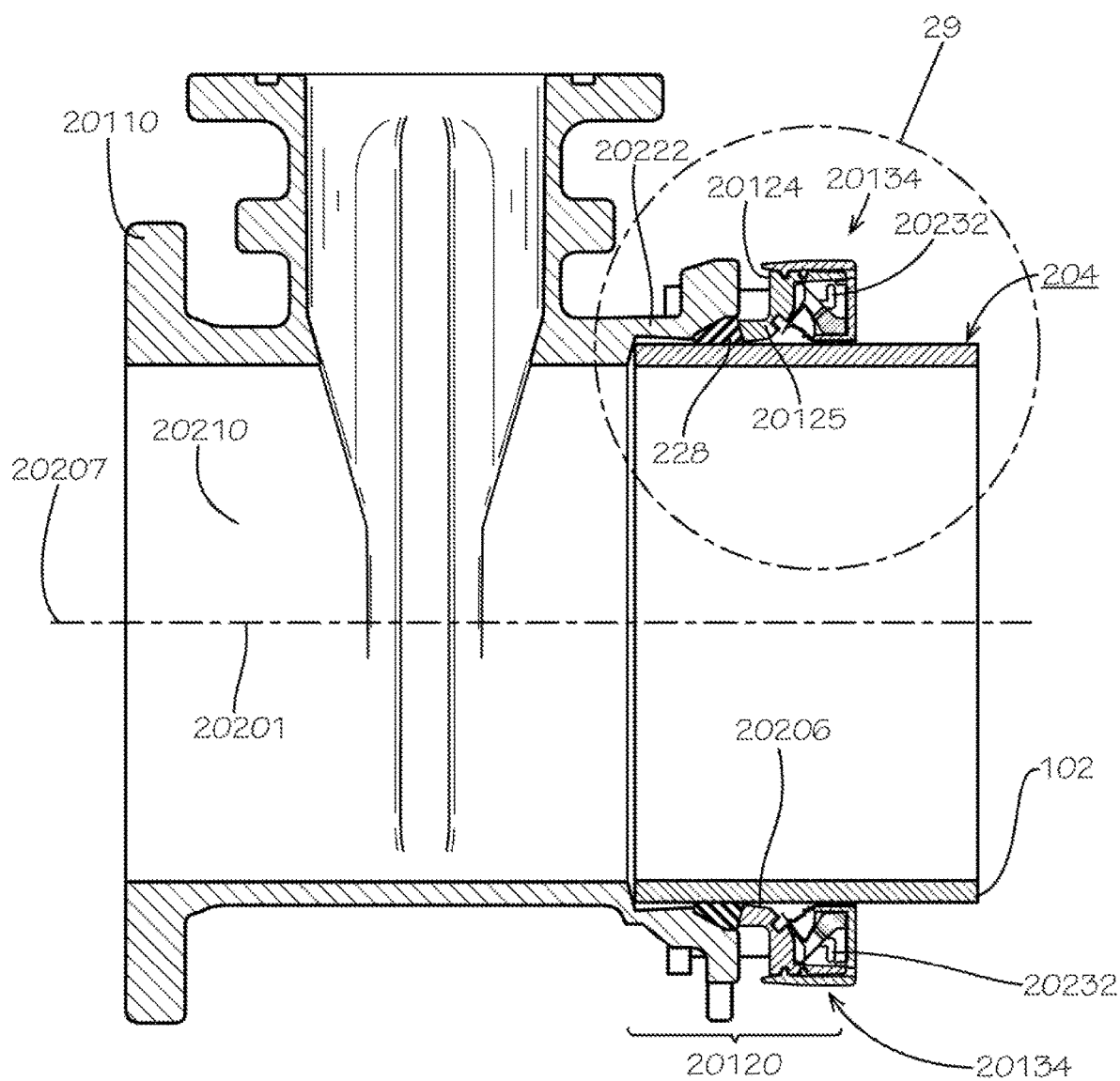
FIG. 28 is a cross-sectional view of the piping element assembly of FIG. 27A taken along line 28-28 shown in FIG. 27B.

As seen with reference to FIG. 28, the annular ring 20125 of the gland 20124 can define a gland bore 20206. The gland bore 20206 can define a gland axis 20207 which can be substantially coincident with an element bore axis 20201 of an element bore 20210 of the piping element 20110 such that the gland bore 20206 and the element bore 20210 can be coaxial. In various aspects, the gland axis 20207 can be out of alignment with the element bore axis 20201. Pipe length 102 can extend through the gland bore 20206 into a socket 20222 of the piping element 20110. The pipe length 102 can be substantially coaxial with the gland axis 20207 and the element bore axis 20201, although in various aspects the elements can be out of alignment.

The mechanical joint 20120 of the pipe element assembly 20100 can further comprise the gasket 228. The gasket 228 can be disposed axially between the piping element 20110 and the gland 20124 within the socket 20222. The gasket 228 can be configured to seal against the outer pipe surface 204 defined by the pipe length 102.

As will be discussed in greater detail to follow, the gland 20124 can be configured in various arrangements, including a prepared or deactivated arrangement or position, an initial engagement arrangement or position, and a final engagement arrangement or position. The initial engagement position and the final engagement position can both be termed "activated positions" or "engagement positions," as a gripper 20232 can be unrestrained with the gland 20124 in these positions. The gripper 20232 of each of the joint restraint assemblies is seen in FIG. 28 in a prepared arrangement. The joint restraint assembly 20134 can be positioned to engage the outer pipe surface 204 in various arrangements. In various arrangements, the grippers 20232 can be positioned in final engagement position to prevent withdrawal of the pipe length 102 from the socket 20222.

Figure 29:
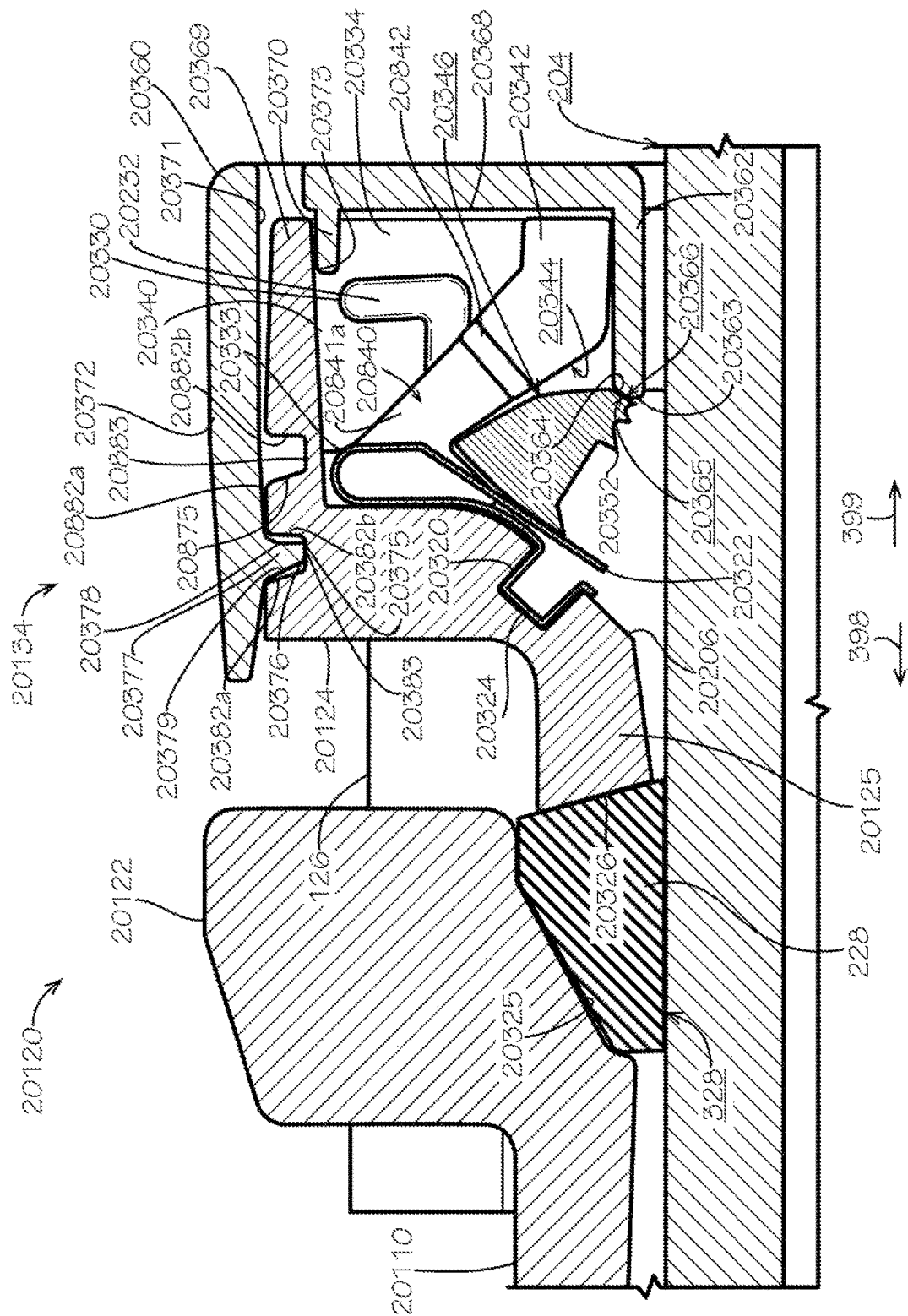
FIG. 29 is a detail view of a mechanical joint of the piping element assembly of FIG. 27A in a deactivated position as annotated by Detail 29 in FIG. 28.

With reference to FIG. 29 and with returning reference to FIG. 28, the gland 20124 in the present aspect can be placed in the prepared or deactivated configuration. As such, each joint restraint assembly 20134 can be in the prepared or deactivated configuration, and the gripper 20232 can thereby be placed in the disengaged position which allows the pipe length 102 to freely move into the socket 20222 in the insertion direction 398 or outwards from the socket 20222 in the withdrawal direction 399.

The pipe element 20110 can define a gasket groove 20325. The gasket groove 20325 can define a taper, and the gasket groove 20325 can define a substantially triangular or trapezoidal profile. The gasket groove 20325 can be shaped to receive the gasket 228. The annular ring 20125 of the gland 20124 can be configured to engage the gasket 228. The annular ring 20125 can define an engagement bevel 20326. The engagement bevel 20326 can be substantially frustoconical in shape, and the engagement bevel 20326 can face radially inward with respect to the bore axis element 20201 and the gland axis 10207 (both shown in FIG. 28). Tightening of the fasteners 126 can draw the gland 20124 towards an element flange 20122 of the pipe element 20110, thereby compressing the gasket 228 in the gasket groove 20325. The engagement bevel 20326 and the taper of the gasket groove 20325 can cooperate to compress and to deform the gasket 228 radially inward with respect to the bore axis 201 and gland axis 20207. Compression and deformation of the gasket 228 can press the inner gasket surface 328 of the gasket 228 against the outer pipe surface 204, thereby engaging the gasket 228 and creating a seal between the gasket 228 and the outer pipe surface 204. With the gasket 228 compressed, friction between the inner gasket surface 328 and the outer pipe surface 204 can resist movement of the pipe length 102 in both the insertion direction 398 and the withdrawal direction 399.

As shown in FIG. 29, each joint restraint assembly 20134 can comprise a restraint base 20334, a spring clip 20333 substantially similar to spring clip 333 and spring clip 20333, at least one of the grippers 20232, and a cover 20360. The joint restraint assembly 20134 can be assembled on the restraint base 20334. In the present aspect, the restraint base 20334 can be integrally defined by the gland 20124; however in other aspects, the restraint base 20334 can be a separate component which can be attached or fastened to the annular ring 20125 of the gland 20124. In some aspects, a position of the restraint base 20334 on the annular ring 20125 can be adjusted, such as by moving the restraint base 20334 radially inward or outward relative to the gland axis 20207. Such adjustment can allow the gland 20124 to be configured for different sizes of pipe lengths 102 having different outer diameters. In some aspects, the restraint bases 20334 can also be adjusted on the annular ring 20125 axially relative to the gland axis 20207. The restraint base 20334 can define a restraint pocket 20340 and a restraint pivot 20342. The gripper 20232 and the spring clip 20333 can be disposed within the restraint pocket 20340.

In the current aspect, the restraint base 20340 can include a structural rail 20840 that can extend from the restraint pivot 20342 toward a portion of the restraint base 20340 that is radially outward from the gland bore 20206. In the current aspect, the structural rail 20840 is integral with the restraint base 20340, although in various aspects may be of various configurations, including attached, affixed, or connected. In the current aspect, the structural rail 20840 can provide support for the joint restraint assembly 20134. For example, the gripper 20232 of the current aspect can be configured to have portions resting on each side of the structural rail 20840. As such, the structural rail 20840 can provide a guide for motion of the gripper 20232. In the current aspect, the structural rail 20840 can comprise a first rail 20841a and a second rail 20841b (shown in FIG. 33). The structural rail 2080 of the current aspect can define a spring pocket 20842 that can provide a location for the spring clip 20333 within the joint restraint assembly 20134.

The gripper 20232 can move with respect to and, when appropriate, rotate about the restraint pivot 20342 such that an engagement end 20332 of the gripper 20232 can be drawn into contact with the outer pipe surface 204. The gripper 20232 can define a gripper bearing surface 20346, and the restraint pivot 20342 can define a restraint bearing surface 20344. The gripper bearing surface 20346 can be in facing contact with the restraint bearing surface 20344. The gripper bearing surface 20346 can be configured to slide relative to the restraint bearing surface 20344 as the gripper 20232 moves along the restraint pivot 20342.

The gripper 20232 can define the engagement end 20332 and a lever end 20330. The engagement end 20332 can be disposed opposite from the lever end 20330 with the gripper bearing surface 20346 defined between the engagement end 20332 and the lever end 20330. The engagement end 20332 can extend into the gland bore 20206 towards the gland axis 20207. The spring clip 20333 can bias the gripper 20232 toward motion along the restraint pivot 20342 towards engagement with outer pipe surface 204. Specifically, an engagement leg 20322 of the spring clip 20333 can press on the gripper 20232 at an area proximate the engagement end 20332 of the gripper 20232. A retention tab 20324 of the spring clip 20333 can engage a locator bore 20320 defined by the restraint base 20334. The engagement of the retention tab 20324 with the locator bore 20320 can position and secure the spring clip 20333 within the restraint pocket 20340, and the spring clip 20333 can thereby maintain the engagement between the gripper 20232 and the restraint pivot 20342.

The cover 20360 provided can help isolate the elements of the joint restraint assembly 20134 to prevent dirt, various fluids, and debris from compromising the functioning of the gripping mechanism. The cover 20360 can also help prevent unnecessary tampering with the joint restraint assembly 20134.

As seen in FIG. 29, the cover 20360 can include a stop leg 20362. In the current aspect, the stop leg 20362 can provide a point of contact between the cover 20360 and the gripper 20232. In the current aspect, the cover 20360 can comprise a chamfer 20364 at a contact end 20363. The chamfer 20364 can be arranged at an angle to provide a contact surface 20365 to engage a contact surface 20366 of the gripper 20232. When the contact surface 20365 is engaged against the contact surface 20366 in the position shown, the cover 20360 can provide mechanical resistance against the spring force of the spring clip 20333, which can be biased toward engagement of the gripper 20232 with the outer pipe surface 204. The cover 20360 can define a lever recess 20368 that can provide space for the lever end 20330 of the gripper 20232, although in various embodiments the lever recess 20368 can provide space for portions of the restraint base 20340 as well. In the current aspect, the gland 20124 can comprise an outer wall 20369 that partially defines the restraint pocket 20340 along a radially outward extent of the restraint base 20334. The outer wall 20369 can assist the cover 20360 in preventing dirt and debris from compromising the functioning of the gripping mechanism. The outer wall 20369 in the current aspect can be tapered to improve its ability to engage with the cover 20360. The cover 20360 can comprise a movement guide arm 20370. In the current aspect, the movement guide arm 20370 can extend from the cover 20360 and can be shaped to nest within the outer wall 20369 and within the restraint pocket 20340. A cover engagement wall 20372 of the cover 20360 can extend over a portion of the gland 20124. The cover engagement wall 20372 and the guide arm 20370 together can define a guide recess 20371. In the current aspect, the guide recess 20371 can be sized to accept the outer wall 20369. The guide arm 20370 can include a chamfer 20373 to assist in locating the outer wall 20369 within the guide recess 20371.

The gland 20124 can define a first tab stop locator 20375 and a second tab stop locator 20875. In the current aspect, each tab stop locator 20375, 20875 can be a groove, a hole, or various other locating definition. The cover engagement wall 20372 can comprise a tab stop 20377 that extends radially inwardly from the cover engagement wall 20372 toward the gland 20124. In the current aspect, the tab stop 20377 can comprise a frontal wall 20378 that can be arranged as a flat plane extending substantially radially inwardly. The tab stop 20377 can also comprise a slope 20379 that can be angled with respect to the frontal wall 20378. The frontal wall 20378 and the slope 20379 can come together at an end 20376 of the tab stop 20377. In the current aspect, the tab stop locator 20375 can also comprise walls 20382a,b. The walls 20382a,b can lead to an end 20383 of the tab stop locator 20375. In various engagement positions, the tab stop 20377 can fit within the tab stop locator 20375. Similarly, in the current aspect, the tab stop locator 20875 can also comprise walls 20882a,b. The walls 20382a,b can lead to an end 20883 of the tab stop locator 20875. In various engagement positions, the tab stop 20377 can fit within each tab stop locator 20375, 20875. In the current aspect, it should be noted that that features of the tab stop 20377 can comprise curvature, such as various fillets and radii. The various curves can assist in allowing portions of the cover 20360 to move relative to the gland 20124 where those features include interference. Additionally, fillets and radii of the various parts can allow for easier manufacturing, as sharp edges usually require small tolerances in manufacturing to achieve.

In the current aspect, the cover 20360 can be made of a plastic material such as acetal (or, under the trade name Delrin®), polycarbonate (PC), acrylonitrile butadiene styrene (ABS), PC/ABS, polyethylene (PE), high density PE (HDPE), low density PE (LDPE), polyvinyl chloride (PVC), polypropylene (PP), polystyrene (PS), nylon, acrylic, combinations of the aforementioned, or various other types of plastics as would be understood by one of skill in the art. In various aspects, the cover 20360 can be made of thermoplastic or thermosetting polymers. In various aspects, the cover 20360 can be made of composite materials, such as carbon fiber reinforced epoxies, various resins, glass component materials, or other types of composites, including but not limited to plastic composites. In various aspects, the cover 20360 can be made of metals, wood, fibers, or other materials as determined to be suitable by one of skill in the art.

In the deactivated or prepared configuration as shown in FIG. 29, the stop leg 20362 can prevent movement of the gripper 20232 towards engagement with the outer pipe surface 204. In the present aspect, the cover 20360 can serve as a deactivation mechanism.

Figure 30A:
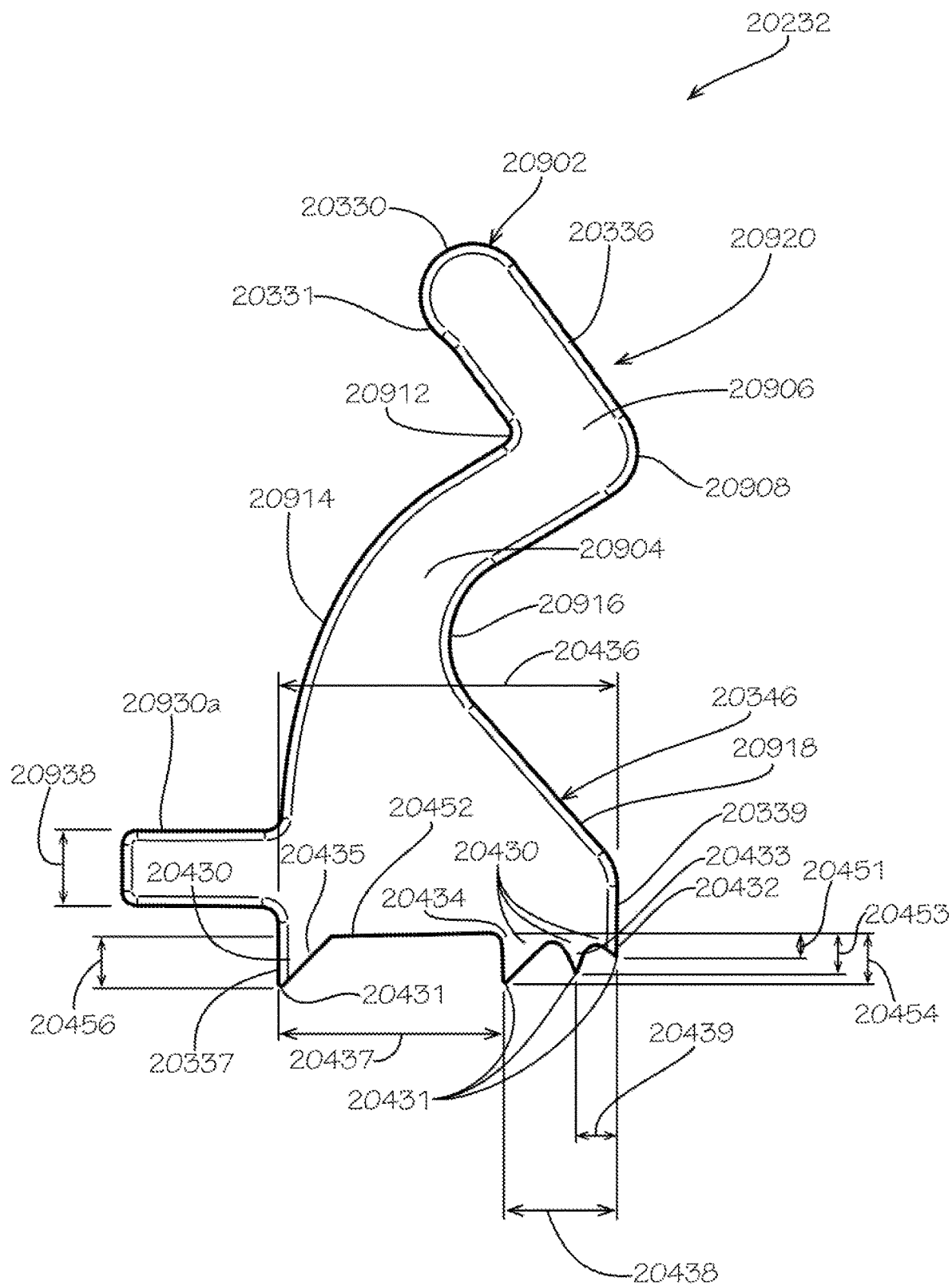
FIG. 30A is a side view of a gripper of the piping element assembly of FIG. 27A.
Figure 30B:
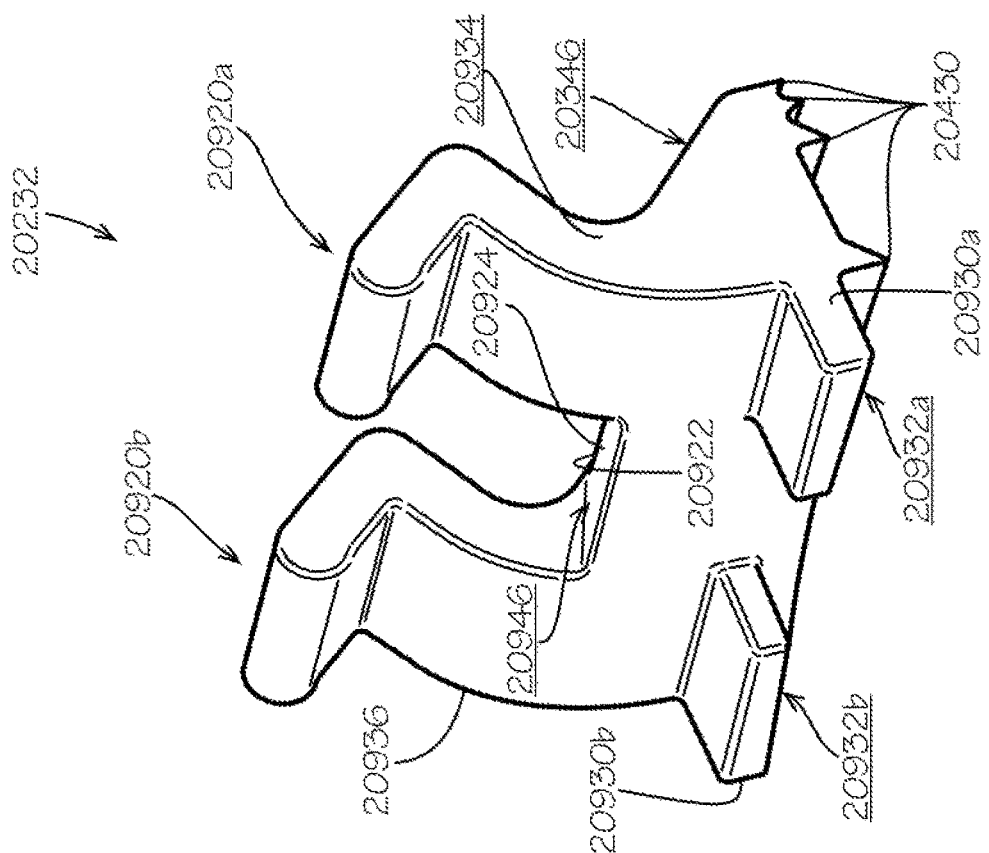
FIG. 30B is a perspective side view of the gripper of FIG. 30A.
Figure 30C:
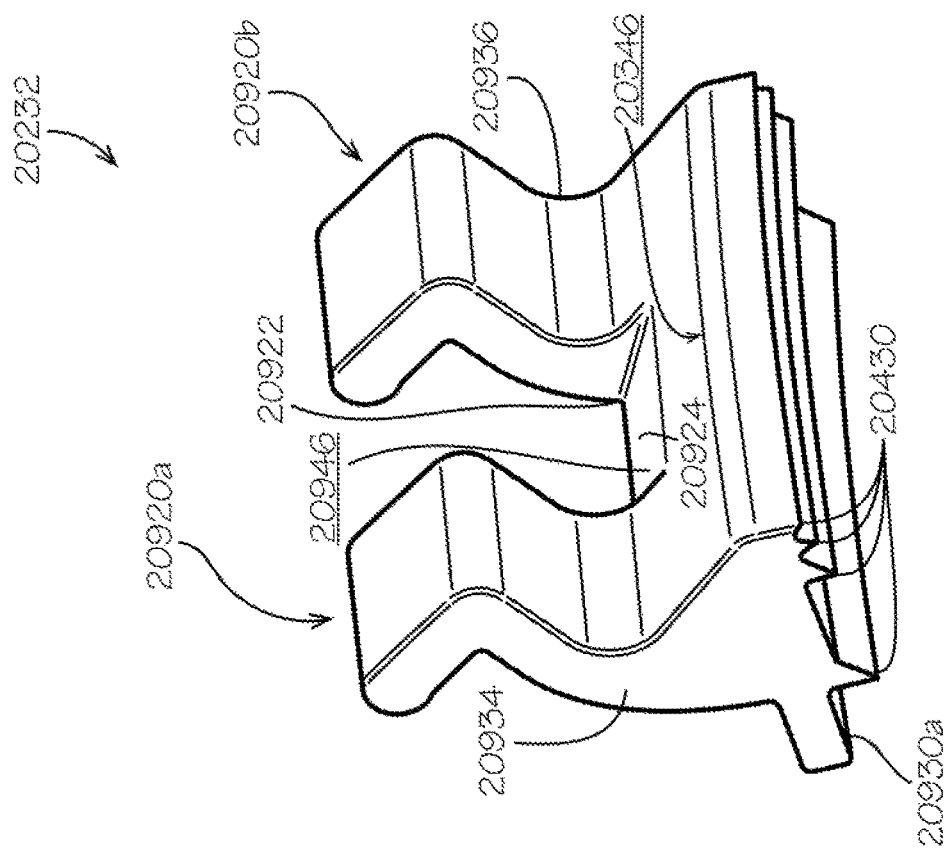
FIG. 30C is another perspective side view of the gripper of FIG. 30A.

The gripper 20232 is seen with reference to FIGS. 30A, 30B, and 30C. With specific reference to FIG. 30A, the gripper 20232 can comprise a plurality of gripping protuberances 20430. In the current aspect, the gripping protuberances 20430 can be wedge-shaped rails extending the length of the gripper 20232 with ends 20431 that descend to a point. The leading row 20432 can be small as compared to the remaining rows and, in the current aspect, can be referred to as the "touch-up row." The gripper 20232 can include a second row 20433, a middle row 20434, and a final row 20435. The gripper 20232 can be of a gripper width 20436. In the current aspect, a distance 20437 between the end 20431 of the final row 20435 and the middle row 20434 can be more than half of the width 20436. As such, a distance 20438 as measured from the end 20431 of the middle row 20434 to a rear wall 20339 of the gripper 20232 distal to the final row 20435 can be less than the distance 20437 as measured to the end 20431 of the final row 20435—which, in the current aspect, can be the same as the distance to a front wall 20337 of the gripper 20232 proximate to the final row 20435.

A distance 20439 as measured between the end 20431 of the second row 20433 and the end 20431 of the touch-up row 20432 can be slightly less than half of the distance 20438 between the end 20431 of the middle row 20434 and the end 20431 of the touch-up row 20432. As such, in the current aspect, the space between each row 20432, 20433, 20434, 20435 can become progressively larger.

The rows 20432, 20433, 20434, 20435 can be rails, and the profile view of FIG. 30A can be simply extruded in space. However, in the current aspect, the rows 20432, 20433, 20434, 20435 can be curved to match the anticipated curvature of the pipe length 102 to aide engagement of the gripper 20232. Additionally, the shape of the gripper 20232 in the current aspect can include features additional to simply extruding a shape in space.

A depth 20451 of the touch-up row 20432 as measured from a base 20452 of the gripper 20232 can be more than half of a depth 20453 of the second row 20433. The depth 20453 can be somewhat more than half of a depth 20454 of the middle row 20434. A depth 20456 of the final row 20435 can be about the same as the depth 20454.

As can be seen, the lever end 20330 can include a front wall 20331 and a rear wall 20336. The lever end 20330 in the current aspect can be formed in a radius 20902. In various aspects, the lever end 20330 can be various shapes. The gripper 20232 can include a central body portion 20904, and the lever end 20330 can be disposed at an elbow relationship to the body portion 20904. An elbow 20906 can define the angle of the body portion 20904 with respect to the lever end 20330. An elbow end 20908 can define a furthest extent of the elbow 20906. An elbow start 20912 can define an inner corner of the elbow 20906. As can be seen, the body portion 20904 can define a front curvature 20914 along the portions of the gripper 20232 proximate the front wall 20337 and a rear curvature 20916 along the portions of the gripper 20232 proximate the rear wall 20339. The rear curvature 20916 can terminate at a slope 20918 that at least partially can define the gripper bearing surface 20346. Portions of the gripper 20232 comprising the body portion 20906 and the lever end 20330 can be termed gripper arms 20920.

As seen with returning reference to FIGS. 30B and 30C, the gripper 20232 can include two gripper arms 20920a,b in the current aspect. The gripper arms 20920a,b can define a rail space 20922 between the gripper arms 20920a,b. The rail space 20922 can be at least partially defined by a bottom 20924 that can define a secondary bearing surface 20946. The secondary bearing surface 20946 can cooperate with the gripper bearing surface 20346 when the mechanical joint assembly 20134 is activated.

The gripper 20232 can include protrusions 20930a,b. The protrusions 20930 can help prevent over-rotation of the gripper 20232 during engagement. In various aspects, the protrusions 20930a,b can be described as anti-rotation protrusions. Each protrusion 20930a,b includes a contact surface 20932a,b. Each gripper 20232 includes a first end 20934 and a second end 20936. Each contact surface 20932a,b can be disposed at an angle such that a thickness 20938 of the protrusion can be largest proximate to the ends 20934, 20936 and such that the thickness 20938 can be smallest at the portions of the protrusion distal to the ends 20934, 20936. In various aspects, the contact surfaces 20932a,b can be curved. Although two protrusions 20920a,b are shown, in various aspects the gripper 20232 can include one protrusion, multiple protrusions, or various other combinations, including a single protrusion that extends the entire length of the gripper 20232.

Figure 31:
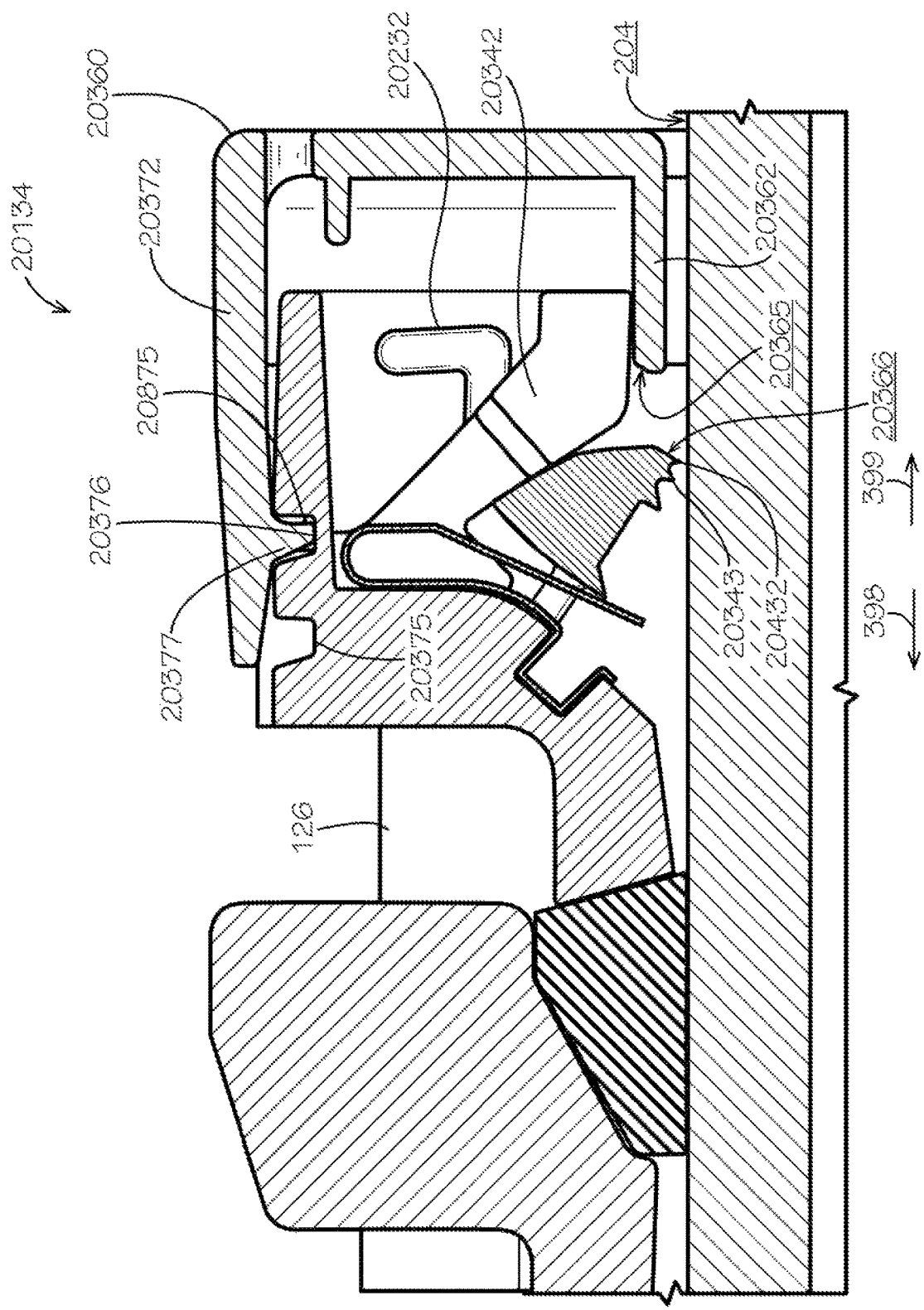
FIG. 31 is a detail view of the mechanical joint of FIG. 29 arranged in an initial engagement position.

An initial engagement position or arrangement is shown and described with reference to FIG. 31. In the initial engagement position, the gripper 20232 can be moved along the restraint pivot 20342. Movement can be allowed by movement of the cover 20360 first being dislocated from the restraint position shown in FIG. 29. The cover engagement wall 20372 can be bent with respect to the remaining portions of the cover 20360 and can behave like a leaf spring. Movement of the cover 20360 can be achieved by bending the cover engagement wall 20372 such that the end 20376 extends above out of the first tab stop locator 20375. When the cover engagement wall 20372 is bent as described, the cover 20360 can be linearly actuated, allowing it to move in the withdrawal direction 399. When the cover 20360 moves, the contact surface 20365 can move with respect to the contact surface 20366, and the stop leg 20362 can move in the withdrawal direction 399, and thereby the spring clip 20333 can bias the gripper 20232 into engagement with the pipe length 102 such that at least the leading row 20432 can come into contact with the pipe outer surface 204. In the current aspect, the second row 20433 can also come into contact with the pipe outer surface 204. In the current view, the stop leg 20362 can be seen completely out of engagement with the gripper 20232, although complete disengagement of the stop leg 20362 is not needed for the gripper 20232 to engage the outer surface 204.

In various aspects, the cover 20360 can continue to move linearly in the withdrawal direction 399. In the current aspect, the tab stop 20377 can be shown located within the second tab stop locator 20875, and, therefore, is shown in the desired final location of the current aspect. As a result, the stop leg 20362 can be linearly translated in the withdrawal direction 399 by the same length as the length between the first tab stop locator 20375 and the second tab stop locator 20875. In various aspects, the gripper 20232 will not continue to actuate into the pipe length 102. In those aspects in which the gripper 20232 does not continue to actuate into the pipe length 102, the spring clip 10333 can be strong enough to bias the gripper 20232 into the pipe length 102 but not strong enough to cause full engagement. In various aspects, continued actuation of the cover 20360 can cause additional motion of the gripper 20232 into the pipe length 102.

In the current aspect, the cover 20360 can be actuated by hand, such that the cover engagement wall 20372 can be bent to allow motion of the cover 20360 simply by gripping it with a person's hand and pulling it into place. The spring force inherent in the material choice of the cover 20360 can prevent actuation of the cover engagement wall 20372 without intentional actuation. The cover engagement wall 20372 can be bent to stresses within the elastic deformation range of the material chosen in the current aspect. As such, actuation and/or engagement of the gripper 20232 can be achieved without the use of specialized tools or tools of any kind in the current aspect. In various aspects, various tools can be utilized to assist in actuating the cover engagement wall 20372 and locating the cover 20360. In the current aspect, movement of the cover 20360 achieved by motion of the cover engagement wall 20372 results in a change in state of the joint restraint assembly 20134 from the deactivated or prepared position to the activated or engagement position. In the current aspect, such achievement can be made solely by hand and without the use of tools.

Figure 32:
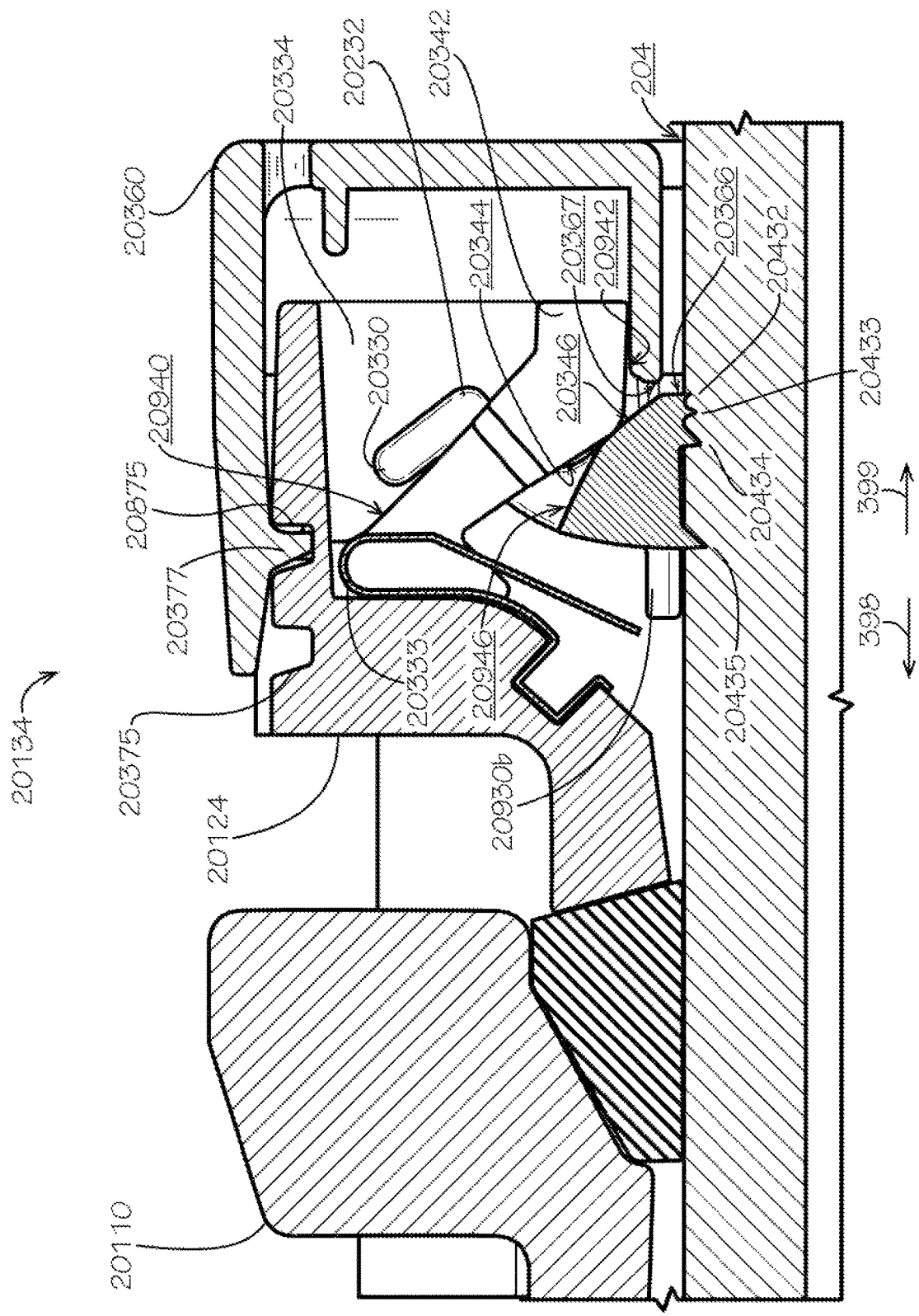
FIG. 32 is a detail view of the mechanical joint of FIG. 29 arranged in a final engagement position.

A final engagement arrangement or position can be seen with reference to FIG. 32. As can be seen, the cover 20360 can be moved into arrangement such that the tab stop 20377 can be located within the second tab stop locator 20875, as previously noted. The gripper 20232 can be arranged such that the rows 20432, 20433, 20434, 20435 all engage the pipe length 102. The rows 20432, 20433, 20434, 20435 can be engaged by pullout force of the pipe length 102 that is typically caused by pressure in the water system. The contact surface 20366 can be rotated to be about orthogonal to the pipe outer surface 204. A facing surface 20367 of the stop leg 20362 can be in contact with the contact surface 20366 but need not be for the gripper 20232 to align in gripping arrangement of the final engagement position.

The lever end 20330 of the gripper 20232 can be rotated as the gripper 20232 becomes engaged with the pipe outer surface 204. The restraint bearing surface 20344 can be shown engaged against the bearing surface 20346. The lever end 20330 can contact an upper bearing surface 20940 located along the restraint base 20334. Engagement of the lever end 20330 with the upper bearing surface 20940 can help prevent over-rotation of the gripper 20232. As such, the lever end 20330 can act as an anti-rotation feature. A secondary restraint bearing surface 20942 can be located along the restraint pivot 20342. In the event that the gripper 20232 becomes engaged into the pipe outer surface 204 at a distance that is too great—for example, when the pipe length 102 is out of round or not centered in the piping element 20110—then the secondary restraint bearing surface 20942 can interact with the secondary bearing surface 20946 to reduce the added compression of the pipe length 102 from additional translation of the gripper 20232 in the withdrawal direction 399. The protrusion 20930b can help to prevent over-rotation of the gripper 20232.

Figure 33:
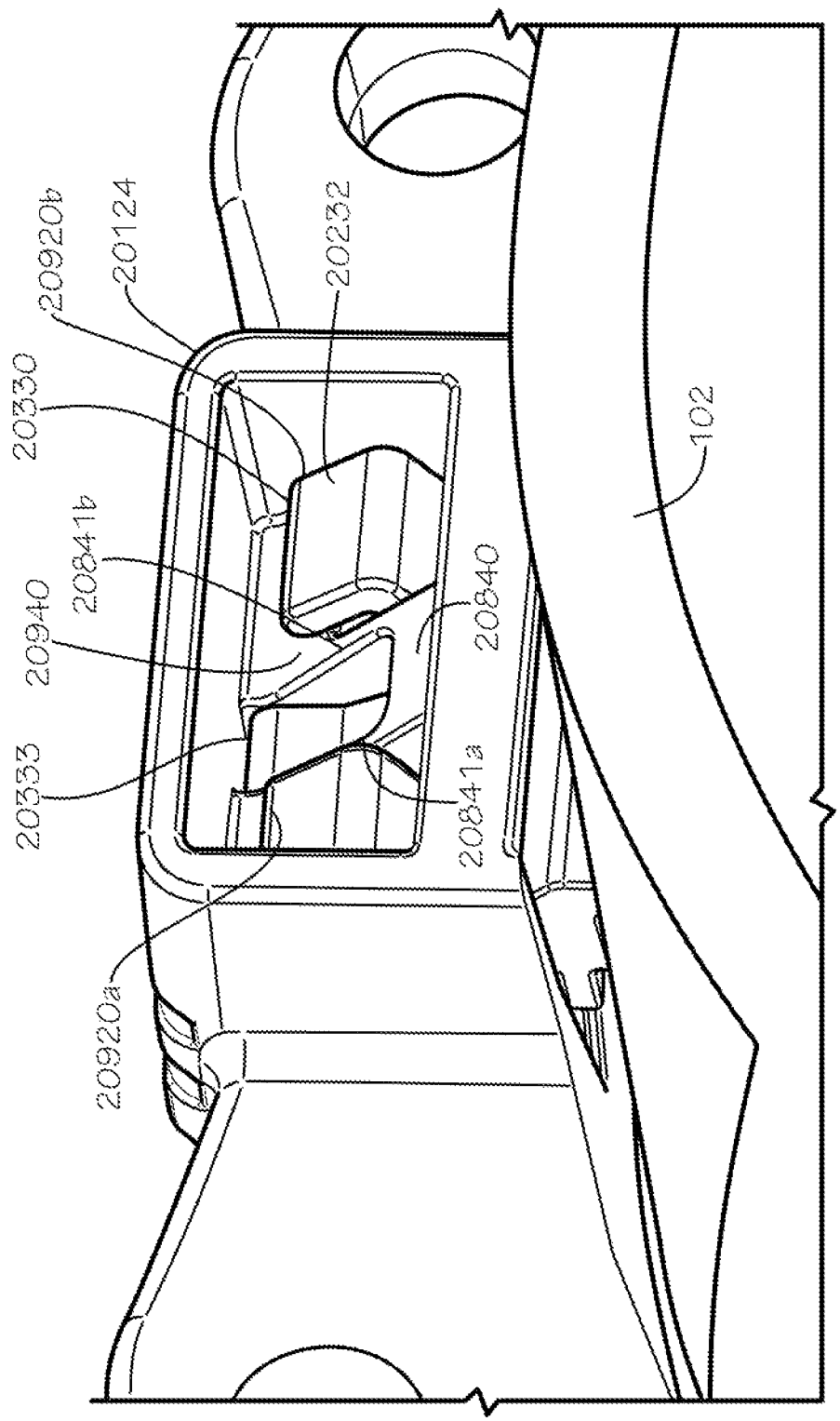
FIG. 33 is a perspective side view of the mechanical joint of FIG. 29 with a cover removed for visibility.

Another view of the final engagement position can be seen with reference to FIG. 33. For visibility, the cover 20360 is omitted from the current view. The gripper arms 20920a,b can be seen on either side of the structural rail 20840 such that the structural rail 20840 can be arranged within the rail space 20922 (refer to FIGS. 30B-30C). As can be seen, the spring clip 20333 can be disposed in the space between the first rail 20841a and a second rail 20841b. As such, the structural rail 20840 can provide a guide for engagement of the gripper 20232 with the pipe length 102.

Figure 34:
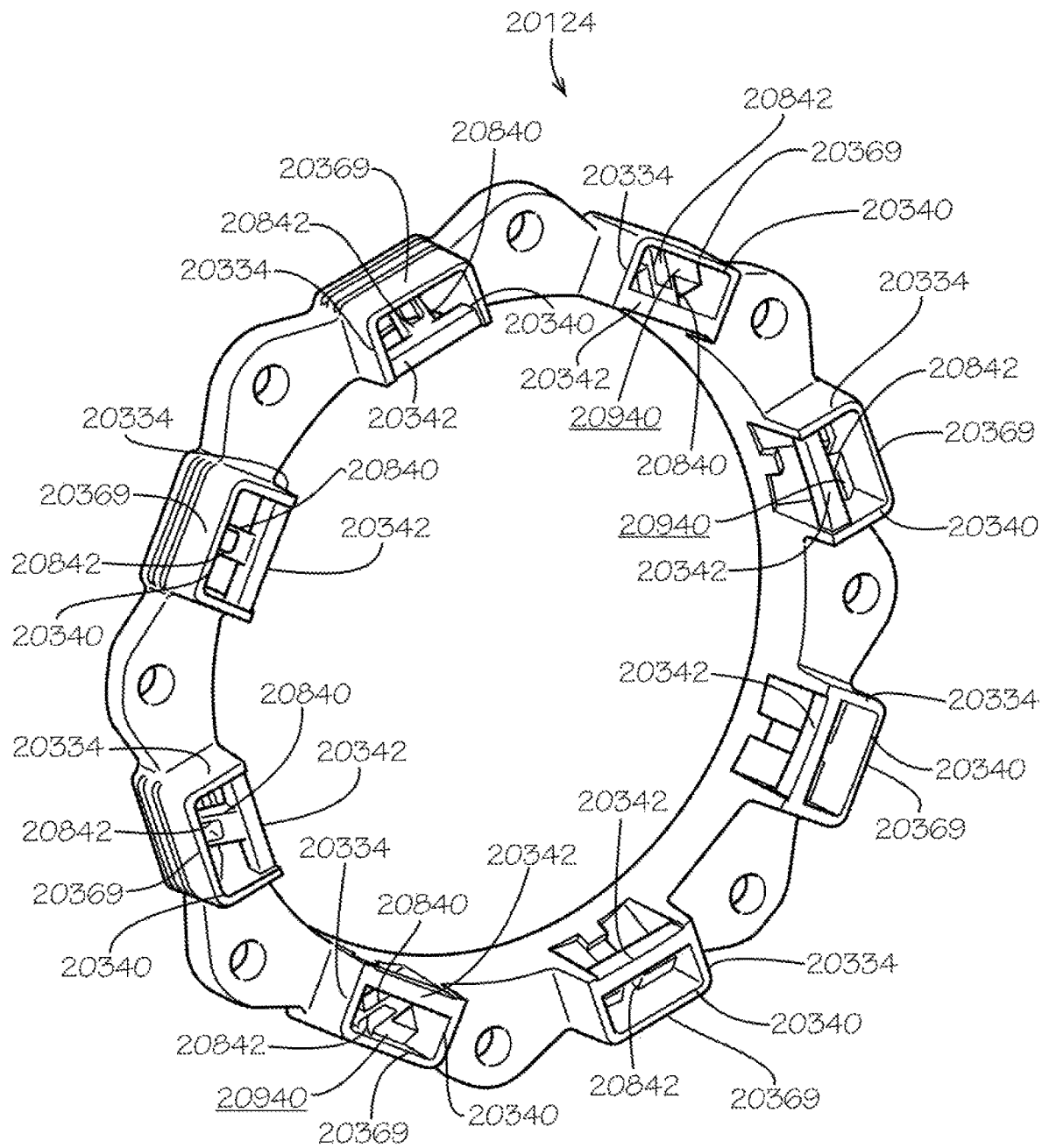
FIG. 34 is a perspective view of a gland of the piping element assembly of FIG. 27A.

The gland 20124 is shown with reference to FIG. 34. The outer wall 20369 can be seen on each restraint base 20334. The spring pocket 20842 can be partially defined in the upper bearing surface 20940 of each restraint base 20334 within each restraint pocket 20340. The structural rail 20840 and restraint pivot 20342 can be seen on each restraint base 20334.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A gripper for use in a mechanical joint assembly, the gripper comprising:
    a first end defining a first lateral extent of the gripper;
    a second end defining a second lateral extent of the gripper;
    a front wall defining a front extent of the gripper;
    a rear wall defining a rear extent of the gripper;
    an engagement end defining a lower extent of the gripper, the engagement end defining a plurality of gripping protuberances;
    at least one anti-rotation protrusion extending from a front wall proximate the engagement end, and
    a plurality of gripper arms extending from the engagement end, each gripper arm comprising a body portion and a lever end, the lever end defining an upper extent of the gripper,
    wherein the gripper arms comprise at least a first gripper arm and a second gripper arm, and wherein a rail space is defined between the first gripper arm and the second gripper arm.

2. The gripper of claim 1, wherein a front of the gripper defines a curvature along a start of each of the plurality of gripper arms.

3. The gripper of claim 1, wherein each protrusion is angled such that a thickness of each protrusion is largest proximate an end of the gripper.

4. The gripper of claim 1, wherein the body portion is arranged at an elbow to each lever end.

5. The gripper of claim 4, wherein each lever end defines a radius.

6. The gripper of claim 1, wherein each of the gripping protuberances comprises a curvature.

7. The gripper of claim 1, wherein the rear wall defines a gripper bearing surface for engagement with the mechanical joint assembly.

8. The gripper of claim 7, wherein the bearing surface is angled with respect to the rear wall.

9. The gripper of claim 1, wherein the plurality of gripping protuberances comprises a leading row.

10. The gripper of claim 9, wherein the plurality of gripping protuberances comprises a second row, a middle row, and a final row.

11. The gripper of claim 10, wherein each gripping protuberance descends to a point.

12. The gripper of claim 10, wherein the leading row, the second row, the middle row, and the final row are of varying depths.

13. The gripper of claim 12, wherein a depth the leading row is more than half of a depth of the second row.

14. The gripper of claim 13, wherein the depth of the second row is more than half a depth of the middle row.

15. The gripper of claim 10, wherein a width of the gripper can be defined as a distance between the front wall of the gripper and the rear wall of the gripper.

16. The gripper of claim 15, wherein the middle row is of a distance from the rear wall that is less than half of the width of the gripper.

17. The gripper of claim 16, wherein a distance between the middle row and the first row is the same as the distance between the middle row and the rear wall.

18. The gripper of claim 17, wherein a distance between the first row and the second row is less than half of the distance between the middle row and the first row.

* * * * *